(12) United States Patent
Richey

(10) Patent No.: US 12,321,872 B1
(45) Date of Patent: Jun. 3, 2025

(54) METHODS AND SYSTEMS FOR IMPROVING EFFICIENCY IN COLLECTION/DISTRIBUTION LOGISTICS USING MACHINE LEARNING

(71) Applicant: Allen M Richey, Baton Rouge, LA (US)

(72) Inventor: Allen M Richey, Baton Rouge, LA (US)

( * ) Notice: Subject to any disclaimer, the term of this patent is extended or adjusted under 35 U.S.C. 154(b) by 0 days.

(21) Appl. No.: 18/441,357

(22) Filed: Feb. 14, 2024

(51) Int. Cl.
*G06Q 10/047* (2023.01)
*G06Q 10/083* (2024.01)

(52) U.S. Cl.
CPC ....... *G06Q 10/047* (2013.01); *G06Q 10/0838* (2013.01)

(58) Field of Classification Search
None
See application file for complete search history.

(56) References Cited

U.S. PATENT DOCUMENTS

| | | | |
|---|---|---|---|
| 8,630,958 B2 | 1/2014 | Carlsson et al. | |
| 9,037,406 B2* | 5/2015 | Mason | G06Q 10/04 701/482 |
| 9,151,628 B1 | 10/2015 | Saito et al. | |
| 9,697,730 B2 | 7/2017 | Thakur et al. | |
| 10,120,381 B2 | 11/2018 | Thakur | |
| 10,269,240 B2 | 4/2019 | Thakur et al. | |
| 11,928,693 B1* | 3/2024 | Savchenko | G01C 21/3626 |

(Continued)

FOREIGN PATENT DOCUMENTS

| | | |
|---|---|---|
| CN | 110428111 | 11/2019 |
| CN | 114578848 | 6/2022 |

(Continued)

OTHER PUBLICATIONS

N/A, "Constrained Delaunay triangulation"; Wikipedia dated Mar. 18, 2024; 7 pages; accessed Mar. 18, 2024 at https://en.wikipedia.org/wiki/Constrained_Delaunay_triangulation.
N/A, "Vehicle routing problem", Wikipedia; dated Mar. 18, 2024; 7 pages; accessed Mar. 18, 2024 at https://en.wikipedia.org/wiki/Vehicle_routing_problem.
Francis Chin and Cao An Wang, "Finding the constrained Delaunay triangulation and constrained Voronoi diagram of a simple polygon in linear time", SIAM Journal on Computing, 28 (2): pp. 471-486, doi: 10.1137/S0097539795285916, hdl:10722/47094, MR 1634357, S2CID 28966377.

(Continued)

*Primary Examiner* — Hunter B Lonsberry
*Assistant Examiner* — Paysun Wu
(74) *Attorney, Agent, or Firm* — Campbell Stephenson LLP

(57) ABSTRACT

Methods and systems for the dynamic management of logistics in the collection/distribution of items, materials, and/or other distributables/collectables are disclosed that include determining static route routing information, assigning one or more transport units of a plurality of transport units to the one or more routes, performing one or more transport operations, identifying a change in route management information, and, in response to the change in the route management information being identified, performing rerouting of at least one of the plurality of transport units. In such an embodiment, the route management information comprises at least one of the static route management information or dynamic route management information. Further, the rerouting can include evaluating the change in the route management information and modifying at least one route of the one or more routes based, at least in part, on the change in the route management information.

20 Claims, 29 Drawing Sheets

(56) References Cited

U.S. PATENT DOCUMENTS

| | | | |
|---|---|---|---|
| 2012/0310691 A1* | 12/2012 | Carlsson | G06Q 10/047 |
| | | | 705/7.13 |
| 2018/0300638 A1* | 10/2018 | Chen | H04L 41/16 |
| 2020/0242555 A1* | 7/2020 | Liu | G06Q 10/08355 |
| 2023/0093550 A1* | 3/2023 | Oosterbroek | G01N 35/00623 |
| | | | 422/67 |

FOREIGN PATENT DOCUMENTS

| | | |
|---|---|---|
| CN | 115237152 | 10/2022 |
| JP | 6477730 | 11/2017 |
| KR | 20230078155 | 6/2023 |

OTHER PUBLICATIONS

J. R. Shewchuk (2008), "General-dimensional constrained Delaunay and constrained regular triangulations. I. Combinatorial properties", Discrete & Computational Geometry, 39 (1-3): pp. 580-637, doi: 10.1007/s00454-008-9060-3, MR 2383774.

Coa An Wang and Lenhart K. Schubert (1987), "An optimal algorithm for constructing the Delaunay triangulation of a set of line segments", in Soule, D. (ed.), Proceedings of the Third Annual Symposium on Computational Geometry, Waterloo, Ontario, Canada, Jun. 8-10, 1987, ACM, pp. 223-232, doi:10.1145/41958.41982, ISBN 0-89791-231-4, S2CID 18490297.

\* cited by examiner

METHODS AND SYSTEMS FOR IMPROVING EFFICIENCY IN COLLECTION/DISTRIBUTION LOGISTICS USING MACHINE LEARNING

BACKGROUND

Technical Field

This invention relates generally to collection/distribution and, more particularly, to the dynamic management of logistics in the collection/distribution of items, materials, and/or other distributables/collectables, through the use of various techniques.

Description of Related Technologies

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Such information handling systems have readily found use in a wide variety of applications. However, while such computer systems have found application in the delivery of a specific item to a specific location by courier, for example, little progress has been made in applying such techniques to the conveyance of items and/or materials. Using refuse collection as an example, it will be appreciated that the current state of refuse collection routing is less than adequate. Collection routes are determined statically, and so are unable to account for unforeseen changes (e.g., missed collections, reduced amounts of refuse, and so on). It is also extremely difficult to account for the effects of traffic, fuel cost/efficiency, weather delays, and other logistical challenges, particularly when such collection is subject to one or more time constraints. Addressing these and other challenges current solutions leave unmet is thus desirable.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

Figure 1A:
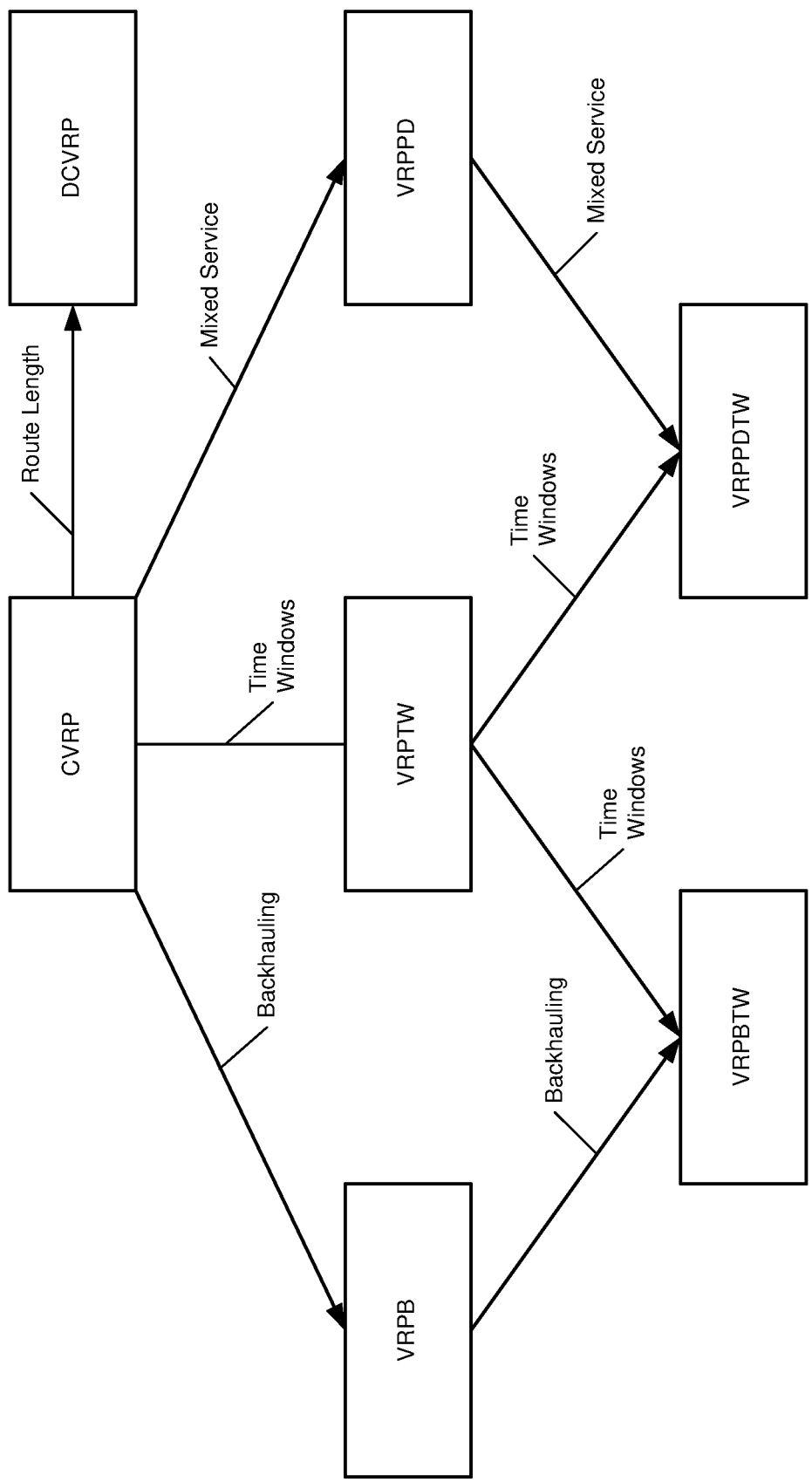
FIG. 1A is a block diagram illustrating an example of relationships between various routing problems addressed by methods and systems such as those disclosed herein.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover modifications, equivalents and alternatives falling within the spirit and scope of methods and systems such as those described herein, as defined by the appended claims.

DETAILED DESCRIPTION

Overview

Methods and systems such as those described herein can be implemented, for example, as a method, a computing system, and/or computer program product, and provide for the dynamic management of logistics in the collection/distribution of items, materials, and/or other distributables/collectables (e.g., energy (e.g., fuel, stored electricity, compressed air, and the like)), through the use of various techniques. Such techniques can include or make use of machine learning (ML) techniques. For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As noted, certain embodiments of methods and systems such as those disclosed herein can include operations such as receiving route management information (e.g., static route management information and/or dynamic route management information, for example) at a machine learning system, dynamic management of logistics in the collection/distribution of items, materials, and/or other distributables/collectables, by way of a route management system according to embodiments such as those described herein.

INTRODUCTION

As noted, methods and systems such as those described herein provide for the dynamic management of logistics in the collection/distribution of items, materials, and/or other deliverables/collectables, through the use of various techniques. In so doing, methods and systems such as those described herein are able to route transport units during normal operations (e.g., as may result from predictable occurrences such as transport units delivering/collecting items/materials/other deliverables/collectables becoming empty/full, and as a result of such normal operations, needing to refuel), and also in situations in which operations are disrupted or impeded (e.g., as by unpredictable circumstances such as equipment failures, accidents, traffic, weather, labor issues, and so on). Such dynamic management of logistics in the collection/distribution of items, materials, and/or other distributables/collectables can be accomplished through the use of algorithmic combinations, machine learning, and/or other such techniques. In order to facilitate such solutions, such methods and systems can, as noted, include the use of machine learning and other techniques to analyze available information, and, in certain embodiments, to do so using minimal or no human guidance beyond information such as existing route information, operational factors, and/or other such information. Through the use of techniques such as those described herein, such methods and systems are able to dynamically adjust transport unit routes in an ongoing manner, allowing such route management systems to constantly monitor the transport units being managed and, in response to changes in the system's environment, improve the routing of those transport units and so, improve the efficiency in the distribution and/or collection of deliverables/collectables.

FIG. 1A is a block diagram illustrating an example of relationships between various routing problems addressed by methods and systems such as those disclosed herein. Embodiments such as those described herein address various types of vehicle (transport unit) routing problems (VRPs), which are combinatorial optimization and integer programming problems that involve the determination of one or more routes that a fleet of one or more transport units are to traverse in distributing distributables (e.g., items, materials, and the like) and/or collecting collectables (e.g., items, materials, and the like) might traverse in order to visit a certain set of locations, and so provide service to a given set of customers associated with those locations. This is, in certain respects, a generalization of the traveling salesman problem, where the context is that of distributing distributables and/or collecting collectables in a topology in which a centralized depot (e.g., in the case of the distribution of distributables) or collection point (e.g., in the case of the collection of collectables). Determining optimal solutions to such routing problems is classified as NP-hard, and real-world scenarios, complex. In view of such considerations, heuristics can be employed to "prune" potential alternatives and so reduce such complexity to manageable levels.

The objective of a route management system is to reduce, as much as possible the total route cost (cost, as will be appreciated in light of the present disclosure, comprehending a number of aspects, including level of service, labor costs (e.g., transport unit operators, support personnel, personnel to operate and maintain the route management system, and so on), fuel costs, carbon footprint, transport unit maintenance, infrastructure costs, and so on). Such scenarios involve delivery and/or collection services provided by an organization to customers, by way of transport units operated by transport unit operators delivering deliverables to customer from one or more points of distribution (depots) and/or collect collectables from such customers for conveyance to a collection point, using a network of roads (a road network or transport network, the term "road" being used generically herein to represent any street, highway, or other roadway a transport unit could traverse, a network of which variously referred to herein as a graph, a network, a road network, a transport routing network, and the like).

A VRP concerns the determination of a set of routes (routing each transport unit from a given depot, through servicing the locations on its assigned route, and finishing at a depot (either its original depot or another one), such that service requirements and operational constraints are satisfied and the global transportation cost (e.g., in terms of operating expenses, distance travelled, time spent providing such service, and/or the like) is minimized (or at least, reduced to an acceptable level). In certain embodiments, the road network is described using a graph where the edges represent roads and nodes represent locations to be serviced. The edges may be directed or undirected, to account for the presence of one way streets, different costs in each direction, or the like. Each edge can have associated therewith a cost (representing, e.g., distance or travel time, which may be dependent on transport unit type, in certain embodiments).

Several variations and specializations of the vehicle routing problem exist. Among other such problems, such VRP include those depicted in FIG. 1A:

Capacitated Vehicle Routing Problem (CVRP): the vehicles have a limited carrying capacity of the goods that must be delivered. CVRPTW: CVRP with time windows, within which the deliveries (or visits) must be made (and so constrained by both vehicle capacity and time windows).

Distance and Capacity Constrained Vehicle Routing Problem (DCVRP): Essentially the CVRP, where both maximum capacity and maximum cost constraints are imposed.

Vehicle Routing Problem with Time Windows (VRPTW): The collection/delivery locations have time windows within which service is to be provided.

Vehicle Routing Problem with Backhauling (VRPB): VRPB includes effectively arranging routes for a fleet of vehicles to serve locations while taking both deliveries and pickups into account.

Vehicle Routing Problem with Pickup and Delivery (VRPPD): A number of items/materials need to be moved from certain pickup locations to other delivery locations. Vehicle Routing Problem with LIFO (VRPL), which is similar to the VRPPD, except an additional restriction is placed on the loading of the vehicles: at any delivery location, the item being delivered must be the item most recently picked up. This scheme reduces the loading and unloading times at delivery locations because there is no need to temporarily unload items other than the ones that should be dropped off.

Vehicle Routing Problem with Backhauling and Time Windows (VRPBTW): both deliveries and pickups into account, and the services are subject to time windows.

Vehicle Routing Problem with Pickup and Delivery, and Time Windows (VRPPDTW): moving the items/materials in question from certain pickup locations to other delivery locations, within proscribed time windows.

Other permutations of such problems include:

Vehicle Routing Problem with Multiple Trips (VRPMT): The vehicles can do more than one route.

Open Vehicle Routing Problem (OVRP): Vehicles are not required to return to the depot.

Inventory Routing Problem (IRP): Vehicles are responsible for satisfying the demands in each delivery point Multi-Depot Vehicle Routing Problem (MDVRP): Multiple depots exist from which vehicles can start and end.

Vehicle Routing Problem with Transfers (VRPWT): Items/materials can be transferred between vehicles at designated transfer hubs.

There are three main different approaches to VRP modeling:

Vehicle flow formulations—this uses integer variables associated with each arc that count the number of times that the edge is traversed by a vehicle. It is generally used for basic VRPs. This is good for cases where the solution cost can be expressed as the sum of any costs associated with the arcs.

Commodity flow formulations—additional integer variables are associated with the arcs or edges which represent the flow of commodities along the paths travelled by the vehicles.

Set partitioning problem—These have an exponential number of binary variables which are each associated with a different feasible circuit. The VRP is then instead formulated as a set partitioning problem which asks what the collection of circuits with minimum cost is, which satisfies the VRP constraints.

As will be appreciated in light of the present disclosure, the problem of routing transport units is complicated by the possibility of dynamic changes in the circumstances encountered by transport units, and so the route management system. The vehicle rescheduling problem (VRSP) is a combinatorial optimization and integer programming problem seeking to service customers on a trip after change of schedule such as vehicle breakdown or major delay. Determining the optimal solution is an NP-complete problem in combinatorial optimization, so in practice heuristic and deterministic methods are needed to find acceptably good solutions for the VRSP. Several variations and specializations of the vehicle rescheduling problem exist:

Single Depot Vehicle Rescheduling Problem (SDVRSP): A number of trips need to be rescheduled due to delay, vehicle breakdowns or for any other reason. The goal is to find optimal rescheduling of the existing fleet, possibly using extra vehicles from the depot, in order to minimize the delay and the operating costs. In the Single Depot variation, there is only one depot which contains all extra vehicles, and in which every vehicle starts and ends its schedule.

Multi Depot Vehicle Rescheduling Problem (MDVRSP): Similar to SDVRSP, except additional depots are introduced. Each depot has capacity constraints, as well as variable extra vehicles. Usually, vehicle schedules have an additional constraint which requires that each vehicle returns to the depot where it started its schedule.

Open Vehicle Rescheduling Problem (OVRSP): Vehicles are not required to return to the depot.

As will be appreciated, the simplistic approaches to route management employed previously have left a great deal to be desired. The problems thus encountered only worsen as the number of transport units and locations increases, particularly as the failures and errors (discussed subsequently) become more widespread. Methods and systems such as those described herein address such problems by routing transport units according to route plans generated by a route management system such as that described herein. Using formulations of the class of problems to be addressed, such as those noted above, it is to be appreciated that, in light of the present disclosure, different classes of techniques were found to provide advantageous results in different phases of the route management process. In essence, the overall architecture and approach of embodiments such as those described herein is that of a hyper-heuristic—a heuristic search method that automates the process of selecting and using other heuristics (or components of such heuristics) to efficiently route transport units, in the present context, through the use of machine learning techniques. In so doing, embodiments such as those described herein are able to handle the wide variety of situations encountered by routing transport units for the distribution/collection of items, materials, and other distributables/collectables. Further, embodiments such as those described herein used approaches (including grouping, heuristics, and metaheuristics) to provide a solution that is better-tailored to the given situation at hand. This is particularly meaningful in applications in which transport units are tasked with both collection and delivery, certain transport units are tasked with collection and certain transport units are tasked with delivery, and other such combinations (referred to herein as mixed collection/distribution transport systems).

Embodiments such as those described herein are able to address the need for transport unit routing in a transport system, in part, by way of performing the requisite routing in phases, depending on the state of the transport system. Further, a route management system according to embodiments such as those described herein tailors the routing performed to the needs of such phases, balancing optimality, effective servicing of locations, efficient use of resources (both in the transport system and computational support systems), responsiveness, and other considerations, to provide a level of service that meets or exceeds applicable service and operational requirements.

To this end, the first of these is the static route determination process, described subsequently, generates static route management information as an output. The static route management information generated can, in certain embodiments, include parameters such as transport unit parameters (e.g., characteristics of the transport units used in the transport system, such as transport unit capacity, transport unit speed (average, maximum, etc.), transport unit fuel efficiency, and/or the like), container parameters (e.g., characteristics of the containers used to store items/materials, including container size (e.g., number/volume/weight of the items/materials that the container can store, container weight (e.g., the weight of an empty container), container handling time, and/or the like), scheduling parameters (e.g., pick up/delivery times/windows, and/or the like). The static route determination process uses this information to generate a graph, where the nodes of the graph represent locations to be serviced and the edges of the graph represent paths (e.g., roads) between those locations that may be traveled by transport units servicing those locations. As described in detail subsequently, a static route determination process (such as that depicted in FIG. 13) can employ historical information, as well as route prediction information (e.g., generated by way of machine learning techniques) as the basis for determining not only the locations to be visited, but the efficient, effective grouping of those locations. Given the static nature of such an initial starting point (the initial information is static), as well as the fact that such a static route determination process is performed prior to transport operations (e.g., one or more transport operations, each of which including, for example, the collection/distribution of items, materials, and/or other distributables/collectables by a transport unit in servicing a service location) and the fact that the grouping analysis performed results in a smaller number of points between which transport units need to be routed, a greedy routing algorithm can be employed. This is at least because use of a greedy routing algorithm, while exhibiting reduced optimality for large numbers of points, can be used with the reduced number of points produced by the grouping analysis. Advantageously, such a greedy routing algorithm tends to be simpler than other algorithms that might be used as the basis for an algorithm that is part of the static routing process, which results in such an approach being more easily implemented (as a result of being simpler to understand), as well as being less computationally demanding.

By contrast, the exigencies of a changing situation, regardless of the cause of such change, are better managed by routing algorithms geared to simplify route determination in light of the situation at hand. Such simplification can be achieved, for example, using a heuristic (e.g., in the case in which the change in question occurs in the normal course of transport operations) or a metaheuristic (in the case in which the change in question occurs outside the normal course of transport operations). During the normal operations of a collection/distribution system, predictable changes can occur (e.g., transport units becoming empty as a result of having delivered their load (distribution) or full as a result of having collected their load to full capacity (collection), transport units needing to refuel, and so on), and rerouting may need to be performed to account for such changes (such rerouting being the result of, generically, rerouting analysis, which may be the result of, for example, a static route rerouting process and/or a dynamic route rerouting process). However, such situations not being completely known (at least as compared to the known conditions affecting the transport operations' initial state and the unpredictable nature of dynamic circumstances), the urgency of such situations falls somewhere between those associated with initial conditions for transport operations and those encountered in dynamic circumstances. Further, such situations are typically confined to a small number of transport units (typically only a single transport unit), and so typically affect only a small number of locations (in relative terms, as compared to the number of locations served). This is the second phase of a route management system according to the present disclosure.

In light of the foregoing, an initial heuristic for minimizing the impact of such situations has been found to be a triangulation, more specifically, a Delaunay triangulation (and, in certain scenarios, with preference to a constrained Delaunay triangulation), as described subsequently in connection with FIG. 14B. Once the paths for such solution have been identified, a greedy routing algorithm can be performed to determine the static route rerouting information needed to direct one or more other transport units to service the remaining locations, in the manner described subsequently.

In contrast to static route routing and static route rerouting, dynamic route rerouting is performed in situations in which unpredictable changes occur in the transport system. Dynamic route rerouting is performed during events (e.g., equipment failures, accidents, etc.), conditions (e.g., traffic congestion, inclement weather, etc.), and other circumstances (e.g., labor strikes, fuel shortages, etc.) outside the normal operations of the collection/distribution system, circumstances which can be systemwide in their effects. Given that factors such as the type, timing, and scope of such circumstances can be particularly unpredictable, a dynamic route rerouting algorithm according to embodiments such as those described herein needs to be able to address such unpredictable changes. In order to do so, a dynamic route rerouting algorithm employs metaheuristic techniques that are able to perform such rerouting in the face of varying and unpredictable changes that such circumstances can involve, as is described subsequently (e.g., in connection with FIG. 15B). This is the third phase of a route management system according to the present disclosure.

Also helpful in performing such dynamic route rerouting, as well as in other phases of a route management process according to the present disclosure, are machine learning techniques. Machine learning techniques can be employed in static route routing/rerouting and dynamic route rerouting (as noted subsequently), to generate route predictions, tune algorithmic parameters of the static/dynamic route rerouting algorithms, and to select from a number of dynamic route rerouting algorithms, among other such applications described herein.

Example System Network Architecture

Figure 1B:
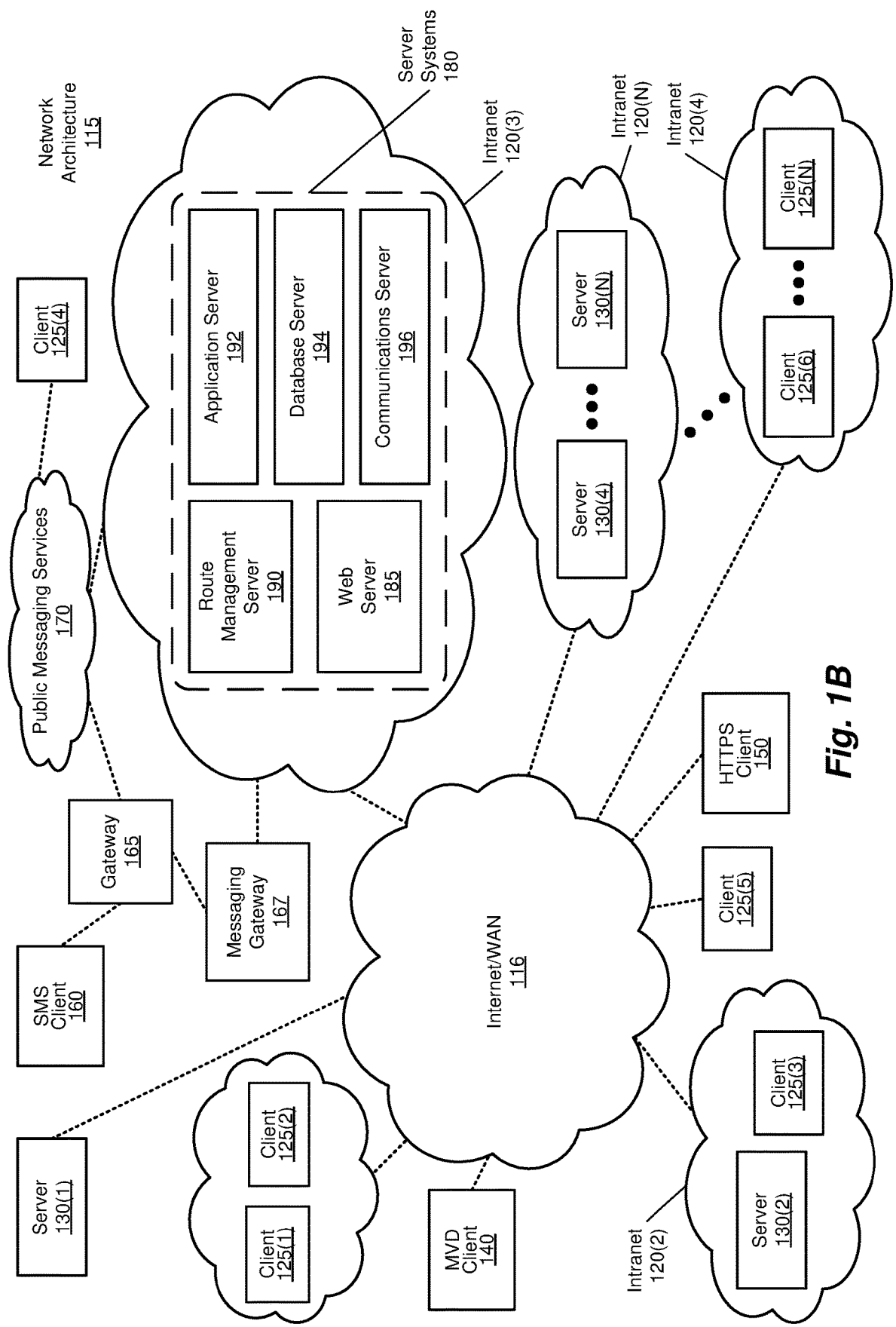
FIG. 1B is a block diagram illustrating an example of a network architecture, according to methods and systems such as those disclosed herein.

FIG. 1B is a block diagram illustrating an example of a network architecture that includes a server system, according to methods and systems such as those disclosed herein. FIG. 1B thus depicts a network architecture 115, which includes an internetwork (depicted in FIG. 1B as an internet/wide area network (WAN) 116), which is configured to couple a number of intranets to one another (depicted in FIG. 1B as intranets 120(1)-(N)). Intranets 120(1)-(N), in turn, can include a number of components, such as one or more clients (depicted in FIG. 1B as clients 125(1)-(N)) and/or servers (depicted in FIG. 1B as servers 130(1)-(N)). Clients 125(1)-(N) and/or servers 130(1)-(N) can, for example, be implemented using computer systems such as those described in subsequently. Internet/WAN 116 thus communicatively couples intranets 120(1)-(N) to one another, thereby allowing clients 125(1)-(N) and servers 130(1)-(N) to communicate with one another (and can, in certain embodiments, provide for the servers of intranets 120(3) and 120(N), for example, to operate as cloud-based server systems). As is depicted in FIG. 1B, clients 125(1)-(N) can be communicatively coupled to one another and to servers 130(1)-(N) as part of one of intranets 120(1)-(N), or directly via internet/WAN 116. Similarly, servers 130(1)-(N) can be coupled via intranet/WAN 116 via a direct connection to intranet/WAN 116, or as part of one of intranets 120(1)-(N).

Network architecture 115 also provides for communication via intranet/WAN 116 using one or more other devices. Such devices can include, for example, a mobile voice and data (MVD) device (e.g., depicted in FIG. 1B as a MVD client 140, implemented in a "smart phone," a "tablet" computer, or other such mobile computing device, using, in the alternative or in combination, general packet radio service (GPRS) technology, $3^{rd}$ Generation (3G) cellular technology (e.g., Wideband Code Division Multiple Access (WCDMA)/High-Speed Downlink Packet Access (HSDPA)), $4^{th}$ Generation (4G) cellular technology (e.g., High Speed Packet Access (HSPA/HSPA+), Long Term Evolution (LTE), or IEEE 802.16 ("WiMAX")), and/or $5^{th}$ Generation (5G) cellular technology (New Radio (NR), Stand Alone, or ultra-wideband (UWB)), among other such communications technologies), a secure web client (depicted in FIG. 1B as a secure hypertext transfer protocol client 150), and a basic cellular phone (e.g., using standard texting or other communication protocols, and depicted in FIG. 1B as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1B, SMS client 160 can communicate via internet/WAN 116 via several channels. SMS client 160 can communicate directly, for example, with a gateway 165, which, in turn, communicates with internet/WAN 116 via a messaging gateway 167 and, optionally, elements within intranet 120(3), for example. Alternatively, SMS client 160 can, via gateway 165, communicate with intranet 120(3) (and so, internet/WAN 116) via public messaging services 170 to which gateway 165 and intranet 120(3) are connected. As is also depicted in FIG. 1B, a client 125(4) is also able to communicate via internet/WAN 116 by way of public messaging services 170 and intranet 120(3). In order to support such communications, as well as other communications according to various embodiments, intranet 120(3) includes server systems 180, as well as (optionally) providing for a number of clients (not shown), in the manner of intranet 120(2). As will be appreciated in light of the present disclosure, such communications pathways can include (and are intended to comprehend) wired network connections (e.g., within an intranet such as one of intranets 120, or therebetween) and/or wireless network paths that include wireless communications (e.g., by way of wireless devices supporting IEEE 802.11 technology ("WiFi")). Further, with respect to the use of a combination of hardware and software in managing such communications, the associated computational workloads can be orchestrated such that those computational workloads are serviced at a point in the network that is physically and/or logically closer to the given user's device (or, in scenarios in which computational workloads can be divided, to points as close to that user's device as such orchestration of the given portion of the conversational workload will allow).

Server systems 180 include a number of components that allow server systems 180 to provide various functionalities (e.g., supporting various communications, web-based services, cloud-based services, enterprise services, and so on). Among these components, in certain embodiments, are a number of servers, which can be implemented in hardware and/or software. Server systems 180 includes a number of elements that allow server system 180 to support messaging communications according to embodiments of the present invention. Among these elements are one or more web servers (e.g., a web server 185), one or more route management servers (e.g., a route management server 190), one or more application servers (e.g., an application server 192), one or more database servers (e.g., a database server 194), and one or more communications servers (e.g., a communications server 196), among other possible such servers, in communication with one another. In the manner noted above, a distributed approach to the servers of server systems 180 can employ the aforementioned orchestration, such that each such server portion thereof is executed as a distributed application, with the orchestration thereof migrating such portions as may be advantageous to efficiently and effectively service the users' needs. For example, an instance of one or more of the servers of server systems 180 (and/or portions thereof) might be migrated to server 130(2) in order to better address the needs of a user employing a transport unit client application executed by client 125(3).

Servers such as those included in server systems 180 are designed to include hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with subsequent figures, the server systems of server systems 180 provide such functionality, for example by presenting end-users with a website (functionality effected by, for example, web server 185). In so doing, such web servers present information collected, generated, organized, and maintained in one or more distributed databases (DDB) and/or one or more unstructured databases, by one or more DDB servers such as database server 194, under the control of one or more application servers. Such a website can be accessed by an end-user using a client computing device such as one or more of clients 125(1)-(N), MVD client 140, HTTPS client 150, and/or SMS client 160. As will be appreciated in light of the present disclosure, the ability to support such functionality on mobile devices such as those described herein is of importance, as mobile communications and program management are fast becoming an important facet of today's business environment.

It will be appreciated that, in light of the present disclosure, variable identifiers such as "N" or "M" may be used in various instances in various of the figures herein to more simply designate the final element of a series of related or similar elements. The repeated use of such variable identifiers is not meant to necessarily imply any sort of correlation between the number of elements in such series. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Further, in light of the present disclosure, it will be appreciated that storage devices such as storage devices supporting server systems 180 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives, removable storage in a robot or standalone drive, and the like. Alternatively, it will also be appreciated that, in light of the present disclosure, such systems can include other components such as routers, firewalls, load balancers, and the like that are not germane to the discussion of the present disclosure and will not be discussed further herein. It will also be appreciated that other configurations are possible.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with this disclosure.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment. With regard to the servers described in connection with FIG. 1B and the potential of distributed processing, there exists the potential for employing distributed, multiple servers to achieve computational concurrency. This presents the possibility of each user of transport unit clients such as those described herein, in which machine learning inferencing described herein, the iterative summation techniques described herein, and other such techniques comparable to those described herein are orchestrated ever closer to (or even by) the transport unit client device.

The software modules described herein may be received by such a computer system, for example, from computer readable storage media. The computer readable storage media may be permanently, removably, or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits; volatile storage media including registers, buffers or caches, main memory, RAM, and the like; and other such non-transitory computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Example Architectures for Route Management Systems

Figure 2:
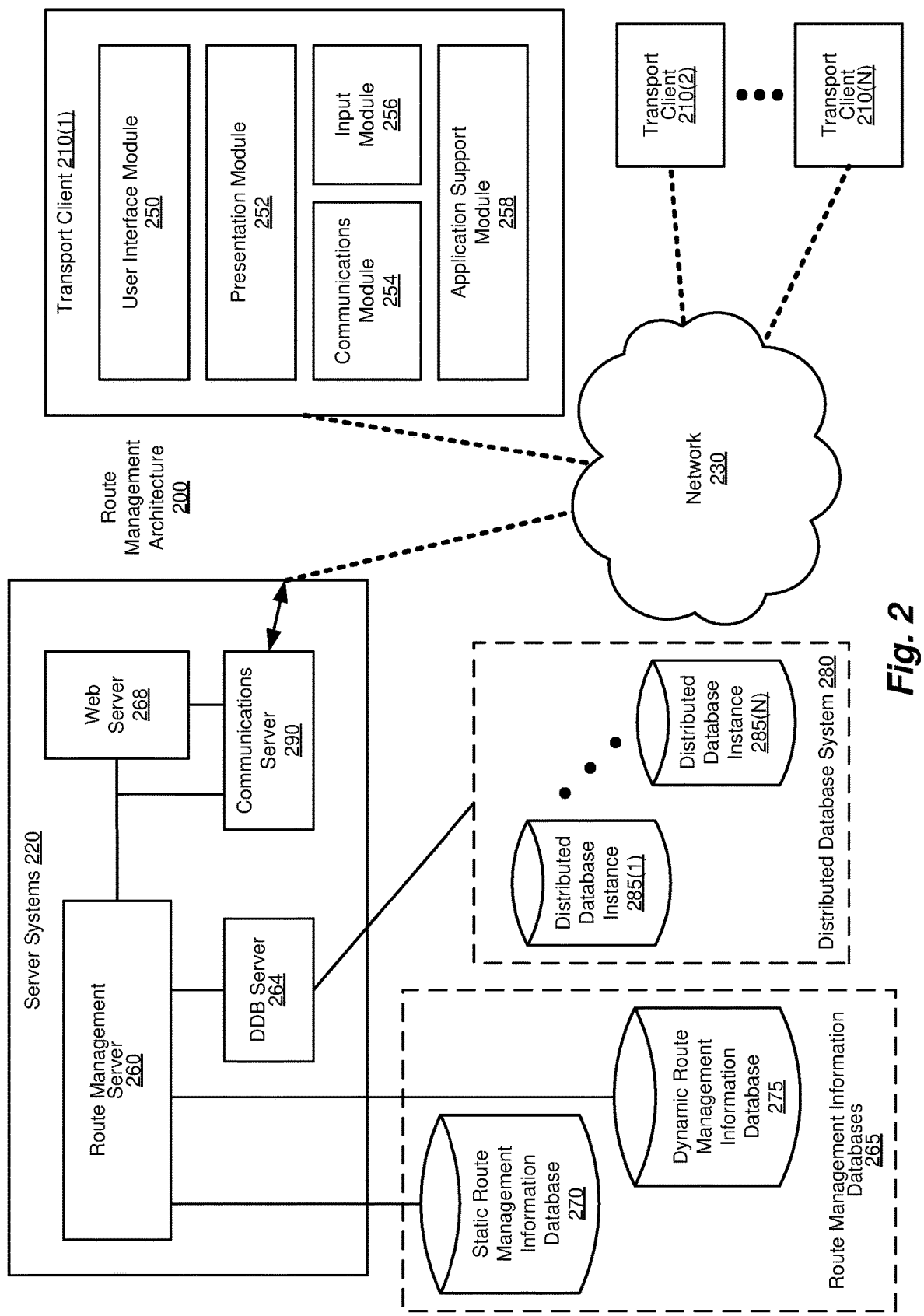
FIG. 2 is a block diagram illustrating an example of a route management architecture, according to methods and systems such as those disclosed herein.

FIG. 2 is a block diagram illustrating an example of a route management architecture, according to methods and systems such as those disclosed herein. The route management architecture of FIG. 2 (depicted in FIG. 2 as a route management architecture 200) presents a simplified illustration of the salient features of network architecture 115 with regard to certain aspects of methods and systems such as those disclosed herein. That being the case, route management architecture 200 is depicted as including a number of client computer systems (e.g., depicted in FIG. 2 as transport clients 210(1)-(N) (in the manner of clients 125(1)-(N), among other components of FIG. 1B), which are referred to in the aggregate as transport clients 210) and server systems (e.g., depicted in FIG. 2 as server systems 220 (in the manner of server systems 180), which are referred to in the aggregate as server systems 220). Transport clients 210 and server systems 220 can be communicatively coupled to one another in route management architecture 200 by some manner of communications network (e.g., depicted in FIG. 2 as network 230, which can employ one or more of the communication mechanisms depicted therein, and/or other digital and/or analog techniques). Each of transport clients 210 can include a number of components in order to provide functionality that supports various of the features of the methods and systems described herein. To that end, transport client 210(1) is shown as including a user interface module 250, which is supported by a presentation module 252. User interface module 250 and presentation module 252 serve to present a user of transport client 210(1) with a user interface that implements methods and systems such as those described herein. This allows, for example, the aforementioned visual presentation of current and predicted transport unit route information (e.g., video, audio, messages, and/or the like, individually or in appropriate combination) in a user interface displayed on a display of transport client 210(1) (implemented, e.g., by way of a computer or mobile device). Transport client 210(1) also includes functional modules (which can be implemented in hardware, software, or a combination thereof) that implement various of the functionalities presented to the user by way of user interface module 250 and presentation module 252. For example, such functional modules can include a communications module 254, an input module 256, an application support module 258, and other such modules, as may be implemented in support of the aforementioned functionalities.

In operation, transport communications are supported via communications module 254, and then presented in the user interface displayed by a display of transport client 210(1) by way of presentation module 252 and user interface module 250. In the scenario in which a screen event occurs, routing information regarding such an occurrence can be communicated to one or more servers of server systems 220, in a manner according to methods and systems such as those described herein. Such an event can be used as input to be gathered by a module such as input module 256. As will be appreciated, such input can, for example, reflect a transport unit's load (e.g., full, empty, percent-full, percent-empty, and so on), location, functional status (in-process, at depot, in route to/from depot, delayed, out-of-service, and so on), and/or other information regarding the transport unit, with loads being items, materials, energy (whether some manner of liquid/solid fuel, electricity, or other such form), or the like.

During the display of route information (e.g., as in the case of a transport unit currently delivering/picking up distributables/collectables), user input received in the user interface presented by user interface module 250 and presentation module 252 can be received by application support module 258. As will be appreciated, communications module 254 and application support module 258 can communicate with the servers of server systems 220 via network 230, for example, in providing the route management functionality described herein.

In turn, and in the manner of various of the components described in connection with FIG. 1B, server systems 220 can include, for example, a route management server 260, a DDB server 264, and a web server 268, variously in communication with one another. Server systems 220 are supported by a number of databases storing various information in support of the functionality provided by server systems 220 to transport clients 210 via network 230. These databases (depicted in FIG. 2 as route management information databases 265, which can store route management information such as static route management information, dynamic route management information, and other route management information) can include, for example, a static route management information database 270 and a dynamic route management information database 275. Databases supporting server systems 220 can also include one or more distributed databases (e.g., depicted in FIG. 2, in the aggregate, as distributed database (DDB) system 280, and more specifically, as a number of distributed database (DDB) instances 285(1)-(N), referred to in the aggregate as DDB instances 285). As will be appreciated from the present disclosure, distributed database system 280 can be used to support server systems 220 by facilitating the storage of large amounts of data, as can be encountered in the use of geographic information systems data, map data, and the like by route management architecture 200.

Static route management information database 270 can be used to maintain, for example, static route management information for use by route management server 260 in managing the initial routing and static rerouting of transport units managed by route management architecture 200 (referred to herein as static routing and static rerouting, indicating the routing performed during the normal operations of a collection/distribution system, including the initial determination of routes and the rerouting of transport units in their normal operation (e.g., upon such transport units becoming empty as a result of having delivered their load (distribution) or full as a result of having collected their load to full capacity (collection))). As is described subsequently, such static route management information can include historical information regarding routes taken by transport units, historical traffic patterns, performance (e.g., in the form of delivery times, collection times, delays, fuel consumption, transport unit operator behavior, and the like), and other such historical data. Static route management information can also include logistics and transport fleet information, such as the number of transport units, the size of those transport units, and maintenance schedules for the transport units, as well as the location and capacity of the depot(s) involved, among other such aspects. Historical information regarding customer service level demands, customer locations, delivery time windows, regulations and restrictions, and other such constraints can also be considered (and used in dynamic, as well as static, route rerouting processes). In this regard, predictions as to such factors (e.g., as can be generated using machine learning techniques such as those described subsequently) can be considered as well. Such information can be used to provide embodiments of a routing system according to the present disclosure with a basis for the routing system to make decisions regarding the routing of transport units, as is described subsequently herein.

Static route management information database 270 can be implemented using, for example, a document-oriented database (storing route management information in a textual format), or document store (a computer program designed for storing, retrieving and managing unstructured data such as document-oriented information (which can be referred to as, for example, semi-structured data) and other constructs that can be used to implement/represent routing information). Such a database can be implemented as a type of "NoSQL" database (a "Not only SQL" database, where the term SQL refers to Structured Query Language used in relational databases), and which refers to the fact that such databases extend beyond the use of tabular information, as in a traditional relational database (RDB). Whereas a relational database is a collection of information that organizes data in predefined relationships in which data is stored in one or more tables (or "relations") of columns and rows, easing the tasks of visualizing and interpreting the manner in which the RDB's different data structures relate to one another, at the expense of the structured used in implementing such database architectures.

Such a document-oriented database can be implemented, more specifically, as one or more databases that accept documents in JavaScript Object Notation (JSON; being a subclass of document-oriented databases that are optimized to work with JSON, a lightweight data-interchange format), extended markup language (XML; being a subclass of document-oriented databases that are optimized to work with XML documents) or graph databases (which are similar, but add another layer, the relationship, which allows them to link documents for rapid traversal). Such document-oriented databases are inherently a subclass of the key-value store, which is another NoSQL database concept. One difference is the manner in which the data is processed: in a key-value store, the data is considered to be inherently opaque to the database, whereas a document-oriented system relies on internal structure in the document in order to extract metadata that the database engine uses for further optimization. Such a document database, for example, can store all information for a given object in a single instance in the database, and every stored object can be different from every other, thus eliminating the need for object-relational mapping while loading data into the database. In the present application, implementing static route management information database 270 in the aforementioned manner facilitates the storage and maintenance of unstructured information used by route management systems such as those described herein (e.g., information in a variety of formats that can include machine learning parameters (e.g., weights and biases), iterative summations, thresholds, the structure of directed graphs, edge weights for such directed graphs, route information, routing information, route management information, distribution/collection goals, and other such unstructured data, as is described in greater detail elsewhere herein).

In certain embodiments, route management information such as routing information is stored in one or more traditional structured databases. Such databases are organized collections of data or a type of data store based on the use of a database management system. Such database management systems may be classified according to the database models supported. For example, as noted earlier, a relational database can be used to maintain route management information, modeling data (e.g., routing information) as rows and columns in a series of tables and using structured query language (SQL) for writing and querying data (as opposed to the aforementioned NoSQL databases, which use different query languages).

Similarly, route management information databases 265 are depicted as including dynamic route management information database 275, which can be used to maintain, for example, dynamic route management information for use by route management server 260 in managing the rerouting of transport units managed by route management architecture 200 (referred to herein as dynamic rerouting, indicating the routing performed during events (e.g., equipment failures, accidents, etc.), conditions (e.g., traffic congestion currently being experienced, inclement weather currently being experienced, etc.), and other circumstances (e.g., labor strikes, fuel shortages, etc.) outside the normal operations of a collection/distribution system, including dynamic values of parameters that represent such circumstances (also referred to herein as unpredictable circumstances) that can be used in the dynamic determination of routes and the rerouting of transport units in such circumstances). As is described subsequently, such dynamic route management information can include information regarding current traffic conditions (e.g., traffic congestion, accidents, road closures, and other occurrences affecting traffic that might be encountered by the transport units), current weather conditions (including the effects of such weather conditions on roadways), demand updates (e.g. new customer requests, order cancellations, order changes, or the like), vehicle status updates (e.g. vehicle breakdowns, fuel levels, and the like), transport unit operator availability and performance, and other such considerations. Such information can be used to inform embodiments of a routing system according to the present disclosure of changing conditions that may affect the routing system's routing of transport units, as is described subsequently herein.

As will be appreciated in light of the present disclosure, dynamic route management information databases such as dynamic route management information database 275 can employ databases architectures such as those described in connection with static route management information database 270. Further, while static route management information database 270 and dynamic route management information database 275 can employ the same or similar database architectures, such need not be the case-static route management information database 270 could use a relational database architecture, while dynamic route management information database 275 used a text-based semi-unstructured database architecture. Such might be the case where the static data in static route management information database 270 was regular in nature and changed infrequently (and so the tables storing such information were not constantly being access and/or updated), while the dynamic data stored in dynamic route management information database 275 was irregular in nature and subject to potentially frequent and (at least potentially) unpredictable changes.

With reference to the aforementioned communications with transport clients 210, it will be appreciated, in light of the present disclosure, that a user interface presented by user interface module 250 and presentation module 252 can be generated, for example, by web server 268, in conjunction with its interactions with route management server 260, via a communications server 290. In such embodiments, route management server 260 provides the requisite routing and other information to web server 268 to serve to transport clients 210 as one or more web pages. Route management server 260 can also (or alternatively) provide such information to transport clients 210, for example, by way of a communications server 290 in communication with, for example, communications module 254 of transport client 210(1).

As will be appreciated, in providing such "back-end" functionality, route management server 260 accesses the various databases of route management architecture 200 databases (e.g., route management information databases 265 and, via DDB server 264, DDB system 280, respectively) in order to provide the requisite information to route management server 260. In route management architecture 200, DDB instances 285(1)-(N) maintain detailed (and thus, voluminous) information regarding locations, customers, loads, and other information, and so facilitate support of the requisite volume of transactions (communications regarding a given location, a given load, a given transport unit, and so on) in support of the transport units relying on route management system 200.

As will be apparent in view of the description of FIG. 2, as well as those of other of the figures, the components of route management architecture 200 and their interconnection (and so, intercommunication) are such that the functionalities described herein are presented in a user interface at a client computing device such as transport client 210(1), in a user interface produced by user interface module 250 and presentation module 252, as noted. As also noted, communications module 254, input module 256, and application support module 258, among others, are designed in a manner to support such functionalities. Route management server 260 (as well as various components corresponding thereto, as described in connection with subsequent figures) can also provide functionality that allows transport clients 210 to interact directly with both static route management information database 270 and dynamic route management information database 275 of route management information databases 265, as well as DDB system 280 (by way of DDB server 264; which can be used to maintain (potentially) voluminous information such as that described earlier, such as transport unit information, user information, organization information, customer information, event information, conditions information, session information, and other such relevant information as may be advantageous to the support and operation of the systems of route management architecture 200, in providing the functionality described herein). Further, static route management information database 270 and dynamic route management information database 275 can maintain information that includes one or more parameters for the routing algorithms discussed subsequently, as well as parameters used in the operation of the machine learning systems described subsequently.

Figure 3:
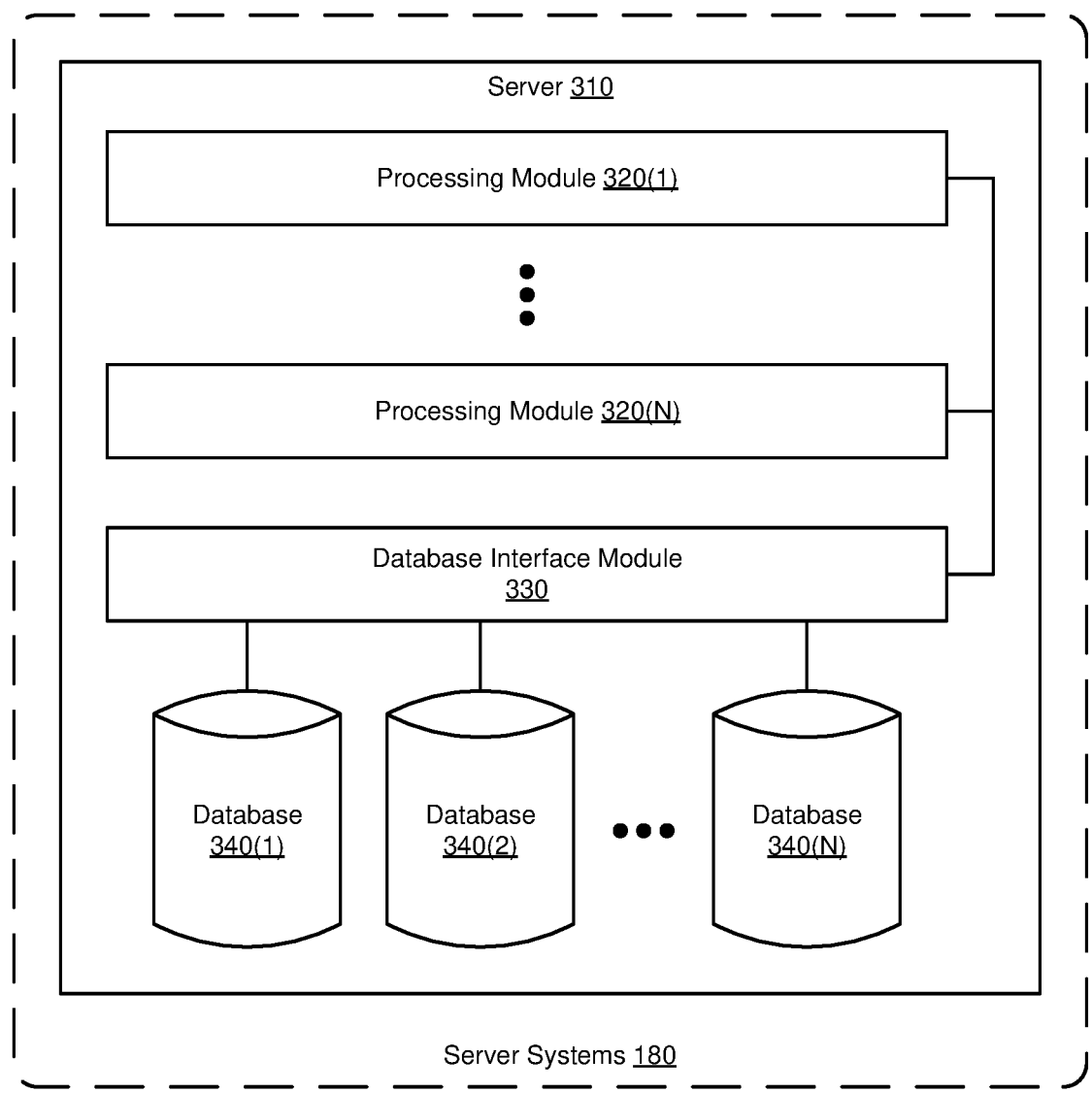
FIG. 3 is a block diagram illustrating an example of a generic database server architecture, according to methods and systems such as those disclosed herein.

FIG. 3 is a block diagram illustrating an example of a generic server architecture, according to methods and systems such as those disclosed herein. FIG. 3 thus depicts a generic server architecture 300 that can be used to implement one or more of the server systems of server systems 180. A server of server systems 180 (depicted in FIG. 3 as a server 310) will thus include, typically, a number of components that support the maintenance and retrieval of digital information. For example, such components can include one or more processing modules (depicted in FIG. 3 as processing modules 320(1)-(N), a database interface module (depicted in FIG. 3 as a database interface module 330), and one or more databases (depicted in FIG. 3 as databases 340(1)-(N)). Generally, databases 340(1)-(N) store digital information pertinent to the processing performed by processing modules 320(1)-(N). Database interface module 330 provides one or more of processing modules 320(1)-(N) with access to databases 340(1)-(N). Additionally, database interface module 330 can provide other servers of the given server systems, as well as other components of the distributed manufacturing system, with access to databases 340(1)-(N). As noted, an example of such access is depicted in FIG. 2B by the various communications paths illustrated therein.

Figure 4:
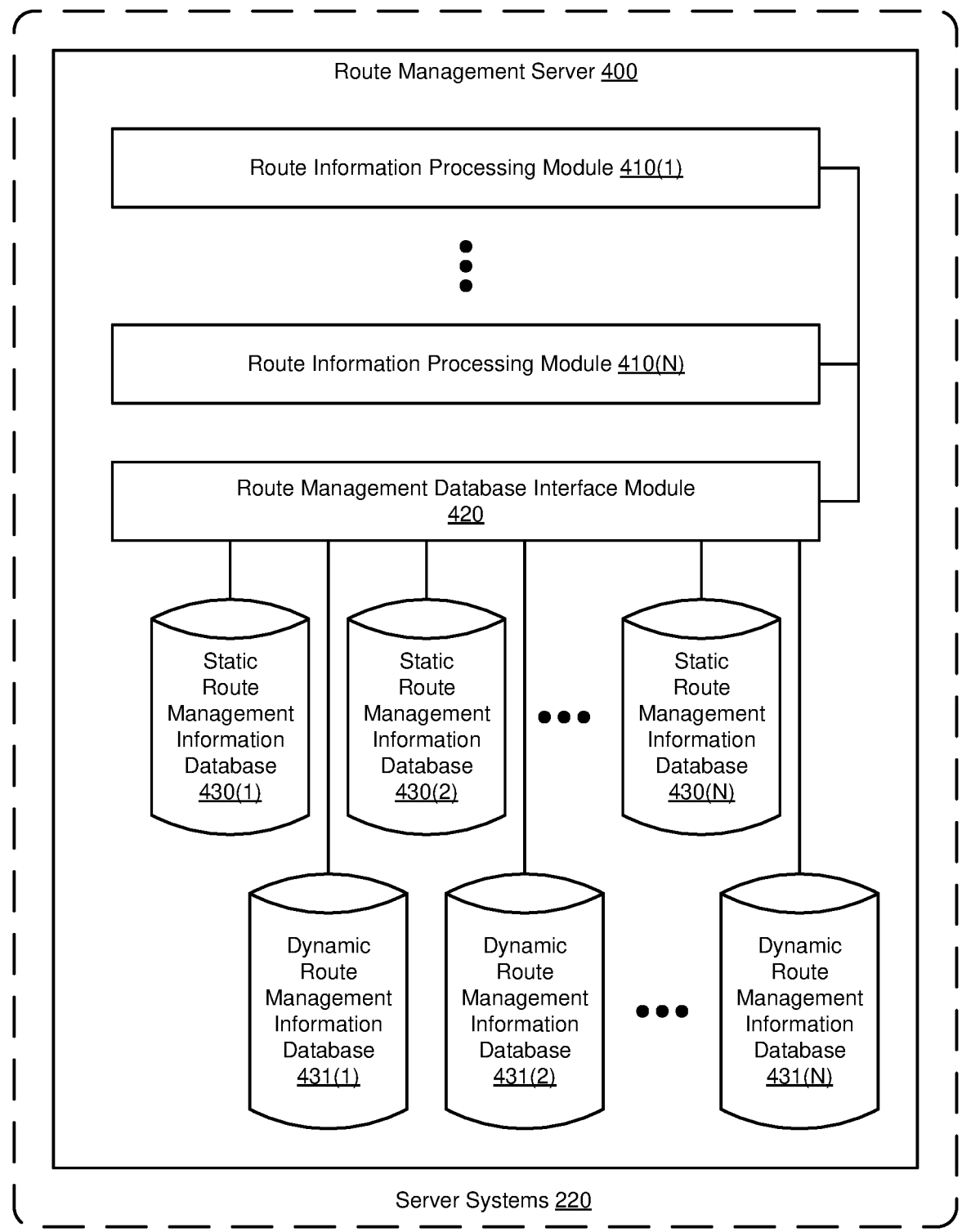
FIG. 4 is a block diagram illustrating an example of a route management server architecture, according to methods and systems such as those disclosed herein.

FIG. 4 is a block diagram illustrating an example of a route management server, according to methods and systems such as those disclosed herein. In the manner of generic server architecture 300, a route management server of server systems 220 is depicted as a route management server 400. In the manner of generic server architecture 300, then, route management server 400 includes one or more route information processing modules (depicted in FIG. 4 as route information processing modules 410(1)-(N)), a number of route management databases (depicted in FIG. 4 as static route management databases 430(1)-(N) and dynamic route management databases 431(1)-(N), referred to in the aggregate as static route management databases 430 and dynamic route management databases 431, respectively), and interfacing such route information processing modules and route management databases, a route management database interface module (depicted in FIG. 4 as a route management database interface module 420). As noted in connection with FIG. 2, the components of route management server 400 support clients, such as transport clients 210 of FIG. 2, by maintaining routing and other information, as may be generated, maintained, and/or communicated by a route management server such as route management server 260 of FIG. 2. To this end, route management database interface module 420 can provide other servers of server systems 220, as well as other components of the route management system, with access to route management databases, as well as information ingested from external sources (e.g., for information regarding weather, traffic, and other information). For example, as depicted in FIG. 2, route management database interface module 420 can provide route management information to route management server 260 with access to static route management databases 430 and dynamic route management databases 431 via communication paths such as those depicted in FIG. 2. Further, in certain embodiments, static route management databases 430 store only static route information (e.g., information used in the normal operation of a route management system such as that described herein (which may or may change during such normal operations (e.g., which transport units are empty/full in distribution/collection, respectively))), and so, need not be updated with information from external sources. In certain such embodiments, dynamic route management databases 431 store dynamic route information (e.g., information that is expected to be updated regularly or intermittently, as circumstances develop during the operation of the route management system (e.g., traffic, accidents, weather, and other circumstances)). In such embodiments, the information maintained in dynamic route management databases 431 can be accessed (e.g., directly or via route management database interface module 420) to provide dynamic update of the information stored therein.

Figure 5:
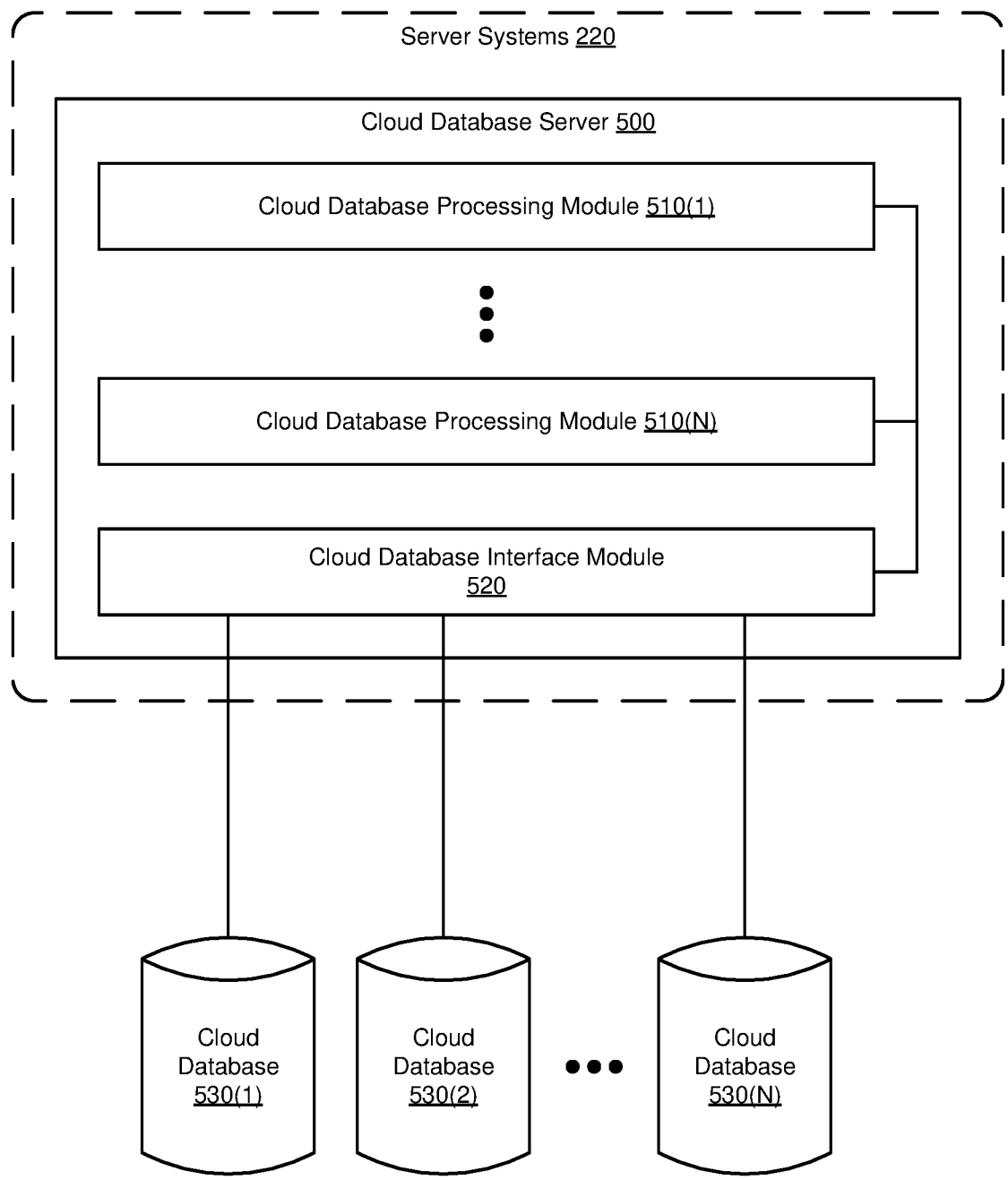
FIG. 5 is a block diagram illustrating an example of a cloud database server architecture, according to methods and systems such as those disclosed herein.

FIG. 5 is a block diagram illustrating an example of a cloud database server, according to methods and systems such as those disclosed herein. In the manner noted, server systems 220 can also include one or more cloud database servers, an example of which is depicted in FIG. 5 as a cloud database server 500. Cloud database server 500 includes one or more cloud database processing modules (depicted in FIG. 5 as cloud database processing modules 510(1)-(N)), which interface with one or more cloud database clients such as cloud database clients 230 of FIG. 2. Cloud database processing modules 510(1)-(N) can be implemented to support the implementation of one or more databases maintaining routing and other information for use by route management server 260 of FIG. 2, in the manner mentioned earlier, for example. Further, cloud database processing modules 510(1)-(N) can support user-defined cloud databases and/or the like.

In turn, cloud database processing modules 510 interface via a cloud database interface module 520, with one or more cloud databases (depicted in FIG. 5 as cloud databases 530(1)-(N), and referred to in the aggregate as cloud databases 530). Cloud databases 530 maintain digital information regarding routing information that is or can become voluminous (e.g., transport unit information, user information, organization information, customer information, event information, conditions information, session information, and other such route information as may be relevant to the support and operation of a route management system such as that described herein). In addition to cloud database processing modules 510 being able to communicate with one another, cloud database processing modules 510 are able to maintain digital information in one or more cloud databases 530 via cloud database interface module 520. In depicting server systems 220 as shown in FIG. 5, it is to be appreciated that, while cloud databases 530 will typically be situated "in the cloud" (e.g., in an offsite data center), some or all of the remaining infrastructure of server systems 220 (e.g., cloud database server 500) may also be situated "in the cloud" (e.g., in the aforementioned data center, another such data center, or elsewhere). Additionally, cloud database interface module 520 can provide other servers of server systems 220, as well as other components of the subject information system, with access to cloud databases 530. For example, as depicted in FIG. 2, cloud database interface module 520 provides route management server 270, subject information server 272, and web server 278 with access to cloud databases 530 via one of the two communication paths depicted therein.

Information maintained by one or more servers such as cloud database server 500 can include, for example, route information used by route management server 260 in maintaining and managing the routing and other information provided to transport clients 210. As with static route management information database 270 and dynamic route management information database 275 of route management information databases 265, as well as well as the database instances of DDB system 280, cloud databases 530 can be implemented using relational (SQL), NoSQL, distributed, or other database architectures.

For example, a document-oriented database such as a document store (a computer program designed for storing, retrieving and managing unstructured data such as document-oriented information (which can be referred to as, for example, semi-structured data) and other constructs that can be used to implement/represent the relevant communications) can be used to store route information, certain transport unit information, customer information, and so on. As noted, implementing such databases in this manner facilitates the storage and maintenance of unstructured information used by route management systems such as those described herein (e.g., information in a variety of formats that can include subject information, testing information, certification information in a variety of formats (providing for the reporting of information in narrative formats, various image and document formats, and other types of information), and other such unstructured data, as is described in greater detail subsequently, and allowing for such information to be searched and identified quickly and efficiently).

Figure 6:
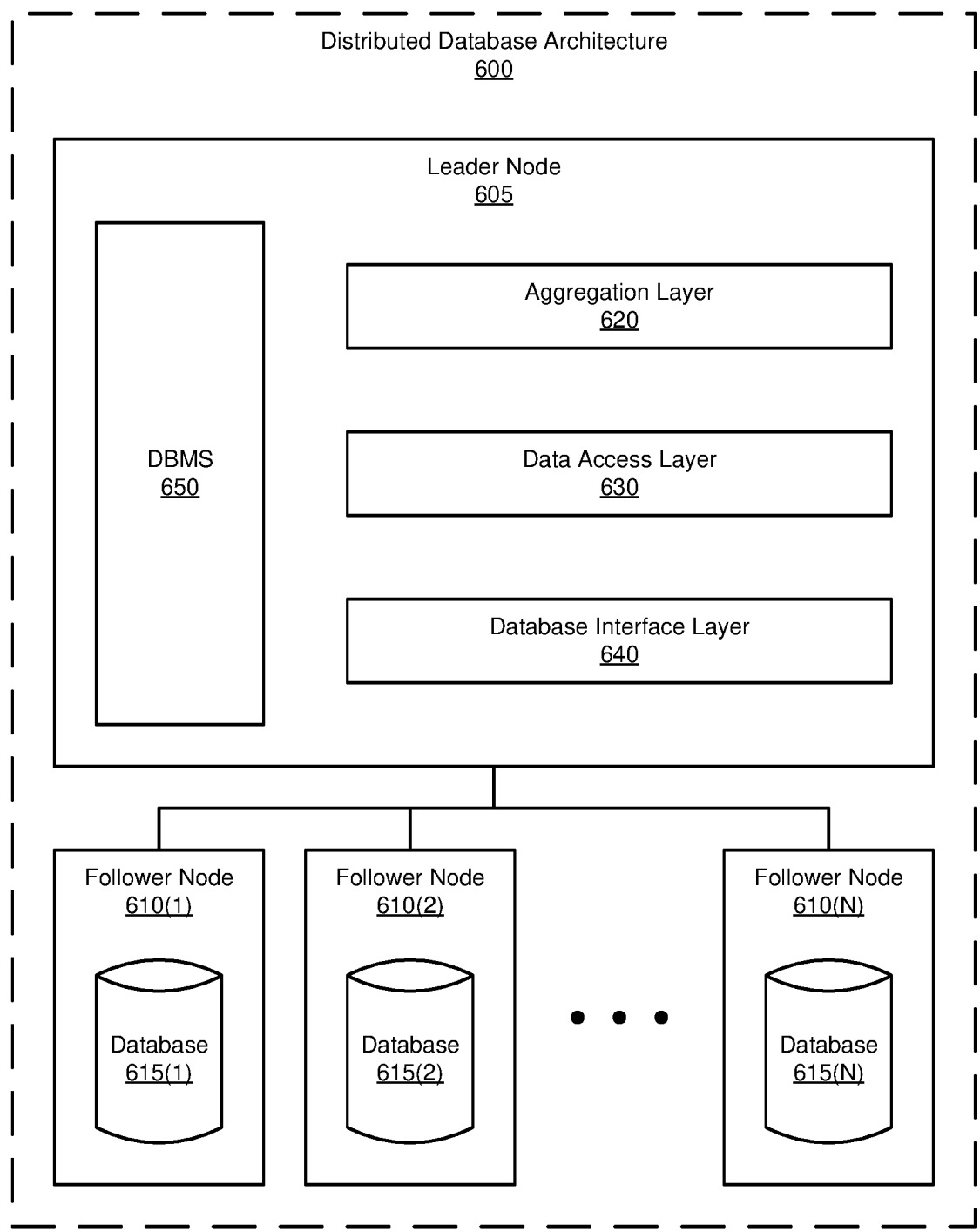
FIG. 6 is a block diagram illustrating an example of a distributed database architecture, according to methods and systems such as those disclosed herein.

FIG. 6 is a block diagram illustrating an example of a distributed database architecture, according to methods and systems such as those disclosed herein. The database server architecture of FIG. 6 (depicted in FIG. 6 as a distributed database (DDB) architecture 600) is an example of a database architecture that can be employed to implement DDB server 264 and DDB system 280 of FIG. 2. DDB architecture 600 can include, for example, one or more leader nodes (e.g., depicted in FIG. 6 as a leader node 605) and some number of follower nodes (e.g., depicted in FIG. 6 as follower nodes 610(1)-(N), and referred to in the aggregate as follower nodes 610). Follower nodes 610, in turn, can include one or more databases (e.g., depicted in FIG. 6 as databases 615(1)-(N), and referred to in the aggregate as databases 615). As noted, a distributed database architecture such as DDB architecture 600 can be used to store and maintain a variety of information useful to the management of transport unit routing, as is described in greater detail subsequently. As will be appreciated in light of the present disclosure, follower nodes 610 can, in fact, be situated at one or more remote sites (in certain architectures, referred to as being "in the cloud," as noted), each of follower nodes 610 can host one or more distributed database instances (e.g., one or more of DDB instances 285).

Returning to leader node 605, leader node 605 (as an example of DDB server 264) includes an aggregation layer 620, a data access layer 630, and a database interface layer 640. As is also depicted in FIG. 6, a database management system (DBMS) 650 can be implemented, for example, in leader node 605, and act to manage various of the components of DDB architecture 600, thereby supporting the distributed nature of DDB architecture 600. As will be appreciated in view of the present disclosure, a distributed database is a database in which storage devices are not all attached to a common processor. Such a distributed database may be stored in multiple computers (e.g., located in the same physical location) or may be dispersed over a network of interconnected computers. Unlike parallel systems, in which the processors are tightly coupled and constitute a single database system, a distributed database system consists of loosely coupled sites that share no physical components. System administrators can distribute collections of data (e.g. in a database) across multiple physical locations. A distributed database can reside on organized network servers or decentralized independent computers on the Internet, on corporate intranets or extranets, or on other networks. Because distributed databases store data across multiple computers, distributed databases can improve performance at end-user worksites by allowing transactions to be processed on many machines, instead of being limited to one.

An aggregation layer such as aggregation layer 620 facilitates the gathering and organization of information from various information sources appropriate to the information administered and maintained by server 605. For example, in certain embodiments, components within an aggregation layer of a distributed database server, as might be implemented to support a subject information server such as that described herein, receive and organize various information from one or more transport clients such as transport clients 260 and various of the systems of server systems 220. Components within an aggregation layer of a server such as a DDB server 264 receive and organize information regarding various aspects of such systems, such as the various modes of communication noted. As will be appreciated in light of the present disclosure, such aggregation layers also provide, in turn, functionality that supports distribution of information such as that maintained in the databases or their respective servers.

Situated between aggregation layer 620 and database interface layer 640 is data access layer 630, which supports storage/retrieval of aggregated data to/from one or more databases. Data access layer 630 facilitates such storage/retrieval by using a common structure to sink and source such aggregated data. Data access layer 630 facilitates access to such databases (depicted in FIG. 6 as databases 615(1)-(N)) via database interface layer 640. Database interface layer 640 facilitates communication of aggregated data using the common structure to databases 615(1)-(N) in a structure appropriate to each of databases 615(1)-(N) and/or to databases 615, collectively. As noted, and with particular regard to the discussion of FIG. 2, an arrangement such as database server architecture 600 can be used in the implementation of servers such as DDB server 264. To this end, an aggregation layer such as aggregation layer 620 supports the collection of information from multiple sources (e.g., communications from/to route management server 260, transport clients 210, and so on), and provides such information for storage in a respective database, via a data access layer such as data access layer 630 (which produces aggregated data in a common structure for storage, and receives data in the common format when retrieving such data) and a database interface layer such as database interface layer 640 (which takes in the aggregated data in the common structure and produces data in a structure appropriate to the database into which the data is to be stored, and conversely, provides data in the common structure when retrieving such data). Such an architecture, in turn, supports the retrieval of such data by route management server 260 and transport clients 210, via DDB server 264.

Figure 7:
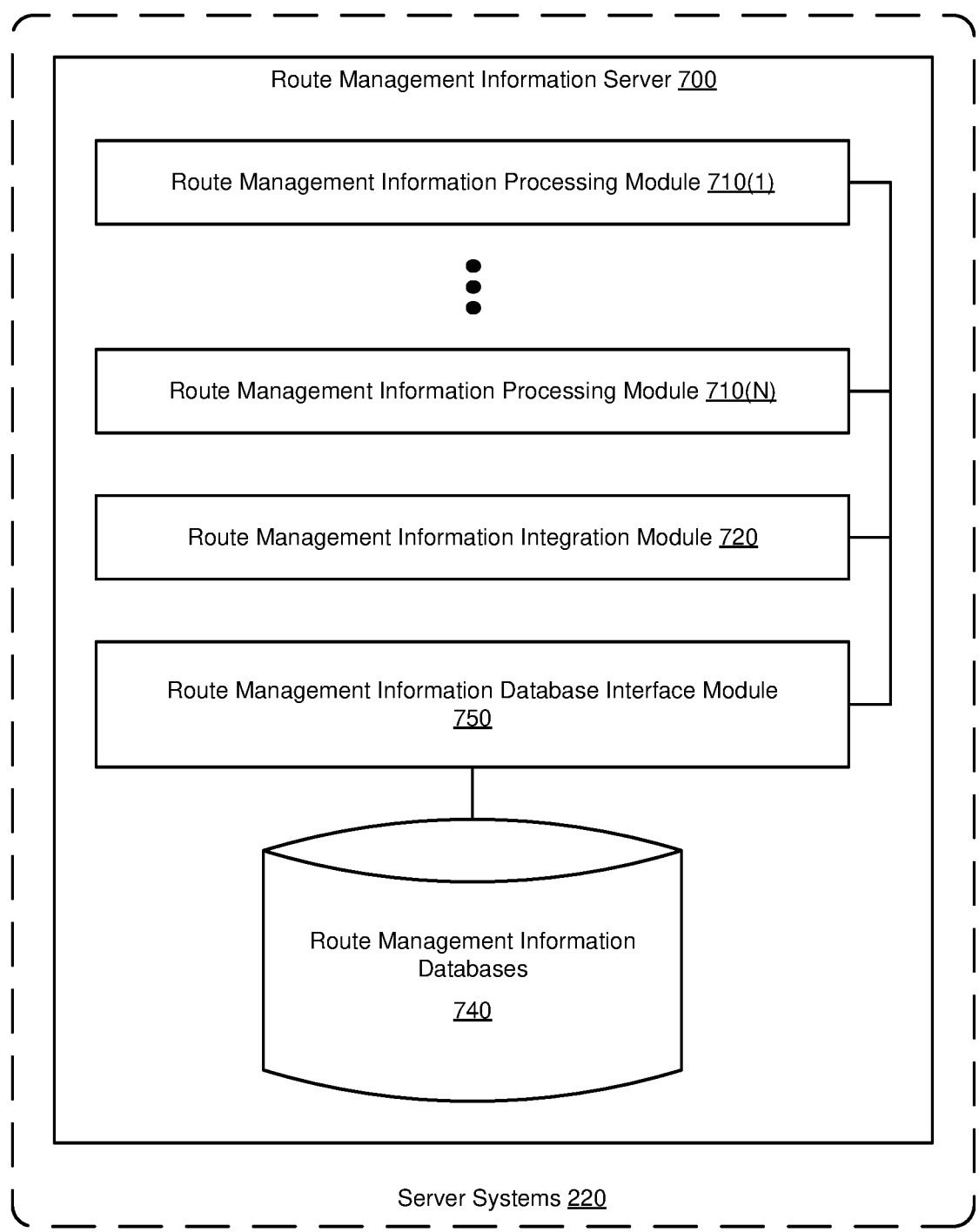
FIG. 7 is a block diagram illustrating an example of a route management information server architecture, according to methods and systems such as those disclosed herein.

FIG. 7 is a block diagram illustrating an example of a route management information server, according to methods and systems such as those disclosed herein. Another server that can be included in server systems 220 is a route management information server (depicted in FIG. 7 as a route management information server 700). Subject information server 700 can include a number of components, among them, for example, one or more route management information processing modules (depicted in FIG. 7, as route management information processing modules 710(1)-(N)), one or more route management information integration modules (depicted in FIG. 7 as route management information integration modules 720), and one or more route management information databases (depicted in FIG. 7 as route management information databases 740), accessed via a route management information database interface module (depicted in FIG. 7 as a route management information database interface module 750). It will be appreciated that route management information databases 265 of FIG. 2 can be implemented as route management information databases 740, with FIG. 7 depicting such an implementation in greater detail.

To this end, route management information database interface module 750 can provide other servers of server systems 220, as well as other components of the route management systems (e.g., transport clients 210), with access to route management information database 740 for purposes of maintaining the information stored therein. It is to be appreciated that, while not shown in FIG. 2, route management information server 700 can be tasked with maintaining the information stored in route management information databases 740 from an administrative perspective, in such embodiments. For example, whereas route management server 260 of FIG. 2 is tasked with making determinations as to static and dynamic routing and rerouting of transport unit routes, route management information server 700 can be implemented to separately facilitate administrative operations (e.g., adding/deleting customers (customer accounts), adding/deleting transport units, performing inventory functions, updating mapping information (e.g., adding new streets, traffic control devices (e.g., new stoplights and so on), and the like), and other such administrative operations). In such embodiments, it is to be appreciated that routing information and the like (indicating the route a given transport unit should follow) can be distinguished from route information (information regarding aspects of a given route (e.g., information regarding the various stops along a given route (customer accounts, physical addresses, billing information, distributables/collectables to be delivered/collected), and so on). Such administrative operations can extend to route information received from transport units via transport clients, such as the reporting of road closures, road openings, new traffic control devices, failed traffic control devices, and so on.

As will be appreciated in light of the present disclosure, then, route management information (including routing information) and route information can be maintained separately by way of their respective servers, and subsequently integrated by a route management server such as route management server 260. In such embodiments, route management information processing modules such as route management information processing modules 710 can aggregate the requisite digital information from the appropriate sources (e.g., external sources (e.g., US Postal Service address databases, geographic information system, and the like), information received from transport units via transport clients, and so on), and integrate the digital information thus retrieved by way of an information integration module such as route management information integration module 720. Having assembled the requisite digital information, route management information server 700 can (e.g., through communications between route management information integration module 720 and route management information database interface module 750) facilitate the maintenance of such information in route management information database 740, as well as promulgation of such digital information (particularly changes) by way of a communications server such as communications server 280 of FIG. 2, for subsequent distribution to the appropriate destination(s) (e.g., transport clients 210).

Example Processes for Route Determination

Figure 8A:
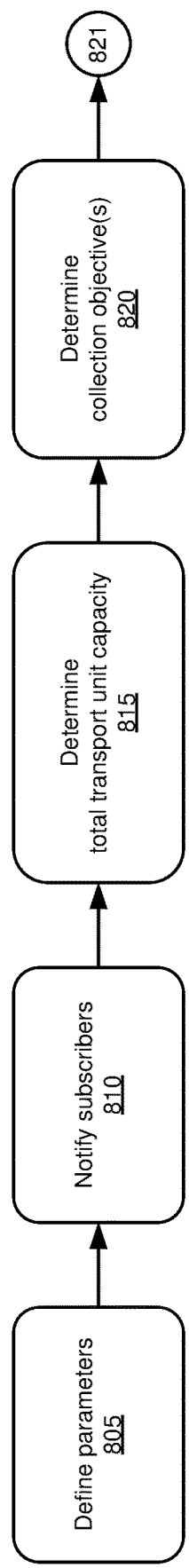
FIGS. 8A, 8B. 8C, and 8D are a simplified process diagrams illustrating an example of operations that can be performed in managing the routing of transport units conveying items and/or materials, according to methods and systems such as those disclosed herein.
Figure 8B:
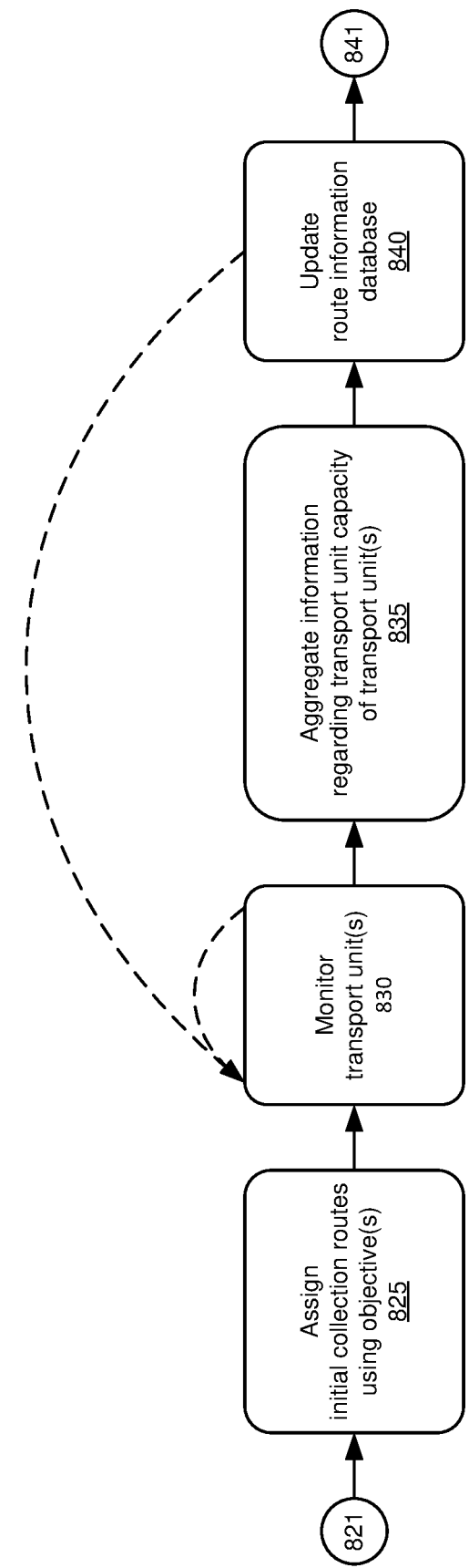

FIGS. 8A, 8B. 8C, and 8D are a simplified process diagrams illustrating an example of operations that can be performed in managing the routing of transport units conveying items and/or materials, according to methods and systems such as those disclosed herein. FIGS. 8A, 8B. 8C, and 8D thus depict examples of operations that can be performed in effecting a route management flow according to embodiments such as those described herein (and depicted in FIGS. 8A, 8B. 8C, and 8D as a route management flow 800). Route management flow 800 begins in FIG. 8A with the definition of route management parameters (805). Such route management parameters can include definitions of collection areas and locations, delivery areas and locations, times or time periods for such collections/deliveries, and other such parameters, as well as information regarding the algorithm(s) to be used, constraints to be placed on such algorithms, parameters for such algorithms, and the like.

Subscribers (e.g., customers) are notified of the initial planned routes transport units will be taking in the distribution/collection of distributables/collectables (810). Such notification can include information regarding the times/time periods, the collection volumes, the ability for customers to opt in/out of service, and other such information. Further, such notification can take into account collection/delivery constraints and the like, as well as being subject to constraints such as service level agreements. In the example presented as route management flow 800, a collection process is described. That being the case, the total transport unit capacity is determined (815). As noted subsequently, such information can have bearing on the overall load experienced by the transport system and the transport system's ability to properly service the needs of the customers being serviced. Also determined are one or more collection objectives (820). Such collection objectives can serve as a starting point for further analysis, as well as acting as constraints with respect to routing outcomes of the analyses described subsequently. As will be appreciated in light of the present disclosure, such collection objectives, as well as other goals of a route management system according to embodiments such as those described herein can be employed to both constrain and define those outcomes, and iteratively refine such outcomes to improve overall route management system and transport unit service efficiency. Information considered during such a process can include expected costs (e.g., in terms of time, fuel, manpower, environmental impacts, customer satisfaction, and other such considerations), timing requirements (e.g., scheduling), completeness of coverage, the implementation of priority service areas, and other such considerations.

Moving on to FIG. 8B (via connector 821), initial collection routes are assigned using the collection objectives determined above (825). From the perspective of collection (or distribution), such objectives can be seen to exist in a problem space where parameter values can be initially selected based on historical experience (historical route information), expectations of initial conditions (including route predictions generated using machine learning techniques), and other such constraints and information. Further, techniques can be employed to avoid local minima and maxima (e.g., metaheuristics in local searches when using a genetic algorithm with mutation processes, local searching techniques when using ant colony optimization, and other such techniques, as discussed in greater detail subsequently).

At this juncture, the transport units collecting the collectables in question are monitored as those transport units perform transport operations along the determined routes (830). As part of the transport operations performed by the transport units, information regarding transport unit capacity for each of the transport units is aggregated (835). One or more route information databases can then be updated using this information (840). In so doing, transport unit capacity information can be updated in an iterative manner (such iteration represented in FIG. 8B by the dotted lines appearing therein) and its effects on routing considered.

Figure 8C:
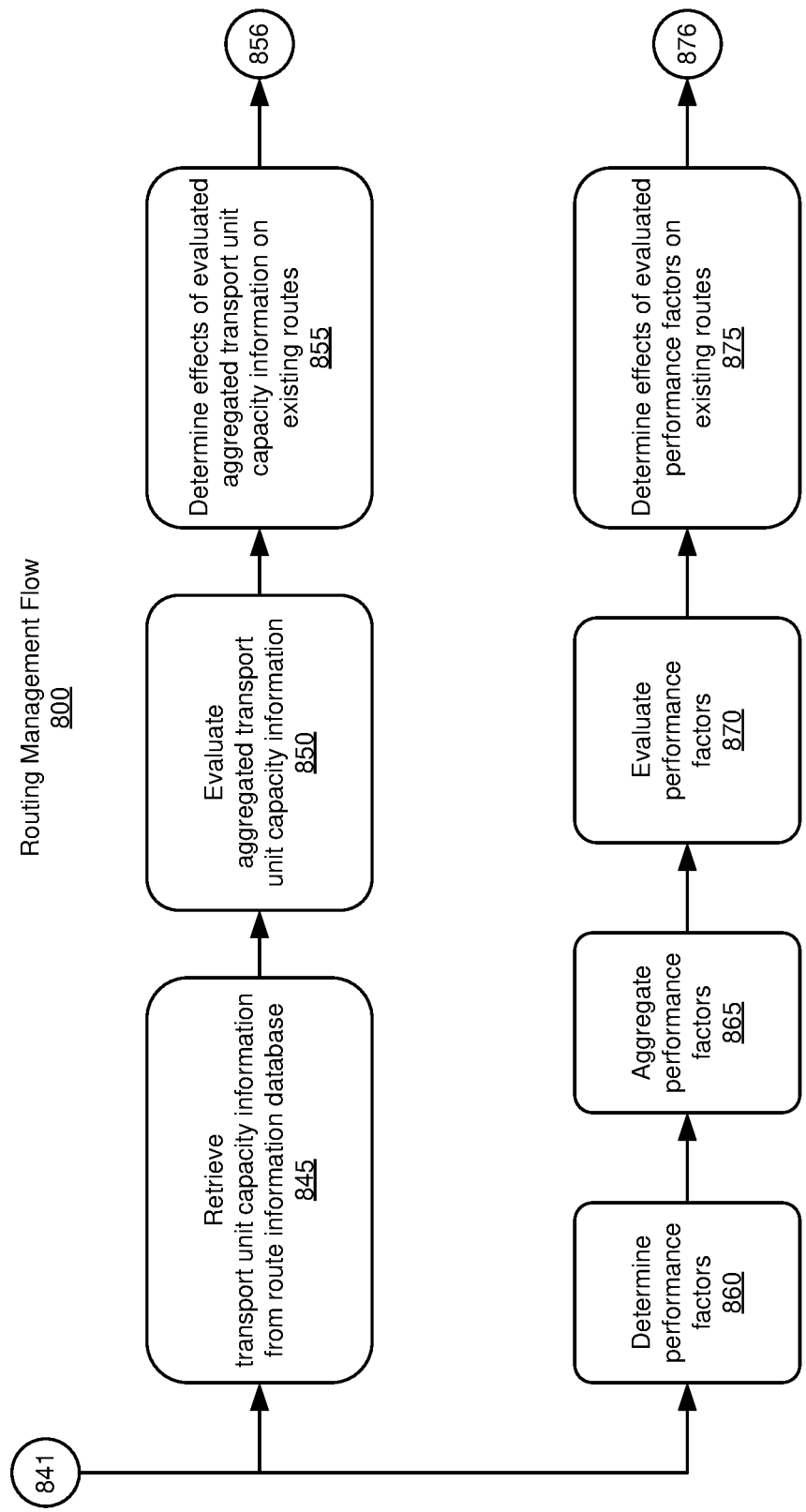

Moving on to FIG. 8C (via connector 841), two sets of operations (referred to herein as operational tracks) can be performed. In the first, transport unit capacity information is retrieved from the route information database, as updated earlier (845). The transport unit capacity information thus aggregated is then evaluated (850). The effects of the evaluated aggregated transport unit capacity information on existing routes is then determined (855). In a second operational track, performance factors are determined (860). Information regarding such performance factors can then be aggregated (865), and the aggregated information regarding performance factors evaluated (870). Such evaluation can take into consideration performance factors such as the availability of other transport units to complete the servicing of a given transport unit's route, one or more costs associated with a given transport unit returning to a route where that transport unit was last operated (e.g., is where a transport unit needs to refuel, that having greater bearing in a distribution setting then in a collection setting), dividing the remaining portion of a route yet to be completed between other remaining transport units, the consideration of the overall number of remaining locations to be serviced, personnel costs, fuel costs, other transport unit's remaining fuel (e.g., in the situation in which one or more such remaining transport units are to complete a given transport unit's route), and other such considerations. Upon determining and aggregating performance factor information, route management flow 800 can make determinations as to the effects of the evaluated performance factors on the existing routes (875). In so doing, performance factors such as the rate at which transport units are distributing/collecting distributables/collectables, various circumstances, and other considerations can be considered and their effects on routing determined.

Figure 8D:
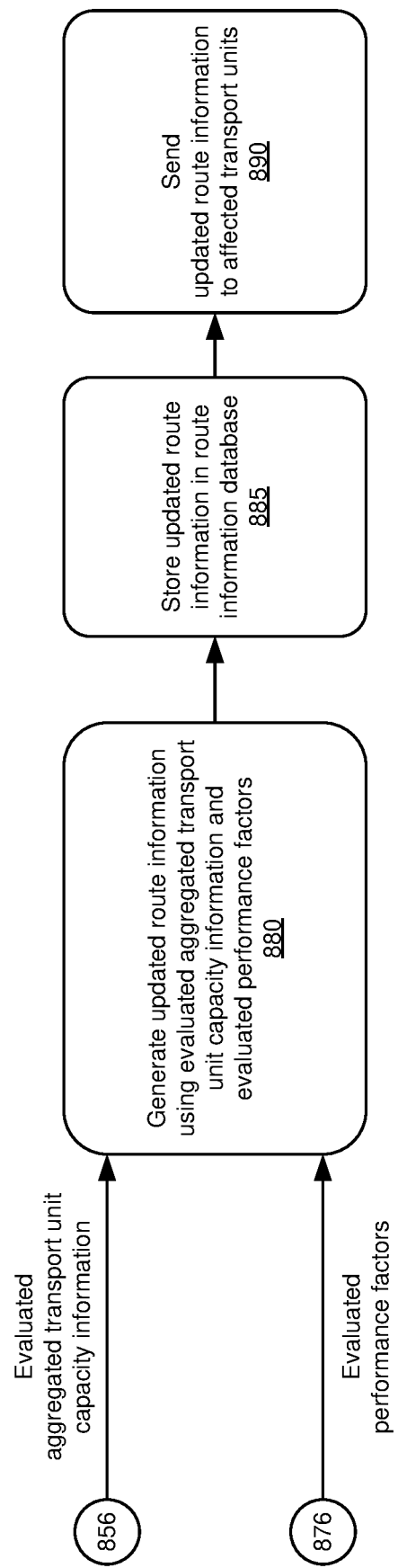

Moving on to FIG. 8D, evaluated aggregated transport unit capacity information and evaluated performance factors having been determined, route management flow 800 proceeds with generating updated route information using the evaluated aggregated transport unit capacity information (via connector 856) and evaluated performance factors (via connector 876) (880). The updated route information thus generated can then be stored in one or more route information databases (885). An indication (and, in some embodiments, the updated route information, as well) can be sent to affected transport units (890).

Figure 9:
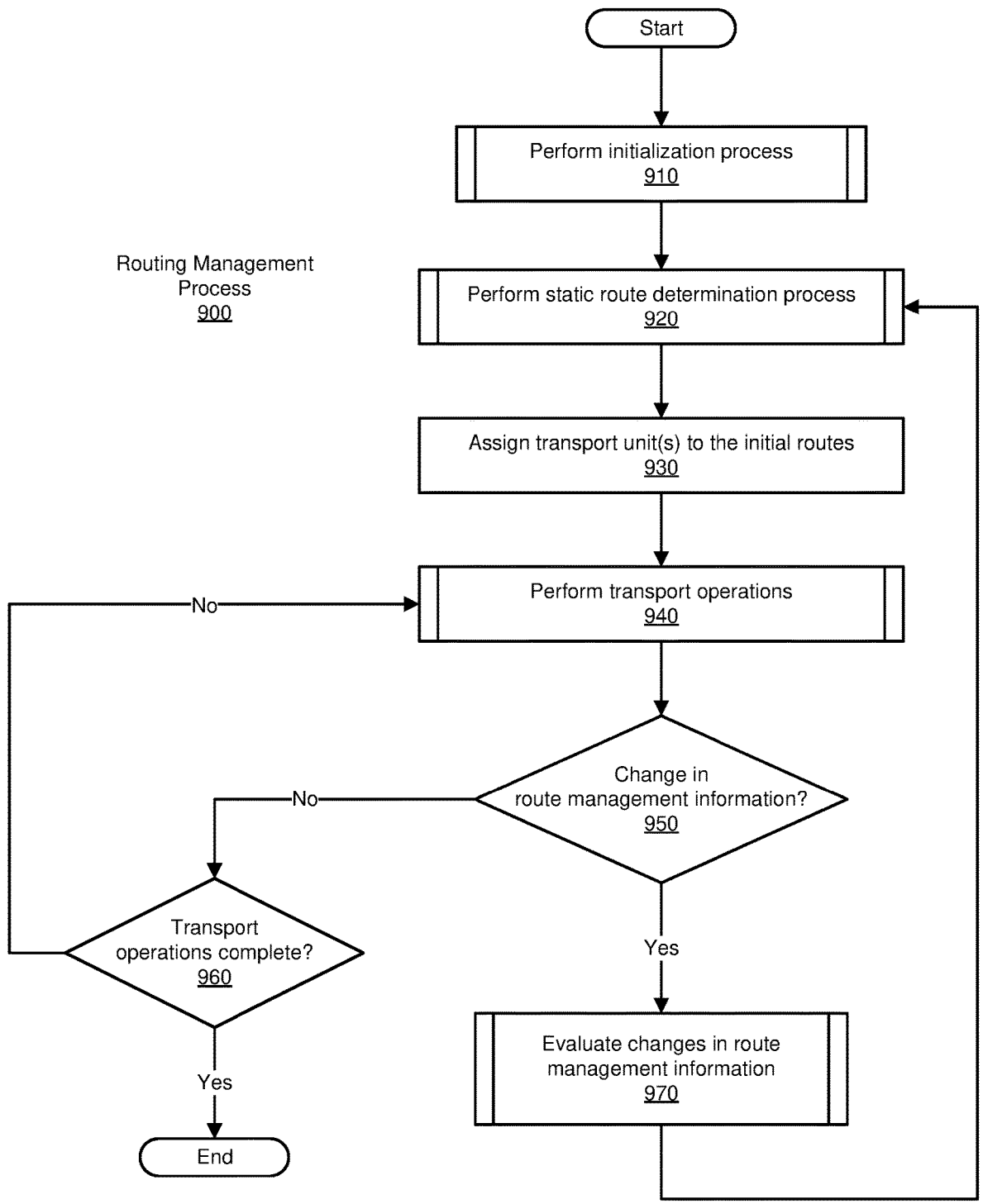
FIG. 9 is a simplified flow diagram illustrating an example of a route management process, according to methods and systems such as those disclosed herein.

FIG. 9 is a simplified flow diagram illustrating an example of a route management process, according to methods and systems such as those disclosed herein. FIG. 9 thus depicts a routing management process 900. Routing management process 900 begins with performance of an initialization process (910). An example of such an initialization process is described in further detail in connection with FIGS. 10-12, subsequently. Next, routing management process 900 proceeds with performing a static route determination process for one or more initial routes (920). An example of such an initial routing process is described in further detail in connection with FIG. 13, subsequently. As is described in greater detail therein, the processes used for the transport units' initial routes are generated using static route management information that can include historical information (e.g., existing information regarding routes, traffic, expected amount to be collected, and the like) and prediction information (e.g., as can be generated using the machine learning techniques and systems described subsequently).

Once routing management process 900 has been initialized and the initial routes determined, routing management process 900 proceeds to assigning one or more transport units to the initial routes thus determined (930). The transport units, having been assigned to their initial routes, then proceed with performing transport operations (940). An example of such transport operations is described in further detail in connection with FIGS. 14A and 14B, subsequently. As is described in greater detail therein, such transport operations provide for the eventuality of refueling, transport unit operator shift changes, and other such changes that are part of the normal operations of such a transport system. A route management system according to the present disclosure can manage such changes by way of, for example, rerouting one or more transport units, in order to provide service to as-yet-unserviced locations, while maintaining the desired level of service for the remaining locations. The processes used for the transport units' rerouting during normal operation are generated using the aforementioned static route management information and new information regarding the transport unit(s) affected, as described subsequently.

Transport operations continue until such time as a change is detected in the transport operations process (e.g., as by way of a change in route management information or other change). Upon the occurrence of such a change, control is passed to routing management process 900, where it is determined whether the change was a change in route management information (950). In the case in which the change was not a change in route management information, a determination is made as to whether the transport operations in question have been completed (960). It is to be appreciated that, as used herein, the term transport operation comprehends both distribution operations and collection operations. In the case in which the transport operations are to continue, routing management process 900 returns to performing such transport operations (940). Such can be the case where such changes relate to normal operations (e.g., a transport unit returns to the depot for reloading, only to find no further distributable in need of distribution). In the alternative, where transport operations are to cease, routing management process 900 concludes.

Alternatively, if the change detected is a change in route management information (950, routing management process 900 proceeds with evaluating the changes detected in the route management information (970). An example of such route management information change evaluation is described in further detail in connection with FIGS. 15A and 15B, subsequently. Upon completion of the evaluation performed on the changes in route management information, routing management process 900 returns to performing the route determination process (920), now determining the effects on the existing routes caused by the evaluated changes (thus, performing rerouting of one or more transport units, as may be needed in view of the evaluated changes). It is to be appreciated that, in light of the present disclosure, it is best that the routing techniques used in the static route rerouting algorithm (used in the ordinary course of transport system operations) and the dynamic route rerouting algorithm (used in extraordinary circumstances with which such transport system operations may be faced) be compatible with one another. For example, a single transport unit may encounter the need to refuel during heavy traffic congestion. As will be appreciated in light of the present disclosure, any rerouting performed by a static route rerouting algorithm should take into consideration rerouting effected by the dynamic route rerouting algorithm (and so, reroute the transport unit in need of refueling in a manner that minimizes the effects of such rerouting on rerouting given effect by the dynamic route rerouting algorithm). The processes described subsequently herein in this regard have, empirically, been found to be more compatible with one another than processes using other routing techniques.

Figure 10:
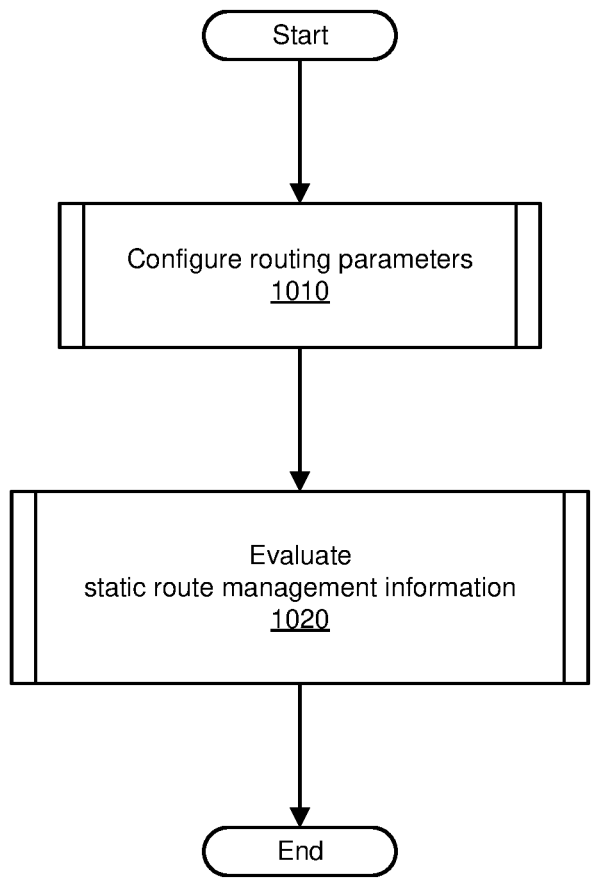
FIG. 10 is a simplified flow diagram illustrating an example of an initialization process, according to methods and systems such as those disclosed herein.

FIG. 10 is a simplified flow diagram illustrating an example of an initialization process, according to methods and systems such as those disclosed herein. FIG. 10 thus depicts an initialization process 1000. Initialization process 1000 performs operations that address initial parameters for the initial routing of transport units, as well as constraints placed on such routing (e.g., as by the number of transport units available, characteristics of those transport units, the distributables/collectables to be distributed/collected, and other such parameters and constraints, as described elsewhere herein). Initialization process 1000 thus begins by performing a routing parameter configuration process (1010). An example of such a parameter configuration process is described in further detail in connection with FIG. 11, subsequently.

Initialization process also provides for the evaluation of static route management information by way of performing a static route management information evaluation process (1020). In performing the evaluation of static route management information, initialization process 1000 uses static route management information as may be stored in a static route management information database such as static route management information database 270 of FIG. 2. An example of such a static route management information evaluation process is described in further detail in connection with FIG. 12, subsequently. Such static route management information can include, for example, historical information (which can be updated by preprocessing) and predictive information (e.g., route prediction information generated by a machine learning system such as a route modeling engine using a route management model). Initialization process 1000 then concludes.

Figure 11:
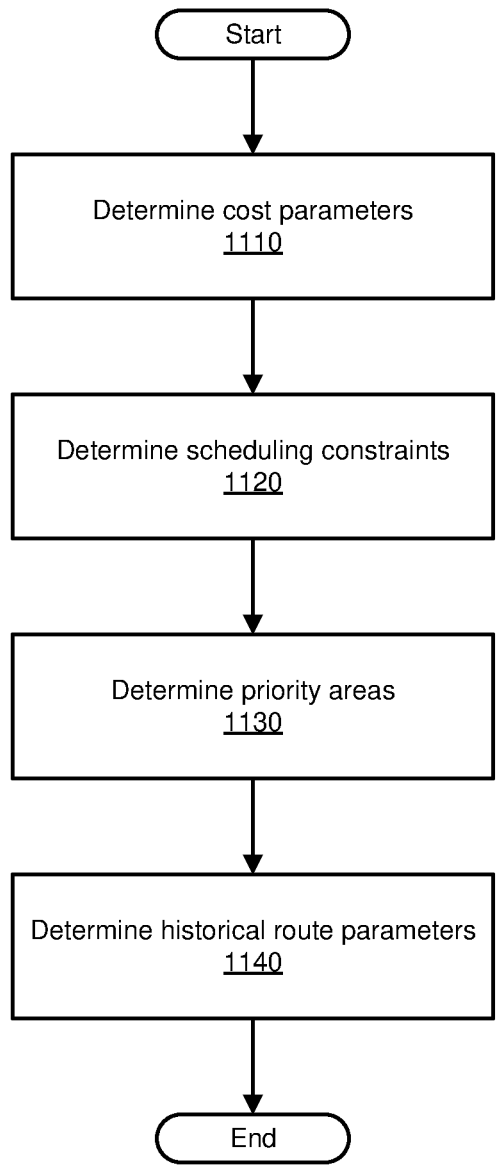
FIG. 11 is a simplified flow diagram illustrating an example of a route parameter configuration process, according to methods and systems such as those disclosed herein.

FIG. 11 is a simplified flow diagram illustrating an example of a route parameter configuration process, according to methods and systems such as those disclosed herein. FIG. 11 thus depicts a route parameter configuration process 1100. Route parameter configuration process 1100 provides for the configuration of parameters for the initial routing of transport units, as well as constraints placed thereon. It is to be appreciated that the parameters and constraints depicted in FIG. 11 are merely examples of parameters and constraints that can be considered when configuring route parameters for initial and subsequent transport unit routes.

Route parameter configuration process 1100 begins with a determination as to cost parameters that may affect one or more of the planned routes (1110). Such cost parameters can include expected transport time for large loads (e.g., the time required for a given transport unit to transport the load in question), total cost of collection/distribution, labor costs (e.g., man-hours or other measure of effort), fuel costs, footprint/carbon emissions, transport unit maintenance costs, additional mileage that results in additional transport unit wear and/or labor issues, and the like. Ultimately, such considerations can be viewed, generally, as a question of resources. Also determined are scheduling constraints, as may be affected by work hours, overtime laws, transport unit maintenance, customer requests, distribution/collection timelines, and the like (1120).

In certain embodiments, and in certain situations, one or more areas for delivery and/or collection may be designated as priority areas. Such may also be the case where different levels of service are provided at different costs to customers, with higher levels of service being charged at a higher rate, and so being designated as priority areas. A determination as to whether any such priority areas are to be serviced is thus made (1130). Also determined, in certain embodiments, historical route parameters, such as the reliability of deliveries/collections in certain areas, historical costs of such service, and other such historical factors (1140).

Figure 12:
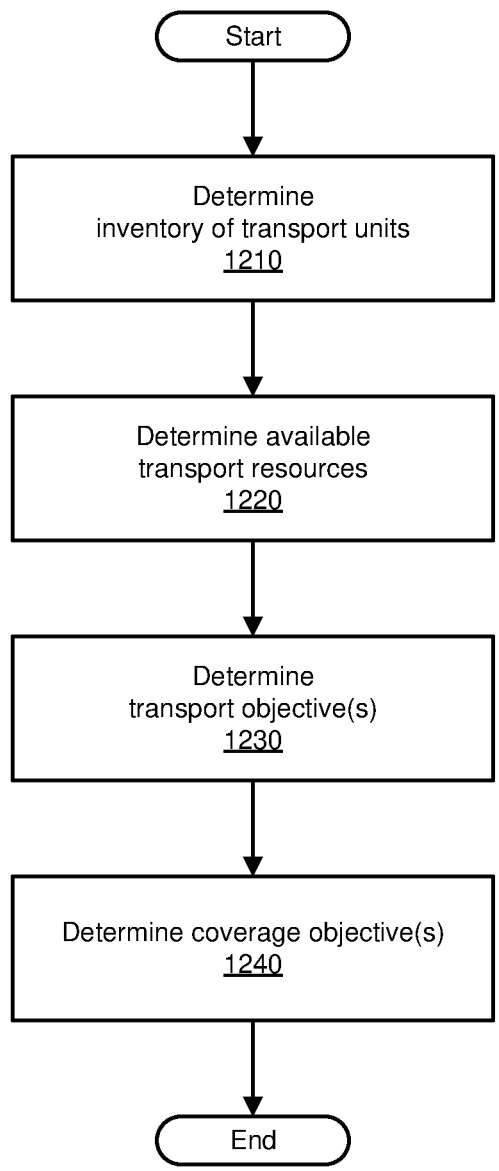
FIG. 12 is a simplified flow diagram illustrating an example of a static route management information evaluation process, according to methods and systems such as those disclosed herein.

FIG. 12 is a simplified flow diagram illustrating an example of a static route management information evaluation process, according to methods and systems such as those disclosed herein. FIG. 12 thus depicts a static route management information evaluation process 1200. As noted herein, static route management information conveys route management information that comprehends routing information, as well as other information useful to the determination of transport unit routes. Static route management information can be used both for initial route determination, and also for the rerouting of transport units in the normal course of transport operations (e.g., transport units distributing loads becoming empty, transport units collecting loads becoming full, the potential for returning to a depot in either case, and other such normal operations). By contrast, dynamic route management information is used in situations where routing or rerouting is necessitated by changes in circumstance (e.g., unforeseen events such as equipment failure, traffic accidents, and other such incidents; and/or unforeseen conditions such as heavier-than-normal traffic, inclement weather, labor disruptions due to illness, and other such conditions). In using the term load with respect to the distributables/collectables carried by a transport unit, it is to be appreciated that, in distribution operations, the load carried by a transport unit is that inventory as may be stored in a warehouse, shipping facility, or other depot.

Static route management information evaluation process 1200 begins with a determination as to the inventory of transport units available to perform transport operations (1210). As will be appreciated in light of the present disclosure, the inventory of transport units can reflect the available volume of load that such transport units can deliver or collect. A determination is also made as to available transport resources (1220). Such available transport resources can be collection resources or distribution resources, and include labor for loading/unloading, refueling facilities, depot labor and facilities, and other such resources.

One or more transport objectives are then determined (1230). Such transport objectives can include service level agreements for on-time deliveries/collections, priority treatment, total load distributed/collected, and other such objectives. Also determined as part of static route management information evaluation process 1200 are the coverage objectives for the transport operations in question (1240). Such coverage objectives can include, but are not limited to, a simple completion percentage (e.g. overall completion percentage, average completion percentage per area, average completion percentage per unit area, and the like), priority-based coverage analysis to address the need for various priority level areas receiving an acceptable level of service (e.g., addressing whether the highest priority area was completely serviced, the three highest priority areas having been completely serviced, and so on), and other such coverage objectives. Static route management information evaluation process 1200 then concludes.

Figure 13:
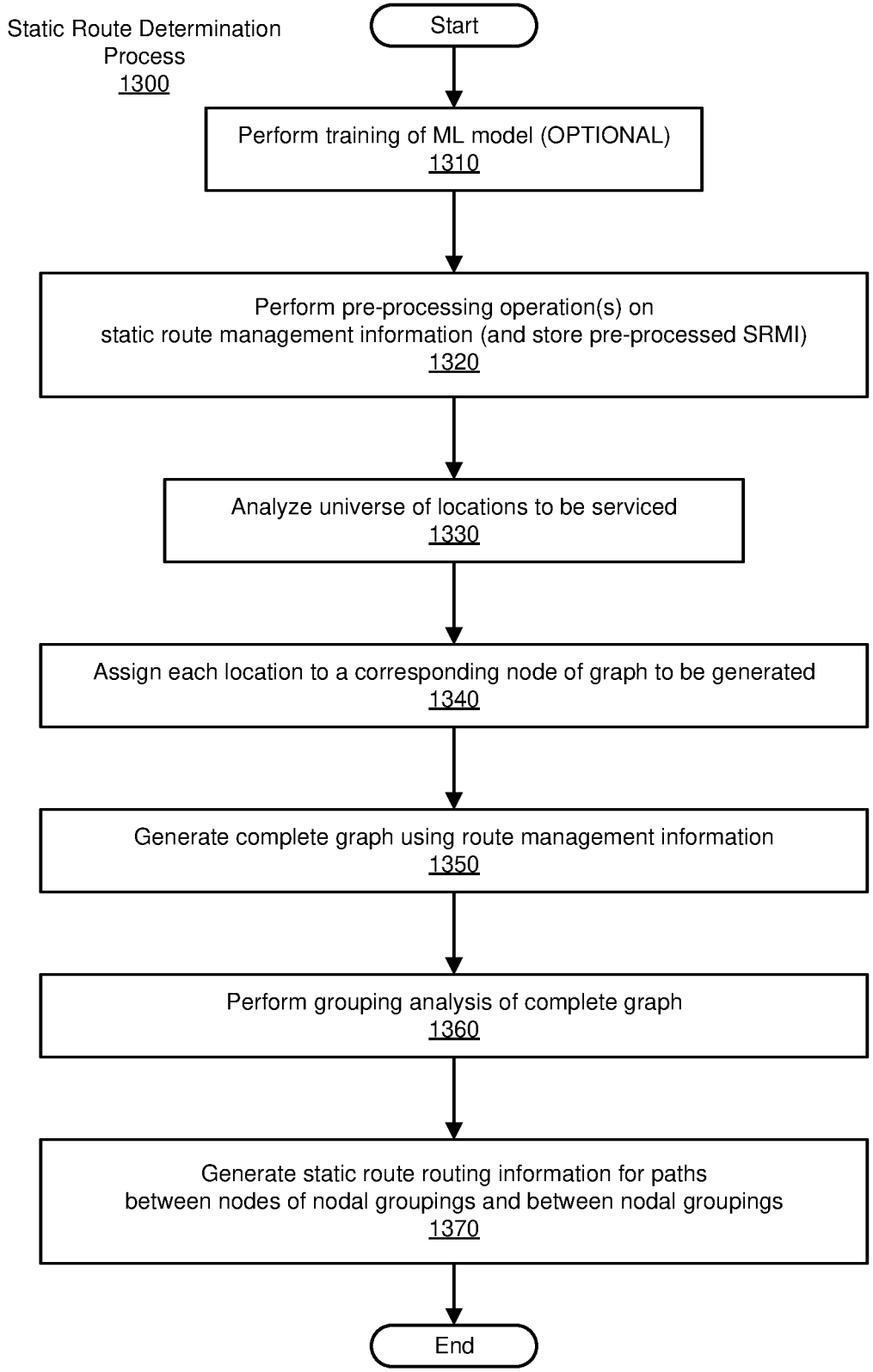
FIG. 13 is a simplified flow diagram illustrating an example of a static route determination process, according to methods and systems such as those disclosed herein.

FIG. 13 is a simplified flow diagram illustrating an example of a static route determination process, according to methods and systems such as those disclosed herein. FIG. 13 thus depicts a static route determination process 1300. Static route determination process 1300 can begin with the performance of a machine learning model training process (1310). Such a machine learning model training process is noted as being optional, and need not be performed to enjoy the advantages of route management systems such as those described herein. That said, such machine learning techniques can be used to generate route prediction information for use in transport unit routing. Training of the machine learning model updates a route management model of a route modeling engine (an architecture implemented as a machine learning system), and produces the route prediction information. Such prediction information can include, using refuse collection as an example, predictions as to the fill level of refuse bins (e.g., trash cans, dumpsters, and the like). This information can then be used to dispatch collection vehicles to the refuse bins that are predicted to be full. This can help to improve the efficiency of refuse collection by reducing the number of empty trips that are made. Further, such functionality can be used to predict the number of locations serviced before such a transport unit is at a certain percentage of a full load (e.g., a load value of, for example, 90%, a threshold for which is referred to herein as a load threshold, and, it has been found, a load threshold for a load value in collection having an 80% confidence interval for completing (or not) the remainder of the assigned transport unit route can be used; similarly, a load value for distribution can be similarly determined). Additional data can include data about refuse bins (e.g., data collected using methods such as sensors, cameras, and manual surveys of trash bins, which can be identified by GPS, RFID chips in the bins, or by other mechanisms). The machine learning model can be trained using a variety of algorithms, such as supervised learning, unsupervised learning, and reinforcement learning, the latter being preferred in embodiments such as those described herein. The machine learning model can be deployed on a variety of devices, such as cloud servers, edge devices, and mobile devices (including transport unit clients). Data regarding the composition of such refuse can also be used as an input to the machine learning system.

Static route determination process 1300 performs one or more preprocessing operations on the static route management information evaluated as part of static route management information evaluation process 1200 (1320). Such preprocessing can include updating road network information, existing static route routing information, personnel and manpower information, information on available transport units, scheduling and other constraints, and other such existing information, and which is referred to herein as historical information. The route prediction information noted above is also included as predictive information, along with other predictive information (e.g., weather information, time-of-day, time-of year, and the like), potentially Such preprocessed static route management information can be stored as part of such preprocessing (e.g. in a database such as static route management information database 270). The universe of locations to be serviced (service locations) are then analyzed (1330). Such analysis can include identifying each of the service locations. In performing such cataloging, static route determination process 1300 catalogs the universe of locations by representing those locations (in conjunction with the route management information, including parameters and constraints) as a graph, where nodes represent the locations and edges represent possible paths between such locations.

Next, each location is assigned to a corresponding node of the graph to be generated (1340). A graph (e.g., in the manner just described) can then be generated using the route management information (1350). As will be appreciated in light of the present disclosure, the graph generated can be, for example, a complete graph. Such a complete graph can take into account physical constraints (e.g., such that transport units drive along neighborhood streets, rather than driving through homeowners' yards). A grouping analysis can then be performed on the (complete) graph (1360). In so doing, the universe of nodes (locations) are grouped into nodal groups representing a given transport unit's route. Such grouping can be performed based on information such as the total number of locations, the distances between those locations, individual transport unit capacity, and other such factors. Such analysis can consider, for example, the (preprocessed) static route management information, as such historical information and predictive information will have bearing on the grouping analysis performed.

For example, such a grouping analysis can be employed to group nodes (representing locations which a corresponding transport unit is to service on that transport unit's route) into nodal groups based on historical data (e.g., route topology (roads), historical traffic patterns, historical weather and its effects, level of successful service at one or more of the locations to be visited, transport unit characteristics (which can be on a per-transport-unit or fleet basis), and time windows and other service level agreement parameters) and, if machine learning techniques are employed, predictions of such factors using the machine learning techniques described elsewhere herein, such that the transport unit can efficiently visit the requisite locations within its corresponding nodal grouping. Such a grouping analysis begins with the graph in question, which can, for example, be a weighted directed graph $G(V, E)$, where $V$ is the set of nodes representing stops (locations) on the transport unit's route, $E$ is the set of directed edges representing roads connecting the locations, and each edge $e \in E$ has a weight $w(e)$ representing the time, distance, and/or other such costs associate with to travel the road. The historical data on which such grouping analysis is based (that being the information available upon initial route determination) can include past routes taken by the transport unit, time taken to travel between locations, service time at each location, and constraints such as time windows for deliveries, for example. Augmenting such information can be predictions of such factors generated using the machine learning techniques described elsewhere herein, as noted. Given the static nature of such scenarios, a wider number of alternatives for machine learning techniques can be considered, in comparison to the dynamic scenarios discussed subsequently. Given the static nature of the aforementioned scenarios, an artificial neural network such as multi-layer perceptron network (MLPN; e.g., a simple feedforward network with multiple layers of neurons), a convolutional neural network (CNN; e.g., efficient for processing data with spatial dependencies, like road networks), or the like can be employed.

Next, the grouping analysis itself is performed. This includes feature extraction, clustering, evaluation, and (at least potentially) refinement. Feature extraction can include the extraction of relevant features from the nodes and edges of the graph in question. Extraction of node features can include information regarding nodes such as node degree (number of connected edges), betweenness centrality (how often a node lies on the shortest path between other nodes), location type (e.g., delivery, pickup, service), and historical service time at each location. Extraction of edge features can include information regarding edges such as edge weight (time or distance), historical travel time between locations, and road characteristics (e.g., historical traffic conditions, speed limits, and the like).

A clustering procedure can then be performed using the extracted node and edge features. Such procedures can include K-means clustering (which is efficient, but will require a predefined number of clusters, which may be governed by the number of transport units, for example), hierarchical clustering (which creates a hierarchy of clusters, thereby allowing for flexible decision-making on the number of groups), and density-based spatial clustering of applications with noise (DBSCAN; which identifies clusters of varying densities and handles outliers). The clustering result is then evaluated by considering clustering factors such as compactness (e.g., nodes within a group should be close to each other, from the perspective of one or more cost parameters), separation (e.g., different groups should be as well-separated as reasonably possible), travel time (e.g., the total travel time within each group should be minimized), service time (e.g., the total service time within each group should be balanced), and constraint satisfaction (e.g., the groupings should adhere to any time windows or other constraints). Depending on the outcome of the evaluation (and whether such refinement is desired/possible), the clustering result can then be refined by adjusting the clustering parameters, merging or splitting clusters, incorporating domain knowledge (e.g., via machine learning based on earlier experience with initial routes), and making other such refinements.

Output of such an analysis includes nodal groups and initial route planning guidelines. The nodal groups provide a partition of the nodes into nodal groups representing locations that each transport unit should expect to visit, at least as an initial matter. The initial route planning guidelines include recommendations for each transport unit's route based on the nodal groups, including suggested order of visits within the given nodal group and the transport unit's estimated travel time. Advantages of such grouping analysis include improved efficiency (by grouping locations, travel time is reduced, as is fuel consumption), reduced route planning time (e.g., the nodal groups thus produced streamline subsequent route planning and decision-making), and scalability (e.g., the approach facilitates application of subsequently-described procedures by providing a good starting point, particularly in large transportation networks with multiple routes and units).

Such grouping analysis having been completed, static route routing information is generated for paths between nodes within each of the nodal groupings, as well as between the nodal groupings themselves (1370). Such static route routing information is described in detail below. Here again, the generation of static route routing information can consider, for example, the (preprocessed) static route management information, as such historical information and predictive information will have bearing on the static route routing information generated. Static route determination process 1300 then concludes.

As noted, such a grouping analysis provides a good starting point for the transport units' routes. As will be appreciated in light of the present disclosure, each transport unit's route remains to be determined within such groupings, as well as between the nodal groupings generated and the depot(s) involved. Further, while such grouping analyses are reliant on sufficient historical data for accurate feature extraction and clustering. Further, in embodiments such as those described herein, such grouping analyses are not tasked with accounting for subsequent changes (whether static (e.g., normal, predictable, expected, etc. changes) or dynamic (e.g., unusual, unpredictable, unexpected, etc. changes), such changes being the province of the procedures described subsequently in connection with the processing of such changes in various scenarios by a route management system such as that described herein.

Within the nodal groupings thus produced, an initial route determination preferably employs a greedy routing algorithm, which is an algorithm that follows the problem-solving heuristic of making the locally-optimal choice at each stage. While such an approach may not produce a globally optimal solution, a greedy approach can yield locally optimal solutions that approximate the globally optimal solution and do so in a reasonable amount of time, particularly within the aforementioned nodal groupings. A greedy strategy for problems such as those initially encountered in the scenarios described herein by proceeding to the next node within the given nodal grouping will result in the lowest-cost path. It is to be appreciated that such a heuristic does not intend to find the best solution, but does terminate in a reasonable number of steps (of interest, as finding an optimal solution to such a complex problem will otherwise typically require an unacceptably large number steps in initial situations). Such an approach can solve combinatorial problems having the properties of matroids and give constant-factor approximations to optimization problems with the submodular structure. Advantageously, given the fact that locations are grouped into nodal groupings and the information used is relatively limited (e.g., based on historical information and predictions/estimates, in comparison to dynamic information based on the operational situation experienced at the time (static and dynamic changes)), the use of a greedy approach can provide good routing results in a reasonable amount of time. Such an approach is also versatile and can be applied to a number of initial transport unit routing scenarios.

In light of the foregoing, an initial transport unit routing algorithm (ITUR algorithm) can be viewed as a graph search algorithm. An ITUR algorithm can be used to find the shortest path between two locations for routing purposes (e.g., the shortest path between the nodes in the graph). Looked at another way, such an approach searches to find the lowest cost path between nodes, whether viewed in terms of distance, personnel, time, fuel, transport unit maintenance, and/or the like, or an amalgam thereof. Such initial transport unit routing scenarios are a type of optimization problems that involve finding a set of routes for a fleet of transport units that minimizes one or more collection/distribution objectives, such as total distance traveled or total time spent on the road. Such an algorithm can be used to address initial transport unit routing scenarios by finding the shortest path between each node in a graph representing the universe of locations to be serviced, where the nodes represent locations and the edges represent roads.

Such an ITUR algorithm can use historical records (e.g., information regarding collected collectables/delivered distributables, time to execute routes in servicing each location, historical traffic and weather patterns, and so on), as noted above, to determine the shortest route for each transport unit of a fleet of transport units. And given the multiple routing techniques that are employed by a route management system such as that described herein (which can address inefficiencies identified thereby, after the fact), the initial determination of routes can be more simplistic in nature, thus providing for greater initial efficiency in route determination (particularly in view of the fact that such determination will be limited to historical data and operational predictions (e.g., as by way of machine learning techniques such as those discussed subsequently). Thus, an ITUR algorithm according to the present disclosure is, preferably, based on Dijkstra's algorithm, although other greedy algorithms (e.g., the Bellman-Ford algorithm (if there is the possibility of negative edge weights (e.g., as a result of rewards, discounts, and the like)), the A* search algorithm and variations thereof (which, while not the case with regard to nodal groupings, can be more efficient than a routing algorithm such as those described herein based on Dijkstra's algorithm for graphs with large numbers of nodes), Kruskal's algorithm, Prim's algorithm, and other such greedy algorithms) can also be used to good effect as a basis for the ITUR algorithm, whether individually or in combination. Which of these alternatives provides acceptable performance will depend on various factors (location density, total number of locations, total number of transport units, the size of the service area, the time windows applicable to such service, the types of vehicles used as transport units, and other relevant factors).

That said, it to be appreciated that the nodal groupings created earlier facilitate the use of such greedy algorithms by breaking the universe of nodes into nodal groupings, thereby reducing the analysis needed for the routing processing in question (regardless of which greedy algorithm is used):
  1. Inter-nodally (such nodal grouping resulting in a lower number of nodes/paths to be considered within each nodal grouping, as compared to the overall number of nodes/paths, between which paths are to be found); and
  2. Intra-nodally (such nodal grouping resulting in a lower number of nodal groups than the number of nodes between which paths are to be found).

In this regard, given the more manageable numbers of nodes and links in and between nodes within groups, as well as a manageable number of nodal groupings and links therebetween, a greedy algorithm can be used both inter-nodally and intra-nodally. The algorithm can be the same greedy algorithm, or can employ different approaches, depending on the number of nodal groupings and the number of nodes within each. For example, in certain implementations (e.g., where the number of nodes in each nodal grouping differ as between such nodal groupings less than about 23% to about 31% (depending on factors such as size(s) of the transport unit(s), the type of distributables/collectables, the route density, and other such factors), and a starting point from which each transport unit travels to its nodal grouping), an intra-nodal grouping route management algorithm based on Dijkstra's algorithm can be used between the starting point (e.g., dump, depot, or other such central distribution/collection point) and each of the nodal groups, and an inter-nodal grouping route management algorithm based on the A* algorithm can be used for routing within each nodal grouping. In configuring a route management system thusly, the relatively regular number of nodal groupings and nodes allows for algorithms employing the aforementioned techniques to provide transport unit routing in an efficient, effective manner (e.g., with an optimality of better than 90% as compared to an optimally routed path (e.g., using algorithms based on routing algorithms described subsequently), which is aided by the reduced number of "nodes" (the nodal groupings); the reduced (and relatively regular) number of nodes within the nodal groupings providing comparable optimality). As will be appreciated in light of the present disclosure, this can vary with a mixture of transport units, the amount distributables/collectibles each transport unit can transport as its load, the distance between nodes (however measured), the cost between nodes (however measured), and other such factors.

In the case in which multiple starting points are employed, a route management system such as that described herein can generate routes by either decomposition or through the use of a multi-depot routing algorithm. For example, if multiple depots are available, the situation can be addressed by decomposing the nodal groups and depots into supergroups. Such supergroups can be formed by using a triangulation algorithm (e.g., Delaunay triangulation, described subsequently), associating each nodal grouping with one of the depots (e.g., the "closest" depot thereto), and performing the aforementioned ITUR algorithm from each individual depot to its corresponding nodal groupings. Alternatively, a multi-depot algorithm can be used to associate each nodal grouping with one of the depots. This can be accomplished using a sweep algorithm, where each depot/transport unit combination is used to attempt to address each nodal grouping's needs. As each such potential combination is analyzed, each transport unit's load is updated, with transport units that have become full (empty) being dropped from consideration as the collection (distribution) analysis progresses. It will be further appreciated that, particularly in such complex route management scenarios, machine learning techniques such as those described elsewhere herein can be used to good effect to augment such historical information with prediction of factors having an effect on the service provided to each location.

To apply an ITUR algorithm such as that described, the following steps can be performed:
1. Model the universe of locations/roads as a graph: Create a graph where each location is represented by a node and each road is represented by an edge.
2. Assign edge weights: Assign edge weights to represent the cost(s) of each path between each pair of nodes (e.g., the distance or travel time between each pair of locations).
3. Set the source and destination nodes: Set the source node to the depot or starting location and the destination node to the delivery location.
4. Run the ITUR algorithm: The ITUR algorithm is run from the source node to the destination node to find the shortest path.
5. Repeat for all destinations: Repeat operations 3 and 4 for each location to find the shortest path between the depot and each delivery location.
6. Combine paths: Combine the individual paths into a single route for each transport unit.

Such an initial transport unit route can be re-evaluated for rerouting when the actual performance becomes insufficient (e.g., performance falls by about 10% as compared to target capacity, route progress, and/or other metrics). For use in collection, such an ITUR algorithm provides better performance than, for example, a Genetic Algorithm or Ant Colony Optimization algorithm, as the ITUR algorithm using historical data tunes routes more finely than spatio-temporal statistical estimates (in a Genetic Algorithm, for example) or centrally-managed "pheromone" signals (in an Ant Colony Optimization algorithm, for example), which, at least in part, rely on the observation of how the system is evolving (which, at this juncture, has not yet begun). Further, such an approach is not dependent on system communications, where the "ants" (transport units) communicating with one another (a moot issue in an initial routing scenario because, for example, none of the transport units have begun their routes and so have no information/observations to communicate, also meaning there are no "trails" existing at that point).

With regard to the initial routing of transport units in a distribution scenario, an ITUR algorithm such as that described above can be used to good effect in the distribution of items/materials, although distinctions between fungible items/materials in distribution versus the matching of specific items/materials to a given location exist. For example, in optimizing routes for a fleet of transport units, segmentation of items/materials having specific destinations, as opposed to fungible items/materials leads to the possibility of not only using an ITUR algorithm based on the use of Djikstra's algorithm, but take into account other considerations by performing optimizations. In such situations, segmentation of items/materials between fungible and non-fungible can improve performance. Further, historical performance data (e.g., time costs and traffic patterns/congestion) can prove advantageous in route optimization. Here again, the use of a performance threshold can provide a basis for rerouting transport units and maintaining desirable performance levels (e.g., performance falling by about 10% as compared to target capacity, route progress, and/or other metrics can be used to trigger such rerouting having been found, empirically, to provide acceptable performance based on such metrics without causing the system to "thrash" (i.e., perform such rerouting too frequently), based on balancing the meeting of the performance metrics and the costs associated with rerouting (e.g., transport units having to change their routes, time and personnel costs associated with such changes, increased wear on transport units and resulting increases in maintenance costs, increase in carbon footprint, and other such considerations)).

Another alternative that has shown empirical improvements in optimality is an SRRA based on the Bellman-Ford algorithm, which allows for negative edge weights (e.g., as a result of rewards, discounts, and the like). An SRRA based on the Bellman-Ford algorithm also finds the shortest path between two nodes in a nodal grouping (or between nodal groupings), but it is more efficient than an SRRA algorithm based on Dijkstra's algorithm (being able to deal with graphs having negative edge weights), though at the expense of greater complexity (and so, greater computational demands).

Figure 14A:
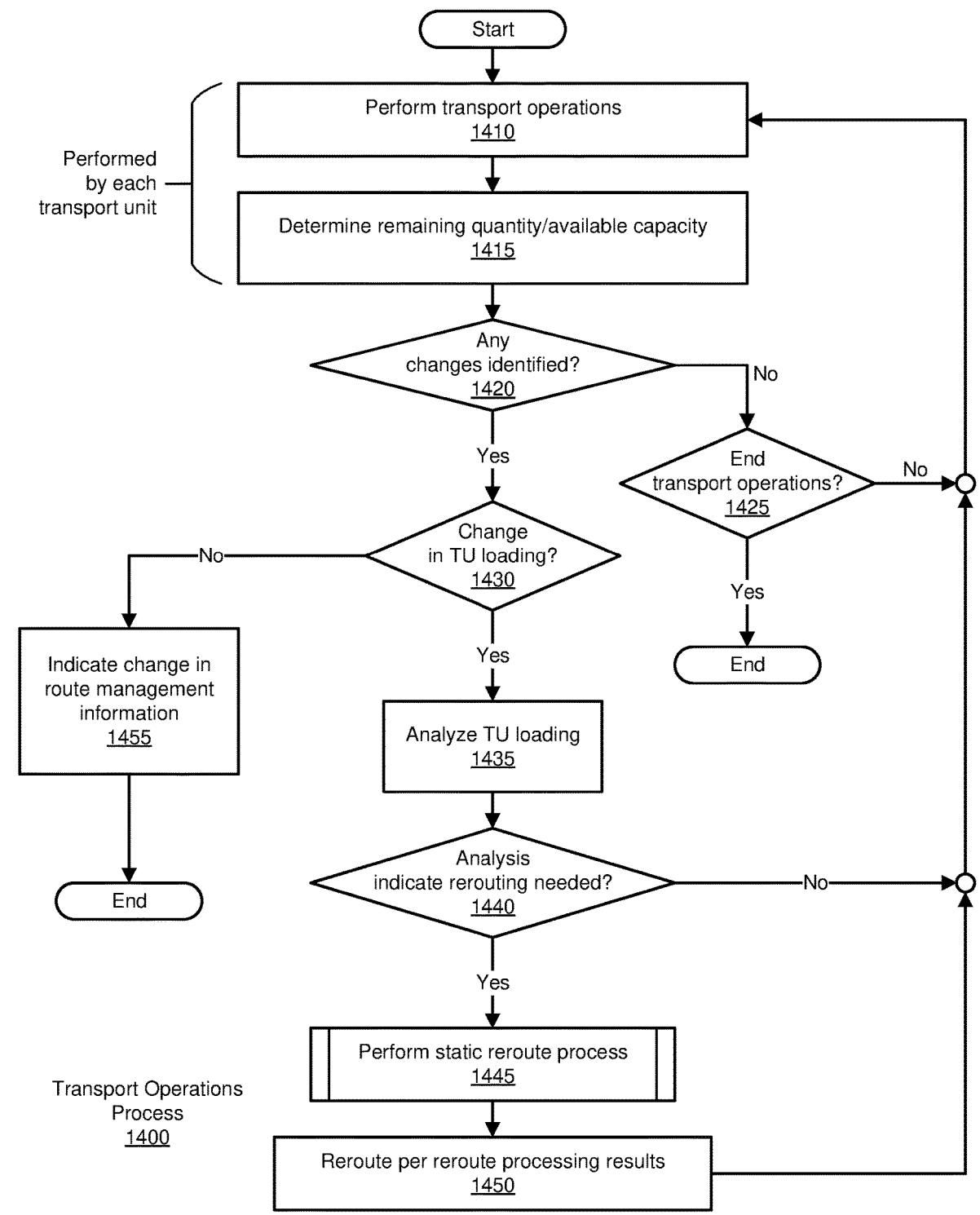
FIG. 14A is a simplified flow diagram illustrating an example of a transport operations process, according to methods and systems such as those disclosed herein.

FIG. 14A is a simplified flow diagram illustrating an example of a transport operations process, according to methods and systems such as those disclosed herein. FIG. 14A thus depicts a transport operations process 1400. Transport operations process 1400 is primarily involved with the performance of normal transport unit operations, such as determining when transport units are empty (e.g., during distribution), full (e.g., during collection), load status (e.g., percent full, percent empty, remaining items/materials for distribution, and so on), and the like. Also performed in transport operations process 1400 is the determination as to when circumstances arise outside of such normal operations.

Transport operations process 1400 begins such transport operations with, for example, the transport units involved performing transport operations (1410). Such transport operations can also include making a determination as to the remaining distributables to be distributed by the given transport unit and/or the remaining capacity of the given transport unit that is still available for the collection of collectables (1415). As is noted in FIG. 14A, such transport operations and capacity determinations can be performed by each transport unit under management.

In light of the foregoing, a determination can be made as to whether any changes have been identified (whether changes in the normal course of operations or circumstances outside the normal course of operations) (1420). The identification of the state of a transport unit's capacity and/or remaining distributables (as well as, in certain embodiments, the expected loads to be delivered or collected during the given transport unit's route) can be by way of detection, where one or more sensors provide at least a portion of the requisite information (e.g., as by periodically reporting a percentage empty/full, by providing an alert or other indication where a given condition is reached (e.g., the transport unit's cargo area is 80% full), or the like), or by determination, as where a sensor in a transport unit's cargo area is polled by the transport unit's transport client. Thus, a transport unit's transport unit loading can be viewed as the quantity of items/materials remaining to be distributed or the remaining capacity of the transport unit's cargo area available to hold items/materials to be picked up. In the case in which no changes are detected, a determination can then be made as to whether transport operations are to continue (1425). In the case in which transport operations are to continue, transport operations process 1400 proceeds to performing such transport operations (1410). In the alternative, transport operations process 1400 concludes.

Upon a change being identified (1420), a determination is made as to whether the change relates to transport unit loading (1430). If the change identified is a change in transport unit loading, transport operations process 1400 proceeds with analyzing the loading of one or more transport units involved in the transport operations (1435). Such analysis can include polling each transport unit as to its remaining quantity of deliverables/available capacity for collecting collectables, in view of each transport unit's ability to service the locations remaining on that transport unit's route, with respect to one or more thresholds. Other thresholds can also be considered at this juncture, including time-based thresholds, distance based thresholds, event based thresholds, and the like. Such time-based thresholds can include absolute delay for a given transport unit (e.g., a transport unit is rerouted if that transport unit falls behind schedule by a specified amount of time (e.g., 15 minutes)), percentage delay (e.g., a transport unit is rerouted if that transport unit's delay exceeds a certain percentage of its total planned travel time for the routing question (e.g., 10%)), and the like. Such distance-based thresholds can include a maximum detour distance (e.g. a transport unit is rerouted if that transport unit encounters an unexpected detour exceeding a set distance (e.g., 5 miles)), traffic congestion level (e.g., a transport unit is rerouted if that transport unit encounters or is predicted to encounter a congestion severity surpassing a specific threshold (e.g., a level 3 of congestion, on a 1-5 scale)), and the like. Such event based thresholds can include the occurrence of accidents or road closures (e.g., resulting in the immediate rerouting of any transport units encountering unexpected events that disrupt their planned routes), critical delivery delays (e.g., in the case in which a transport unit encounters a delay for a high-priority delivery that exceeds a certain threshold (e.g., five minutes)), and the like. With regard to the foregoing, it is to be appreciated in light of the present disclosure that such thresholds can be configured to be adaptable and adjusted based on real-time conditions and historical data analysis. Further in this regard, machine learning algorithms such as those described subsequently can be used to analyze data and recommend dynamic thresholds based on various factors, as well as making decisions based on the foregoing factors.

Such changes in transport unit loading having been analyzed, a determination is made as to whether such analysis indicates the rerouting is appropriate in the given situation (1440). In the case in which no such rerouting is warranted, transport operations process 1400 proceeds to performing such transport operations (1410). In the alternative, transport operations process 1400 proceeds with performing static reroute processing (1445). An example of such reroute processing is described in further detail in connection with FIG. 14B, subsequently. The results of such reroute processing are then used to reroute one or more of the transport units involved by updating the route information and other information available to such transport units (1450). Transport operations process 1400 then returns to performing transport operations (1410).

If the change(s) identified are not changes in the normal course (e.g., as may be related to changes in transport unit loading) (1430), transport operations process 1400 proceeds to indicating the occurrence of a change in the relevant route management information (1455). Transport operations process 1400 then concludes, returning such indication to a process such as routing management process 900 of FIG. 9.

Figure 14B:
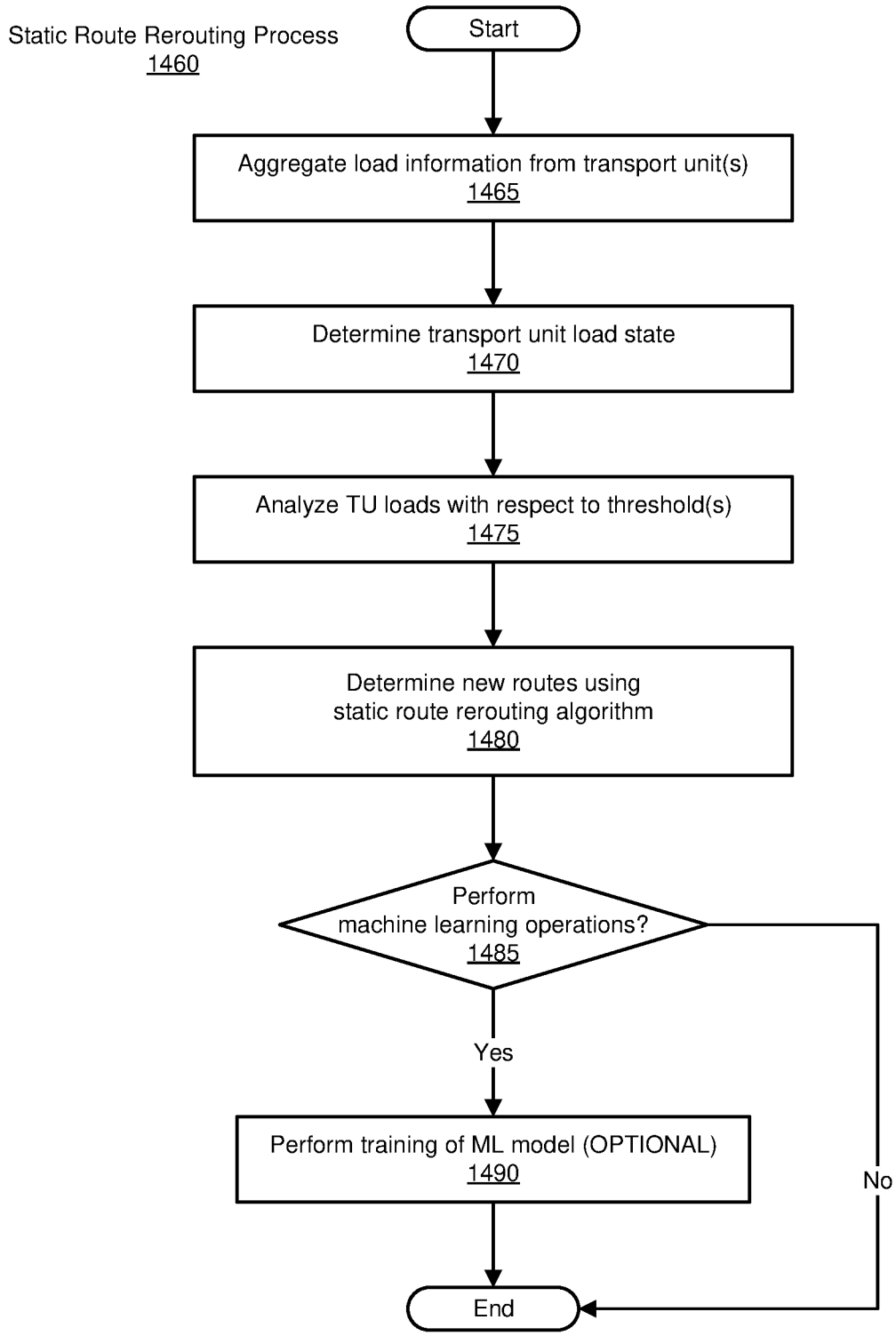
FIG. 14B is a simplified flow diagram illustrating an example of a static route rerouting process, according to methods and systems such as those disclosed herein.

FIG. 14B is a simplified flow diagram illustrating an example of a static route rerouting process, according to methods and systems such as those disclosed herein. FIG. 14B thus depicts a static rerouting process 1460. As will be appreciated in view of the foregoing discussion, a rerouting process such as static rerouting process 1460 comprehends predictable situations, such as a transport unit becoming full during the collection of items/materials, a transport unit becoming empty during the distribution of items/materials, a transport unit needing to be refueled, and other such normal transport operations. Ultimately, in at least certain embodiments, a static route rerouting process such as static route rerouting process 1460 (and in general, pertinent to a routing management process such as routing management process 900) is the question of the number of locations on a given transport unit's route the given transport unit can reasonably be expected to successfully service. Such a consideration can be in terms of the capacity to collect items/materials (e.g., and so, load capacity that remains unused) when performing collections and/or the number of items/amount of materials remaining to be delivered when performing distribution.

In the embodiment depicted in FIG. 14B, then, static route rerouting process 1460 begins with the aggregation of load information from one or more of the transport units, the routes for which are being managed (1465). Transport unit load state is then determined for one or more of the transport units under route management (1470). As will be appreciated in light of the present disclosure, such a transport unit load state In the embodiment depicted in FIG. 14B, an overall state of the distribution/collection system being managed can be determined. Such transport unit load state determination is performed to obtain current status from the transport units under management as an input to the processes used to update the routes of such transport units. Such transport unit load state can include information regarding each transport unit's remaining fuel (or other motive energy source), such transport unit's load (e.g., percentage full, percentage empty, or other such measures), transport unit operating conditions (e.g., operator shift duration, engine parameters, conditions external to the transport unit as might be reported by sensors thereon, and others such operating conditions), and other such transport unit load state parameters. In general terms, of primary concern in such embodiments, is each transport unit's ability to deliver its remaining cargo and/or the load capacity to collect the expected quantity of load (e.g., number of items and/or amount of materials) that can reasonably be expected to remain.

The foregoing information, with respect to transport unit loads/transport unit load capacity is then analyzed with respect to one or more thresholds (1475). In terms of the foregoing examples, such thresholds can include a maximum duration for an operator to work, a maximum capacity of a given transport unit, time required to complete a route, minimum fuel level, and other such constraints. Such analysis can include the comparison of a given transport unit's transport unit state (e.g., including transport unit load state), in order to determine a probability as to the given transport unit's ability to successfully complete its assigned route. Using such information and the probabilities thus generated, a determination can be made as to whether new routes should be generated using the static route rerouting algorithm (SRRA) employed (1480). In making such a determination, the noted probabilities can themselves be subject to constraints (e.g., the overall probability of route completion, in view of the then-existing transport unit state, should remain at least about 70% (and preferably, about 80%), and failing that, such transport unit(s) considered to be unable to successfully complete the current route(s) with sufficient reliability, and so, mandating that routing changes be implemented in order to address the situation). That said, it is to be appreciated that higher probability of success (e.g., 95%) may be required where specific items are being delivered to specific locations, given that such specific items are not fungible as between transport units, and that being the case, such rerouting will involve the costs of transferring the specific items from one transport unit to another, either with the transport unit going out of service returning to the depot, or one or more other transport units having to meet that transport unit to transfer the specific items in question.

Further in this regard, it will be appreciated that fungibility is a consideration. The space in transport units collecting items or materials is essentially distributing space to be occupied by such items or materials, and so one transport unit's space is no different from that of another transport unit, albeit embodiments such as those described herein consider the positions of such transport units, the remaining capacity and routes of each (e.g., the expected cargo space remaining after route completion), the corresponding depot for each (if a multi-depot architecture), and other such factors. Such is the case with the delivery of fungible materials (e.g., if a specific type of cement is delivered via multiple cement trucks, which truck delivers cement to a given construction site has no effect from the perspective of the construction company managing the construction site). Such situations are more forgiving of interruptions, though rerouting may be desirable. Contrast this with specific items being delivered to specific locations, which if such results in rerouting, will also result in the need to transfer the specific items from one transport unit to another, in order for another transport unit to complete the given route. In such a case (e.g., the first transport unit needing to refuel), the amount of load and route remaining will have to be considered in determining whether to have the first transport unit return, refuel, and complete its route, or whether to have another transport unit (e.g., in the general vicinity or from the depot) transfer the remaining specific items to its cargo and complete the given route. It is to be appreciated that such parameters and the corresponding thresholds can be on a per-transport-unit basis (e.g., transport unit parameters and corresponding thresholds, the preceding example), on a system-level basis (referred to herein as system state; e.g., addressing the question of whether the probabilities for successful service by the transport units as a whole dropped below a certain level, potentially indicating the need for additional transport units), or a combination thereof. However, at this point in the process, system state interruptions are typically not encountered (e.g., all or a large portion of the transport units should not experience the need to refuel, or become empty, or the like, all at once), but are transport-unit-specific in nature.

With respect to the determination of new routes by way of a static rerouting algorithm such as that noted above, it is to be appreciated that, as much as reasonably possible, the routing within and between existing nodal groupings should remain unchanged, so as to avoid the interruption of transport units that are currently servicing their respective routes in an acceptable manner. That said, the need for rerouting transport units due to their normal operation is part of operating such a transport system (e.g., the need for refueling, one or more transport units becoming full (collection)/empty (delivery) and proceeding to a depot to deposit collections/pick up more distributables, and other such situations as may reasonably be expected to occur in the normal operations of the transport system, as opposed to uncommon circumstances such as equipment failures, extreme weather, and the like).

As will be appreciated in light of the present disclosure, such situations can involve a number of nodal groupings, and file embodiments such as those described herein limit the impact of such interruptions, doing so militates towards techniques that not only affect fewer nodal groupings, but ones that can provide the requisite solutions in a fast, effective, efficient manner. To provide such solutions, heuristics are employed. Even though such approaches can suffer a certain amount of increase in computational requirements, embodiments such as those described herein are able to employ such heuristic algorithms because such situations are less frequent, and the demand for such rerouting is typically pressing. Thus, a static route rerouting process such as static route rerouting process 1460 can employ constructive heuristics, as well as improvement heuristics. Constructive heuristics are algorithms that build solutions step-by-step, adding locations (customers) to existing routes until the requisite locations (customers) are served. Improvement heuristics start with an initial solution, and then iteratively improve on that solution by applying local search techniques.

Examples of constructive heuristics include the nearest neighbor algorithm, Dijkstra's algorithm, Delaunay triangulation, various types of savings algorithms, the farthest insertion algorithm, and the sweep algorithm, among others. While a nearest neighbor heuristic can be fast and easily implemented (in relative terms), such a heuristic can lead to suboptimal solutions. Dijkstra's algorithm, while still being fast and easily implemented, provides such advantages while also providing rerouting solutions of acceptable optimality.

The farthest insertion heuristic begins with the two furthest customers and then iteratively inserts the remaining customers into the route that minimizes the increase in travel distance. While such an approach is useful in a scenario in which nodal groupings are employed, and so can provide better results than the nearest neighbor heuristic, the farthest insertion heuristic tends to be more computationally expensive. That said, given the proper heuristics performed prior to its application, the farthest insertion heuristic can be used to good effect in certain scenarios.

Also useful in certain scenarios is the savings heuristic, which calculates the "savings" obtained by merging two locations into the same route (or nodal groupings (or remaining portions thereof) into a new or existing nodal grouping). The pair with the highest savings is merged first, and the process continues until all locations (customers) are assigned to routes/(partial) nodal groupings are assigned to a nodal grouping. The savings heuristic can generate good quality solutions, though capacity constraints can require careful implementation. The savings heuristic can also be an effective alternative in combined delivery/collection scenarios.

The sweep heuristic divides the service area into sectors and then assigns customers to routes based on their location within the sectors. As will be appreciated in light of the present disclosure, such a sweep heuristic can also be used in the generation of nodal groupings. The sweep heuristic is effective for problems with geographically clustered locations (customers), a condition expected to result from the grouping analysis performed as part of static route determination process 1300, as well as subsequent nodal groupings that may be needed to respond to interruptions in service.

As noted, improvement heuristics start with an existing solution (the initial solution), and then iteratively improves the result by applying local search techniques. Examples of such improvement heuristics include the 2-opt heuristic, the OR-opt heuristic, the tabu search heuristic, and simulated annealing. The 2-opt heuristic iteratively removes two edges from a route and reconnects the nodes in a different order to try to improve the route's length, making the 2-opt heuristic a simple and effective local search algorithm for applications such as those described herein. The OR-opt heuristic is an extension of 2-opt heuristic that can remove and reinsert more than two edges at a time, potentially allowing for larger improvements in the solution. The tabu search heuristic uses a memory structure called a "tabu list" to prevent the heuristic from revisiting previously explored solutions, thus helping the tabu search heuristic avoid getting stuck in local optima and exploring a wider range of the search space. Simulated annealing, inspired by the physical process of annealing, allows occasional downhill moves to escape local optima and explore a wider range of the search space.

As noted, in order to minimize the impact of such rerouting, a determination can be made as to the transport unit(s) and routes affected, by winnowing down transport unit(s)/routes to only those that need be affected. Such an analysis can begin with identifying affected transport unit(s) (e.g., the transport unit(s) in need of refueling, that are empty/full, etc.). A decision can then be made as to how to manage the affected transport unit(s) and their routes, as noted above with respect to the fungibility of the distributable/collectables and whether the affected transport unit(s) will simply return to the appropriate depot, to another location (e.g., a refueling center), and/or, in certain cases, some/all of the remaining load will be transferred to other transport unit(s) for transport (whether such transport unit(s) are dispatched from a depot or designated from the transport units already in the field). Such management decisions having been made, embodiments such as those described herein identify the affected routes, as well as the transport unit(s) that will be enlisted to address the situation.

Such embodiments determine the rerouting needed using a static route rerouting algorithm (SRRA), which employs a Delaunay triangulation algorithm as an initial heuristic to narrow the nodes of the routing graph affected by such rerouting. Delauney triangulation is a class of community detection methods that rely on metrics that facilitate the identification of clusters of nodes (locations) within a graph (area). From a theoretical perspective, a Delaunay triangulation for a given set P of discrete points in a general position is a triangulation DT (P) such that no point in P is inside the circumcircle of any triangle in DT (P). The use of a Delaunay triangulation maximizes the minimum of all the angles of the triangles in the triangulation, and so avoids sliver triangles, which results in nodal groupings and paths within/between them that maintain the aforementioned uniformity of size and number, to a sufficient approximation. Delaunay triangulation is employed in embodiments such as those described herein due to its ability to efficiently navigate complex environments and adapt to dynamic conditions (both important considerations in the static rerouting of transport units), while minimizing the effect of such interruptions by containing the effects of such interruptions to only the affected transport unit(s).

Within and between the nodal groupings, the static route rerouting algorithm (SRRA) revises the road network (graph) of the nodes affected by the situation, connecting points representing intersections, locations, and other decision points. In so doing, the SRRA identifies and circumvents obstacles on the road network, ensuring that the transport units are able to travel from one location to another without having to backtrack or take steps to avoid obstacles. The SRRA can use GPS data to accurately locate and navigate transport units within the road network by using such information to determine the present location of other transport units, their status (e.g., load remaining/capacity available, fuel status, route remaining, and the like). In so doing, the SRRA is able to create a road network for the affected nodes from a network of triangles that connect the locations to be serviced by the other transport unit(s). The SRRA implements such selection by treating the remaining (unserviced) nodes and adjacent nodal groupings as "nodes" in its analysis, In so doing, the SRRA is able to provide paths for the transport unit(s) taking over servicing the remaining nodes, but is also able to identify transport units that may be available to assume responsibility for such service. In so doing, such an SRRA creates a new routing graph for the nodes affected by the static route rerouting performed (at least potentially-in the case in which the affected transport unit will simply be refueled, return to the corresponding depot for refueling, or be replaced by another transport unit, such rerouting may need only occur within the nodal grouping for which the affected transport unit is responsible), as well as determine whether any other transport units might be conscripted to provide service. Further in this regard, such functionality can be used to determine whether a transport unit should simply be sent from a depot (and which depot, in multi-depot implementations) to service those nodes, by including the depot(s) as "nodes" in the SRRA analysis.

An example of an SRRA heuristic employing Delaunay triangulation is now provided.

```
import math
def delaunay(points):
    """
    Creates a Delaunay triangulation of the given points.
    Args:
        points: A list of points.
    Returns:
        A list of triangles.
    """
    triangles = [ ]
    for i in range(len(points)):
        for j in range(i + 1, len(points)):
            for k in range(j + 1, len(points)):
                if is_in_triangle(points[i], points[j], points[k]):
                    triangles.append([i, j, k])
    return triangles
def is_in_triangle(a, b, c):
    """
    Checks if given point is inside triangle formed by other three points.
    Args:
        a: A point.
        b: A point.
        c: A point.
    Returns:
        True if the point is inside the triangle, False otherwise.
    """
    d1 = (b[0] - a[0]) * (c[1] - a[1]) - (b[1] - a[1]) * (c[0] - a[0])
    d2 = (c[0] - a[0]) * (b[1] - a[1]) - (c[1] - a[1]) * (b[0] - a[0])
    d3 = (a[0] - b[0]) * (c[1] - b[1]) - (a[1] - b[1]) * (c[0] - b[0])
    return d1 >= 0 and d2 >= 0 and d3 >= 0
def main( ):
    """
    Main function.
    """
    points = [[0, 0], [1, 0], [0, 1], [1, 1]]
    triangles = delaunay(points)
    for triangle in triangles:
        print(triangle)
if __name__ == "__main__":
    main( )
```

The code above first defines a function called delaunay( ) that takes a list of points (locations) as input and returns a list of triangles (graph edges representing potential paths). The function works by first checking if each pair of points forms a triangle. If so, the function then checks if the third point is inside the triangle. If so, the triangle is added to the list of triangles. The function is_in_triangle( ) is used to check if a point is inside a triangle. The function works by calculating the signed area of the triangle formed by the point and the other two points. If the signed area is positive, the point is inside the triangle.

In certain embodiments, a constrained Delaunay triangulation can be employed. Constrained Delaunay triangulation is a generalization of the Delaunay triangulation that forces certain required segments into the triangulation as edges, unlike the Delaunay triangulation itself which is based purely on the position of a given set of vertices without regard to how they should be connected by edges. Advantageously, the constrained Delaunay triangulation can be computed efficiently, making its use attractive in static rerouting scenarios.

The input to the constrained Delaunay triangulation problem is a planar straight-line graph (a road network), a set of points (the locations), and non-crossing line segments in the plane (in scenarios such as those described herein, the graph resulting from the then-existing routing graph (whether the result of the initial routing or subsequent rerouting)). The constrained Delaunay triangulation of this input is a triangulation of its convex hull, including the input segments as edges, and using only the vertices of the input. For every additional edge added to this input to make the graph into a triangulation, there should exist a circle through the endpoints of the edge, such that any vertex interior to the circle is blocked from visibility from at least one endpoint of the edge by a segment of the input. This generalizes the defining property of two-dimensional Delaunay triangulations of points, that each edge have a circle through its two endpoints containing no other vertices. A triangulation satisfying these properties always exists.

While specific values will vary depending on the specifics of the locations being serviced, an SRRA employing Delaunay triangulation according to embodiments such as those described herein, the following value ranges for parameters used by transport unit routing algorithms with Delaunay triangulation:

1. Road Network Data
   a. Number of intersections: 100 to 100,000+ (depending on the size of the area covered by the given transport unit (i.e., the number of such intersections (which is proportional to the number of locations to be serviced on the transport unit's route, to a degree), each such intersection potentially resulting in some amount of delay)
   b. Road segment lengths: 100 meters to 100 kilometers (depending on the type of road and scale of the route)
   c. Turn restrictions: Binary (allowed or not allowed, for each route segment)
2. Transport unit characteristics
   a. Transport unit size: Small truck (15 feet) to large truck (72 feet)
   b. Speed: 10 mph to 85 mph (depending on the type of road and speed limits)
   c. Fuel capacity: 10 gallons to 250 gallons (depending on the transport unit size and type)
3. Traffic Conditions:
   a. Traffic flow: 0 to 1000 vehicles per hour per lane; lanes from 1 to 8
   b. Congestion level: 0 (free-flowing) to 5 (gridlocked)
4. Destination Locations:
   a. Number of destinations: 1 to 1000+ (depending on the application)
   b. Distribution: Uniformly distributed or clustered (depending on the scenario)
5. Optimization Constraints:
   a. Travel time: Minimize (default), prioritize with weight relative to other factors (e.g., fuel consumption)

b. Fuel consumption: Minimize (default), prioritize with weight relative to other factors (e.g., travel time)

c. Emissions/carbon footprint: Minimize (optional), prioritize with weight relative to other factors 6. Parameters:

a. Search depth for alternative routes: 1 to 10 (affected by desired accuracy and computational resources)

b. Weight assigned to different optimization criteria: 0 to 1 (relative importance of each factor)

It is to be appreciated, in light of the present disclosure, that the use of a (constrained) Delaunay triangulation heuristic reduces the effects of interruptions due to static effects on other nodal groupings within the routing network by determining the manner in which the remaining (unserviced) nodes on the affected transport unit's route are included in the new route(s) in a manner that involves fewer changes to existing routes than would otherwise be the case (by way of reducing the number of edges needed to service those nodes, and so limiting the number of edges needing to be considered when routing the transport unit(s)). However, once such a heuristic is applied, the task of routing the affected transport units within the resulting transport network needs to be addressed. In routing such transport units, distinctions exist between collection and distribution, as well as whether fungible or specific items/materials are involved. Generally speaking, the use of static route rerouting, when performing collection, is agnostic as to whether fungible or specific items/materials are collected. Such scenarios can be viewed as the distribution of what is essentially fungible cargo space that can be filled with any items/materials to be collected. That said, specific items may, given their dimensions and the like, result in different rates of cargo space consumption, though the same can be said of materials in situations in which the amount of material collected at each location may vary widely. As will also be appreciated in light of the present disclosure, the use of static route rerouting in performing distribution of fungible or specific items/materials can depend on different factors, given that such distribution will need to consider delivery constraints for specific items/materials, but capacity constraints for fungible items/materials.

In the case of collection, where use of the SRRA is typically agnostic to whether fungible or specific items/materials are collected, the use of a (constrained) Delaunay triangulation heuristic provides acceptably efficient potential paths between the remaining nodes (and nodal grouping(s)/depot(s), as appropriate). Because the number of "nodes" involved (remaining nodes and, potentially, nodal grouping(s)/depot(s)) is relatively small, an SRRA based on Dijkstra's algorithm can be employed. Given that this is essentially an inter-nodal-grouping situation, the SRRA can employ operations such as those described earlier, and enjoy the benefits noted. Thus, when a collection route is to be revised, the (constrained) Delaunay triangulation heuristic provides the acceptable potential paths between the "nodes" involved (the remaining nodes and, potentially, any nodal grouping(s)/depot(s) that may be considered), and then a Dijkstra-based algorithm performed to determine the new routes (and potentially, the affected transport unit(s)). In this regard, the new transport route(s) become the transport route(s) on which performance metrics are based, such performance metrics being metrics such as expected service times, total materials collected (target capacity), number of locations serviced (route progress), and the like. In that regard, in addition to or in the alternative, such an SRRA can be invoked when actual performance drops below 90% of target capacity and target route progress.

In the case of distribution, the noted distinction between fungible or specific items/materials considers delivery constraints for specific items/materials, but capacity constraints for fungible items/materials. In the case of the distribution of fungible items/materials, once the (constrained) Delaunay triangulation heuristic has been performed, an SRRA based on a savings algorithm can be performed on the resulting network (graph). An SRRA based on the savings algorithm can be implemented such that the existing data in the transport network is used as the basis for rerouting. This can include the locations of the depot(s), available roads between locations and their associated costs (e.g., distances, resulting carbon footprint, and the like), expected volume at each location, transport unit capacity constraints, collection time windows, and other such constraints. A location matrix, listing each pair of locations and the cost between them, is then generated. Potential savings can then be determined by determining the "savings" achieved by collecting the items/materials from both locations together instead of separately. The savings are the difference between the sum of the individual costs associated with (e.g., distances to) each location and the combined cost if collection is performed for both locations together instead of separately. Such savings can be determined using, for example, one or more of simple distance savings (e.g., the difference in individual and combined distances), time-based savings (e.g., the difference in travel time with and without merging, and/or other cost-based savings (e.g., the difference in transportation costs).

Next, route generation is performed by the SRRA. The location pairs are ordered by their potential savings, starting with the highest values, which prioritizes merging locations offering the largest reduction in costs. Iterative insertion can then be performed. For each pair of locations in descending order of cost savings:

Check feasibility: Ensure that adding both locations to the current route doesn't violate transport unit capacity or time window constraints.

Insert the pair: If feasible, insert the pair at the position in the route that minimizes the total distance traveled.

Update the matrix: Remove any invalidated pairs (e.g., if a location is already serviced) and recalculate savings for affected pairs due to route changes.

This insertion process is repeated until all the location pairs have been considered, or in the alternative, no feasible insertions remain to be made. Different insertion strategies can be employed for inserting merged pairs into existing routes, including nearest-neighbor insertion (inserting after the closest location on the route), best-insertion (inserting at the position minimizing the total cost (e.g., distance traveled)), or OR-opt/2-opt (local search techniques that improve existing routes by swapping or reversing segments, as discussed elsewhere herein). Some manner of termination criteria is also used, with the SRRA stopping when no more feasible savings opportunities are found, a pre-defined maximum number of iterations is reached, and/or a target solution quality or time limit is met. Optionally, route optimization can be performed on the results. This can include refining the routes thus determined, where the initial routes generated are optimized using techniques such as swapping locations between routes, splitting routes (nodal groupings) into smaller routes (smaller nodal groupings), and/or considering alternative transport unit types.

Given that such an SRRA based on a savings algorithm is suitable for more static environments, the changes expected in the situations comprehended by such an SRRA lend themselves to such an approach. Advantages of such an approach include a reduction in travel time and costs, improved efficiency, scalability, and simplicity in implementation. With regard to the parameter ranges that might be used in a typical example, there are several parameters within the problem setup and SRRA implementation that can affect the efficiency and effectiveness of routing transport units for package collection. With these situations in which such an SRRA is intended, the number of transport units can vary between a single transport unit, up to a large fleet of transport units. Also to be considered are transport unit capacity constraints, which can vary from small vans (e.g., 1,000 kg of cargo capacity) to large trucks (e.g., 20,000 kg of cargo capacity), for example. Time windows may also be applicable to the servicing of locations, in which case such time windows will need to be defined, and can be a fixed window (e.g., 9 am-12 pm) or a flexible window with a tolerance range. Also considered can be a service time estimate as to the time required to service a given location, for each location. As will be appreciated, such a parameter can vary depending on the items/materials being collected, as well as factors such as the complexity of loading and unloading the loads.

An improvement on a savings-algorithm-based SRRA is an SRRA based on the Clarke-Wright algorithm (CWA) can offer advantages over the savings algorithm (SA) in embodiments such as those described herein. For example, a CWA-based SRRA can provide better routing solutions, meaning shorter routes and lower overall travel distances compared to an SA-based SRRA, which is achieved by considering pairs of customers for merging instead of individual savings. This allows CWA to account for global context and identify opportunities for combining customers that may not be apparent when focusing on individual savings. A CWA-based SRRA can also provide greater flexibility in handling a wider variety of constraints than an SA-based SRRA, including, for example, capacity limitations, time windows, and multi-depot scenarios, which allows a CWA-based SRRA to adapt to a wider range of real-world routing problems. Further, while initially more complex than an SA-based SRRA, a CWA-based SRRA can be more efficient for large problems due to its ability to identify promising routes more quickly, as a result of its focus on merging pairs with the highest potential for savings, leading to a faster convergence towards optimal solutions. A CWA-based SRRA also experiences less solution sensitivity-a CWA-based SRRA is generally less sensitive to the order in which customers are processed compared to an SA-based SRRA, meaning that the quality of the solution is less likely to be affected by the specific order in which customers/locations are evaluated and so, making a CWA-based SRRA more robust and reliable. Further still, a CWA-based SRRA is, in relative terms, comparatively easy to implement, being readily coded using various programming languages. However, even in light of the foregoing, a CWA-based SRRA is not without its costs. A CWA-based SRRA requires additional calculations in comparison to an SA-based SRRA, which can make a CWA-based SRRA more computationally expensive for smaller problems. As a result, a CWA-based SRRA may not offer significant speed advantages over an SA-based SRRA for scenarios with a small number of locations to be serviced. That said, embodiments according to the present disclosure are generally directed to larger numbers of service locations, and so the costs of a CWA-based In the case of non-fungible items/materials (e.g., typically specific items (e.g., parcels) being delivered to specific customers, or in some cases, specific materials being delivered to specific customers), the delivery constraints for the specific items/materials need to be considered. In the case of the distribution of specific items/materials, once the (constrained) Delaunay triangulation heuristic has been performed, an SRRA based on a farthest insertion algorithm can be performed on the resulting network (graph), an approach that has demonstrated advantageous results in such situations.

An SRRA for routing of transport units delivering non-fungible items/materials (and so destined for specific locations) can employ a farthest insertion algorithm to good effect. As with the savings algorithm, such an SRRA can be implemented such that the existing data in the transport network is used as the basis for rerouting. This can include the locations of the locations and depot(s), available roads between locations/depot(s) and their associated costs (e.g., distances, resulting carbon footprint, and the like), the assigned weights/priority/potential delivery window for each items/material, transport unit capacities, and any restrictions placed on such transport (e.g., weight restrictions, special equipment required, and the like), among other such factors and data.

Next, such an SRRA performs route initialization by creating empty lists of routes for each transport unit and creating a list of unserviced locations. A farthest insertion loop is then performed, which can include:
1. Farthest location identification
   a. Average Distance Calculation: For each unvisited location, calculate the average distance to all already visited locations, thus balancing insertion impact across the network.
   b. Prioritization: Optionally, locations can be prioritized based on weight, priority, urgency, or the like, to optimize delivery order and transport unit load.
   c. Farthest Location Selection: Choose the unvisited location with the highest average distance (or prioritized location, if applicable).
2. Candidate route selection
   a. Dynamic Cost Calculation: For each existing route, determine the cost increase of inserting the farthest location at every possible position, which can factor in:
      i. Distance Increase: Increase in route distance due to insertion.
      ii. Weight/Capacity Impact: Potential violation of vehicle capacity constraints.
      iii. Priority/Urgency: Impact on overall delivery order and urgency.
   b. Multi-Objective Optimization: this phase utilizes a weighted sum or Pareto optimization approach to balance different cost components based on the then-existing delivery priorities.
   c. Candidate Route Choice: Select the route with the minimum overall cost increase as the candidate for insertion.
3. Perform route insertion
4. Terminate operations—operations 1-3 are performed until all locations (notes) have been accounted for.

To improve the performance of SRRA, advanced route insertion techniques can be employed. Such advanced route insertion techniques can include dynamic insertion position (where, instead of a fixed insertion point between locations, alternative positions within the route (e.g., before/after specific locations) are considered in order to minimize cost increase) and multi-stop insertion (where, for large items/voluminous materials or complex constraints, consideration is given to the insertion of not only the farthest location, but also nearby, compatible locations (e.g., based on weight, priority, or proximity) to improve efficiency).

An improvement phase can also be implemented. An SRRA implementing an improvement phase can employ local search techniques and/or advanced optimizations. Such local search techniques can include swapping operations (where stops within a route are exchanged as a means for identifying better sequences and reducing costs (e.g., distance traveled), relocation (where a stop is moved to another route to optimize overall transport unit utilization and improve the efficiency of the order of delivery), use of the 2-opt and its extensions (to reverse sequences of stops and explore diverse solutions). Other improvements can involve the use of variable neighborhood search (which explores different neighborhoods of the solution space by applying various local search operators and diversifying strategies) and tabu search (which avoids revisiting previously explored solutions and provides efficient navigation of the search space, and which is described elsewhere herein).

In certain embodiments employing machine learning, a determination can be made as to whether the preceding determinations warrant additional training of the machine learning model employed (1485). If such additional training is warranted, static route rerouting process 1460 proceeds with performing such training (1490), though such operations are, as noted, optional, and are dependent on not only the aforementioned determinations, but also whether machine learning techniques are in fact employed. Once such optional machine learning operations have been performed (if performed), static route rerouting process 1460 concludes.

If employed, a machine learning architecture used in this regard is preferably highly responsive to dynamic changes (e.g., transport units needing to refuel, needing to return to a depot due for pick-up of more items/materials or to offload items/materials collected, and so on), as well as being capable of learning complex relationships and adapting to new situations. One such group of architectures is reinforcement learning architectures. Reinforcement learning architectures are also well-suited for dynamic environments, learning and adapting essentially through trial and error. Such architectures continually update their policies based on real-time feedback, allowing them to adapt to changes in traffic conditions, weather, customer demands, and other factors. Such reinforcement learning include deep Q-learning network (DQN, which reacts quickly to dynamic changes in transport unit routing systems) and proximal policy optimization (PPO) techniques. PPO techniques are particularly effective in scenarios such as those described herein, and employ a policy gradient method that updates the policy directly based on its performance. The training of such machine learning architectures can take as input one or more of the following:

Road network data: This includes the network's topology (roads and intersections), traffic conditions, speed limits, and/or road closures, among other characteristics.

Transport unit information: This includes current location, remaining fuel capacity (however powered), and/or load remaining/space available, among other characteristics.

Delivery/collection information: This includes locations on the route remaining to be serviced, locations on the route already serviced, service time windows, special instructions, and/or other such considerations.

Rewards: This includes delivery completion, total distance traveled, delivery timeliness, compliance with traffic regulations, and/or fuel consumption, among other such considerations. (It is to be appreciated that rewards can be positive or negative, and so can, in certain instances, result in negative costs for a given edge; in such cases, certain of the techniques described here can fail, as such negative weights can give rise to infinite loops.)

Such a reinforcement learning system using proximal policy optimization for transport unit routing employs various parameters to function effectively. These parameters can be categorized into two main types, with additional parameters that can be configured, depending on the embodiment (and can have the parameters ranges noted):

1. Policy Network Parameters—These parameters define the neural network architecture used to learn the optimal routing policy. They directly influence the behavior of the reinforcement learning agent and its ability to make optimal decisions.
    a. Weights and Biases: These learnable parameters within the network determine the mapping between input state observations and output action probabilities. The proximal policy optimization algorithm optimizes these weights and biases to improve the network's performance. Such weights and biases are initialized randomly and adjusted during training, so no specific range of values is employed as an initial matter, though the initial values should be small to avoid large fluctuations in the network's output.
    b. Network Architecture: This includes the number of hidden layers, the number of neurons per layer, and the activation functions used. Tuning these parameters impacts the network's capacity to learn complex relationships and its efficiency in making routing decisions. In embodiments such as those described herein:
        i. The number of hidden layers is preferably 1-4 layers, and more preferably 2-3 layers (based on empirical findings). As will be appreciated in light of the present disclosure, a larger number of hidden layers potentially leading to better performance but also increasing complexity and training time.
        ii. The number of neurons per layer si preferably between 16 and 512 neurons per layer, and more preferably 32-128 neurons per layer (based on empirical findings).
        iii. The activation function employed is preferably a rectified linear unit, given its efficient computation and positive output, though other alternatives are leaky rectified linear unit, a hyperbolic tangent function unit, and a sigmoid unit.
    c. Learning Rate: This hyperparameter controls the rate at which the network updates its internal parameters based on received rewards. A learning rate of between about 0.001 and about 0.01 is preferable (more preferably between about 0.004 and about 0.008, based on empirical findings), with higher values leading to faster learning (but also potential for instability) and lower values having potentially greater stability at the expense of being slower to converge.
2. Optimization Parameters—These parameters control the training process and influence how the proximal policy optimization algorithm adjusts the policy network, and the values noted ensure stability, convergence, and acceptable performance.

a. Discount Factor: This parameter determines the importance of future rewards compared to immediate rewards. A high discount factor encourages long-term planning, while a low discount factor emphasizes short-term benefits. Preferably, the discount factor is between about 0.9 and about 0.99 (more preferably 0.9-0.94, based on empirical findings), with higher values prioritizing long-term improvement, and lower values prioritizing immediate improvement.

b. Generalized Advantage Estimation (GAE): This technique helps the reinforcement learning agent differentiate between rewards received due to its actions and those resulting from external factors, improving policy updates and reducing the influence of irrelevant factors. Preferably, the GAE lambda is between about 0.9 and about 0.99 (more preferably 0.91-0.93, based on empirical findings), with a higher lambda emphasizing long-term consequences of actions, and a lower lambda focusing on immediate effects.

c. Entropy Bonus: This parameter encourages the policy to explore different actions, especially during early stages of training, helping to avoid getting stuck in local optima and promotes the development of a robust policy. Preferably, the entropy bonus is between about 0.001 and about 0.1 preferable (more preferably between about 0.001 and about 0.005, based on empirical findings), where a higher entropy bonus encourages exploration, while a lower value promotes exploitation of the current policy.

d. Proximal Policy Clipping Range: This parameter restricts the range of changes in the policy network between successive updates, helping to prevent large fluctuations in action probabilities and maintain policy stability. Preferably, the proximal policy clipping range is between about 0.1 and about 0.3 preferable (more preferably between about 0.1 and about 0.2, based on empirical findings), where a larger clip range allows for larger changes in the policy (but can lead to instability), while a smaller clip range maintains stability (but potentially at the expense of limiting exploration).

e. Mini-batch Size: This defines the number of data samples used for each update of the neural network's model parameters (weights and biases) by breaking up the entire training dataset into smaller subsets (mini-batches). A larger batch size may improve efficiency, while a smaller batch size can provide more fine-grained updates. The mini-batch size can be between about 16 and about 512, but is preferably between about 32 and about 128, with larger batch sizes improving efficiency (at the expense of potentially being slower to learn), and smaller batch sizes providing more fine-grained updates (though at reduced efficiency, potentially).

f. Gradient Clipping: This technique limits the magnitude of gradient updates during training. It helps to prevent large changes in the policy network and maintain stability. Preferably, the gradient clipping is between about 0.5 and about 1.0 (more preferably being between about 0.6 and about 0.7, based on empirical findings), where larger clip values reduce the impact of large gradients efficiency (at the expense of potentially being slower to learn), and smaller clip values allow for faster learning (at the risk of instability).

Additional parameters can include:

Number of training epochs: This specifies the number of times the reinforcement learning agent iterates through the training data, updating the policy network's parameters at each step. In embodiments such as those described herein, the number of training epochs is between about 1000 and about 5000 epochs, but this can vary depending on the graph's complexity and the convergence rate observed/required.

Target Network Update Frequency: This parameter determines how often the target network, used for estimating future rewards, is updated based on the policy network. This helps stabilize training and improve convergence. In embodiments such as those described herein, the a target network update frequency of approximately every 1-5 policy network updates is preferred, as such a target network update frequency helps to stabilize training and prevent the target network from becoming outdated.

Exploration Strategy: This defines how the reinforcement learning agent explores different actions during training. Empirically, the epsilon-greedy strategy provides acceptable results, as an exploration strategy for embodiments such as those described herein. In embodiments such as those described herein, such an epsilon-greedy strategy with an initial epsilon of about 0.5 and about 0.9 and a decay rate of about 0.9 and about 0.99 can be used to good effect in an implementation for an SRRA, as such values provide an acceptable balance between exploration and exploitation in such respects.

A reinforcement learning system is thus able to provide predictions for factors affecting routes by exploring the potential viability of such routes and the effects of various factors thereon (as described, for example, in connection with FIGS. 16-21, subsequently). Further, in certain implementations (e.g., using only one machine learning architecture), a reinforcement learning system can be used for both static routing and static rerouting, reducing the complexity of implementation and maintenance, as well as infrastructure requirements. Further still, such a reinforcement learning system can be used not only on static-based situations, but also in dynamic situations (vetting various predictions of factors, as well as exploring potential route viability). Further yet, such a reinforcement learning system can be used to good effect in the hyper-heuristic approach described subsequently. The ability to apply the same machines learning system to all these aspects of route management systems such as those described herein provides a much more efficient and wholistic approach to a route management system than would otherwise be possible.

For example, reinforcement learning can further enhance the capabilities and adaptability of the approaches described herein, regardless of the algorithm on which the approach is based. This is particularly meaningful in applications in which transport units are tasked with both collection and delivery, certain transport units are tasked with collection and certain transport units are tasked with delivery, and other such combinations (referred to herein as mixed collection/distribution transport systems). Embodiments employing such reinforcement learning systems are able to make the requisite determinations based on inputs such as route management information, situational information, the collection/distribution services to be provided (e.g., which can include mixed collection/distribution services), existing factors, routing performance exhibited by earlier route management operations, historical delivery and collection data (e.g., traffic patterns, customer locations, demand fluctuations, and the like), and other such information. In supporting mixed collection/distribution services, a reinforcement learning machine learning system according to the present disclosure can also update various factors to provide dynamic route improvement by way of such a machine learning system's ability to learn and adapt routing decisions based on the various factors described elsewhere herein.

As also noted, such advantages can be provided by integrating such a reinforcement learning system with the routing approaches described elsewhere herein. A reinforcement learning system can provide preprocessing for initial route planning (e.g., as described in connection with FIG. 13, subsequently), as well as rerouting based on situational information (e.g., as described in connection with FIGS. 14B (static route rerouting processing) and 15B (dynamic route rerouting processing), subsequently). As noted elsewhere herein, use of a reinforcement learning system will employ training that includes feedback from existing approaches' performance. As will also be appreciated, such a reinforcement learning system can not only be used to provide predictions of factors, analysis of performance and existing routes, and the like, but can also be used in conjunction with the given approach, where both suggest one or more routes and the route management system selects the routing that provides the best option based on the factors at hand.

Figure 15A:
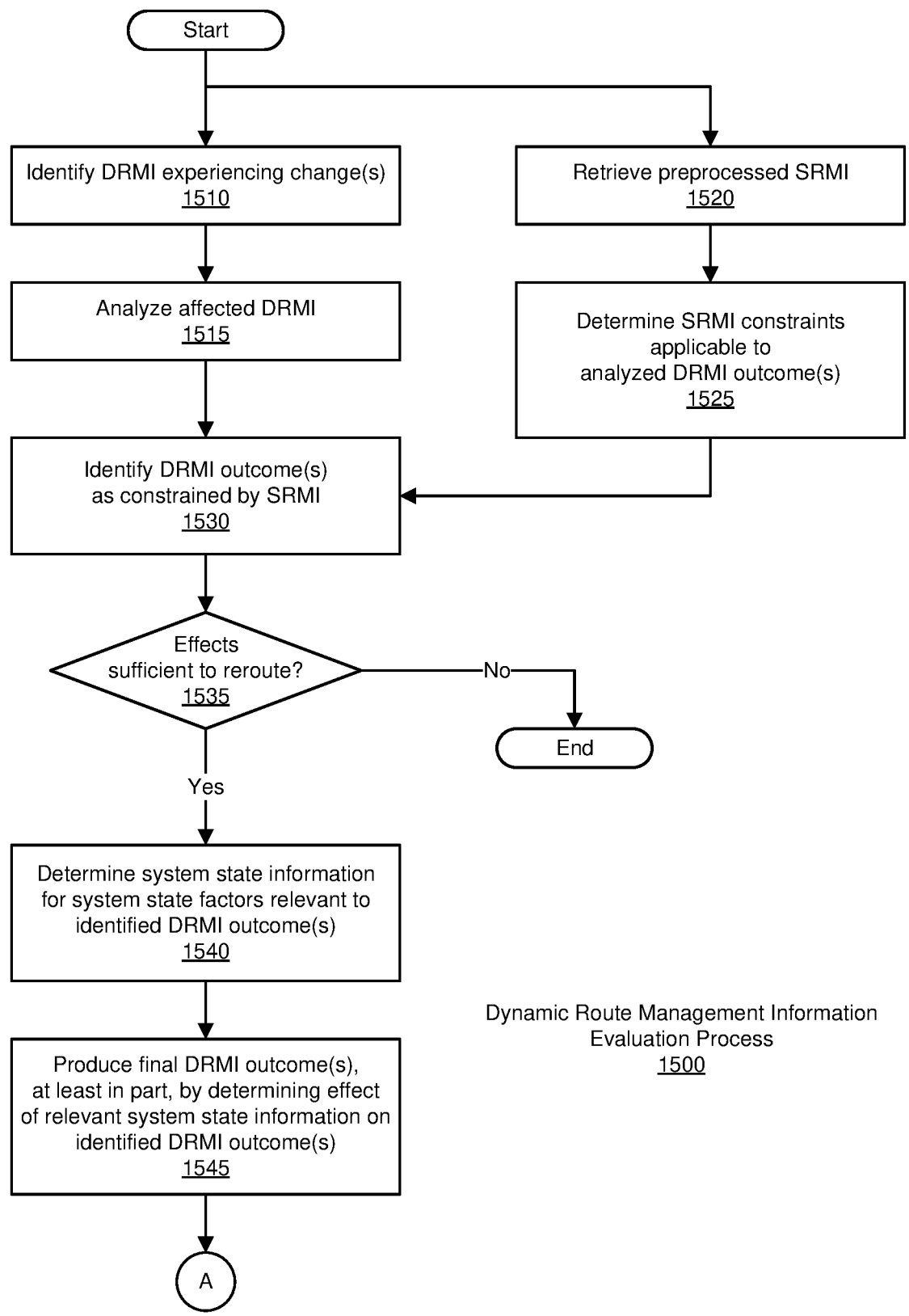
FIGS. 15A and 15B are simplified flow diagrams illustrating an example of a dynamic route management information evaluation process, according to methods and systems such as those disclosed herein.

FIG. 15A is a simplified flow diagram illustrating an example of a dynamic route management information evaluation process, according to methods and systems such as those disclosed herein. FIG. 15A thus depicts a dynamic route management information (DRMI) evaluation process 1500. DRMI evaluation process 1500 is primarily involved with the performance of transport unit operations in other-than-normal circumstances, such as during events (e.g., equipment failures, accidents, etc.), conditions (e.g., traffic congestion, inclement weather, etc.), and other circumstances (e.g., labor strikes, fuel shortages, etc.) outside the normal operations of a collection/distribution system, as noted earlier. That being the case, DRMI evaluation process 1500 addresses circumstances that would otherwise impede or prevent the provision of distribution/collection services by the transport units under management.

As depicted in FIG. 15A, DRMI evaluation process 1500 begins with the identification of the dynamic route management information experiencing one or more changes (1510). In certain embodiments, the effects of such changes are determined by analyzing system-wide parameters (system parameters) and other information (system information) (1515). In analyzing such changes, DRMI evaluation process 1500 analyzes not only the current state of the system (e.g., current transport unit locations, route completion, transport unit loads, transport unit fuel status and consumption rate, and/or the like), but also system information (which can include information regarding one or more circumstance such as those noted earlier). In analyzing the dynamic values of such data (including the dynamic values of system parameters and system information), the effects of the change in question can be determined. In parallel, preprocessed static route management information (SRMI) is retrieved (1520). The preprocessed SMRI is then used to determine any constraints that might be applicable to the DRMI outcomes resulting from the aforementioned analysis (1525). The analyzed DRMI and applicable SRMI constraints (as noted earlier) are then used to identify the potential (desired and possible) DRMI outcomes (1530). Such DRMI outcomes can include, for example, one or more of:

Rerouting of transport units to avoid congestion, traffic accidents, or other disruptions.
Adjustment of delivery schedules to accommodate changes in demand or weather conditions.
Allocation of additional transport units to meet increased demand or to respond to disruptions.
Rescheduling of maintenance activities to minimize disruption to service.
Proactive monitoring of transport unit performance to identify potential problems before they occur.
Optimizing route planning to minimize fuel consumption, emissions, and travel time.
Enhancing customer satisfaction by providing reliable and timely delivery.

A determination is then made as to whether the effects of the identified DRMI outcomes are sufficient to warrant DRMI-based rerouting (1535). If such effects do not rise to the level warranting attention, DRMI evaluation process 1500 concludes.

In the alternative, if such effects warrant addressing, a determination as to any relevant system state information can be made with respect to system state factors relevant to the identified DRMI outcomes (1540). Such system state factors can include environmental parameters such as traffic (e.g., changing traffic patterns, traffic congestion level, traffic volume, and the like), current and forecast weather, manpower levels, and changes to service priority levels, among others.

Having made such determinations and gathered such information, DRMI evaluation process 1500 then proceeds with producing one or more final DRMI outcomes (1545). Producing such final DRMI outcomes can be accomplished in certain embodiments, at least in part, by determining the effects of relevant system state information on the identified DRMI outcomes. As noted above, such constraints can be situation-specific (e.g., traffic or weather conditions, available personnel, and/or the like), or can be generally-applicable constraints (e.g., laws/rules/procedures applicable to the organization and/or the provision of the services in question, as an example).

Figure 15B:
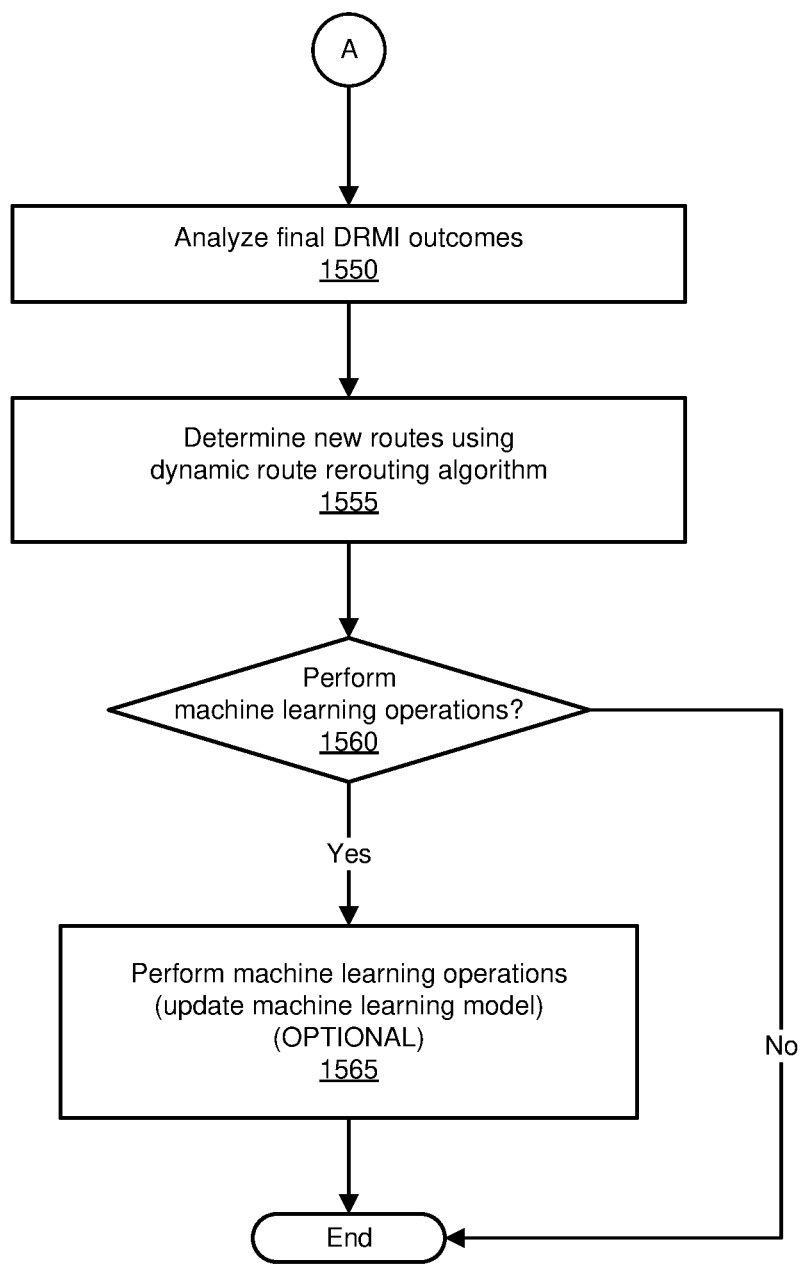

At this juncture, DRMI evaluation process 1500 continues to FIG. 15B by way of connector "A". DRMI evaluation process 1500 proceeds with analyzing the final DRMI outcomes (1550). Once the final DMRI outcomes of been analyzed, the results of such analysis can be used in determining new routes with one or more dynamic route rerouting algorithms (DRRAs) (1555). As will be appreciated in light of the present disclosure, a DRRA implemented as part of a dynamic route management information evaluation process 1500 will be invoked in a situation where some manner of change has been detected. In contrast to a situation in which the aforementioned SRRA is invoked (a static situation, in which one or more normal changes have occurred), a DRRA is intended to address situations in which dynamic changes have taken place. Such dynamic changes, as noted elsewhere herein, comprehend unusual situations such as events (e.g., equipment failures, accidents, etc.), conditions (e.g., traffic congestion, inclement weather, etc.), and other circumstances (e.g., labor strikes, fuel shortages, etc.) outside the normal operations of a route management system.

Such circumstances can be the result of system state factors, as noted earlier, which can include circumstances that interfere with service to an extent that the overall system's level of service begins to degrade to an unacceptable level. System state factors (factors having systemwide impact) that are the result of such circumstances can include external factors (factors originating outside the transport system and its operator(s), such as events (e.g., terrorist threats, civil unrest, or the like) and/or conditions (e.g., inclement weather, severe traffic conditions, a general labor disruption (e.g., a labor strike, slowdown, or the like), civil unrest, disasters, public health emergencies, and/or other such circumstances), which are referred to herein as failures. That said, circumstances that might otherwise have systemwide effects on service may not be applicable to certain implementations, and so need not be considered in those scenarios (e.g., a gas shortage will not affect an electrical vehicle fleet). Further, such failures need not impede appropriate and sufficient service on a systemwide basis. For example, such failures can include traffic accidents, localized heavy traffic, employee health issues, and the like.

By contrast, such circumstances can include situations which impact only relatively small numbers of transport units caused by factors that are typically internal to the transport system and/or its operator(s) (referred to herein as errors), which still necessitate the use a DRRA such as that described herein (e.g., due to the unpredictable nature of such interruptions, the severity of such interruptions, the cost(s) associated with such interruptions, and the like). Such factors can include constraints on the given transport unit system and interruptions due to interruptions internal to the transport system. Such constraints can include, but are not limited to, the total number of transport units available (e.g., in view of some number of failed transport units, transport units undergoing maintenance, and the like), the available amount of fuel or other energy sources, the areas (within the overall area to be serviced) already serviced or awaiting service, the number of operators or other personnel available to perform the functions necessary to provide such service, and other such constraints as may result from the limitations of the organization providing such service, the laws/rules/procedures applicable to the organization and/or the provision of such services, and other such constraints. Interruptions due to problems within the transport system itself can include errors such as one or more failed transport units, communications failures, computing equipment failures, human errors (e.g., delivery to/collection of incorrect items/materials, delivery to/collection from incorrect locations, missed deliveries/collections, human resource problems with an employee), and other such interruptions/obstacles. Further, errors can result in potentially significant interruptions, as by transport unit operators acting in unexpected ways, such as a transport unit operator who starts collecting items/materials on other transport units' routes. In such cases, a route management system according to embodiments such as those described herein can dynamically adjust one or more routes based on information received from that transport unit and others (such that if one transport unit starts having more trach than was expected, the route management system can compensate). Thus, a transport unit erroneously collecting items/materials can cause relatively widespread and unexpected interruptions, and while maintaining the original routes is advantageous, such errors can impact the efficiency of the routes determined. Such considerations feed into determinations made by the route management system's dynamic routing algorithm, being dynamic in nature, particularly as the organization and route management system will not otherwise have a sufficient scope of knowledge of the transport system's current state.

As noted with regard to the static route rerouting algorithm, winnowing down transport unit(s)/routes affected by dynamic rerouting to only those that need be affected allows such dynamic rerouting to be implemented efficiently and effectively. However, given the possibility of systemwide effects, such a dynamic route rerouting algorithm must be able to manage circumstances in which the changes are widespread, where large numbers of transport units need to be rerouted and/or large numbers of locations remain to be serviced. Further, given that such profound effects need to be addressed as quickly as possible (given their potentially wide effect) and can be time-varying (e.g., a weather event such as a tornado can come and go in a matter of minutes), a dynamic route rerouting algorithm according to the present disclosure gives effect to such rerouting in a fast, efficient manner (e.g., at least within a minimum time for a transport unit to travel from a depot to affected locations, and in certain embodiments, within the time a given location would otherwise expect service).

While one could attempt to address such circumstances (again, referred to herein as dynamic changes) using approaches such as the aforementioned nodal groupings, heuristics, and the like, the urgent nature of such circumstances militates towards a dynamic reroute routing algorithm based on a metaheuristic routing algorithm. A metaheuristic routing algorithm provides advantages such as global optimization, the ability to handle complex dynamic route routing circumstances, adaptability to widely-varying circumstances, resilience in the face of rapid dynamic changes, scalability and efficiency. With regard to global optimization, a dynamic route rerouting algorithm broadly explores the search space, increasing the chances of finding the globally optimal route(s) for the affected transport units, in comparison to other algorithms like Dijkstra's algorithm, which can get stuck in local optima (as a result of finding short routes between a comparatively small number of points, but missing the bigger picture).

A dynamic route rerouting algorithm employing a metaheuristic approach is also able to better handle the complexities such circumstances present, by incorporating such complexities into the optimization process (e.g., dynamic traffic factors, time windows, transport unit capacities, and various constraints). Moreover, metaheuristic algorithms are flexible and can quickly adjust to changing conditions. Metaheuristic algorithms can also handle large-scale problems with many locations efficiently (e.g., by being parallelized for faster route processing on multiple cores or computers), making such approaches suitable for large transport unit fleets and complex logistics networks. Further still, metaheuristic algorithms provide for continuous improvement, which can be meaningful in circumstances that are themselves changing. Metaheuristic algorithms can learn and improve over time by analyzing past data and performance, refining their search strategies to find better solutions. Such advantages dovetail with the machine learning techniques discussed subsequently.

However, the foregoing advantages, as well as others provided by a DRRA based on metaheuristic algorithm, come at a cost. In terms of computational resources, a DRRA based on metaheuristic algorithm requires more computing resources than simpler algorithms, and so represent a significantly higher computational load. Such additional computational load is not warranted in the case of the initial routing (e.g., the aforementioned ITUR, which is able to employ a less computationally-demanding approach as a result of the grouping analysis performed) or static rerouting (e.g., the aforementioned SRRA, which is able to employ a less computationally-demanding approach as a result of the heuristics employed). Conversely, such approaches can be used in those scenarios because the universe of affected transport units/nodes can be effectively constrained. Even in view of the foregoing, however, in the event of circumstances requiring rerouting, the additional computational requirements are acceptable in view of emergent nature of such situations, the wide range of possible circumstances, the number of transport units potentially affected, and other such considerations.

As noted earlier herein, a distinction can be drawn between collection operations and distribution operations. However, a DRRA based on a metaheuristic algorithm based on either Adaptive Large Neighborhood Search (ALNS) or Genetic Algorithm (GA) has proven advantageous in both collection and distribution operations. However, due to the distinctions between collection and distribution operations, a DRRA based on real-time dynamic programming, the anytime A* algorithm, real-time simulated annealing, and real-time tabu search have also been observed to provide sufficient performance. That said, due to the difficulty of solving to optimality large-scale instances of transport routing problems, a DRRA based on ALNS and GA (which can benefit from tabu list heuristics) can reach solutions within about 1% of the optimal transport routing, while also being sufficiently flexible to allow for complicating constraints in the large networks that can result from systemwide failures and severe errors.

Dynamic route management employs a dynamic route rerouting algorithm that is of a general class of routing algorithms referred to as metaheuristic algorithms. As will be appreciated in light of the present disclosure, a metaheuristic can be viewed as a higher-level procedure or heuristic designed to find, generate, tune, or select a heuristic (partial search algorithm) that may provide a sufficiently good solution to an optimization problem or a machine learning problem, especially with incomplete or imperfect information or limited computation capacity. Such is the case with the dynamic scenarios that DRMI evaluation process 1500 is intended to address. Such DRMI evaluation can, for example, sample a subset of solutions which would otherwise be too large to be completely enumerated or otherwise explored, as is the case with the exponential number of alternatives that can be available to a route management system such as that described herein, particularly where circumstances can change from one moment to the next. Advantageously, a DRMI evaluation process according to the present invention can provide improved results (as compared to a process for the evaluation of static scenarios), while maintaining acceptable computational efficiency and speed, by allowing such evaluation to be performed with relatively few assumptions about the problem being solved. As will be appreciated in light of the present disclosure, the ability to provide routing instructions quickly and efficiently in circumstances that may change quickly and unexpectedly is a distinct advantage in such situations.

A DRRA according to the present disclosure employs an ALNS algorithm, which is based on the Large Neighborhood Search (LNS) algorithm. Such an LNS algorithm facilitates transport routing in large road networks, as may result when one or more transport units, depots, or large portions of a transport system fail and/or encounter severe errors. In general terms, and LNS algorithm operates by iteratively exploring comparatively large neighborhoods of candidate solutions, with each iteration involving:

Solution Representation: Encode the current collection/distribution plan as a set of routes for each vehicle, specifying the sequence of locations visited.

Destroy: Apply a "destroy" operator that disrupts a portion of the current solution. Several options exist, such as removing a random route, removing a subset of locations from a route, or swapping locations between routes.

Repair: Utilize a "repair" operator to reconstruct a feasible solution from the destroyed one. Common repair strategies include reinserting locations into routes, reconnecting disconnected routes, and re-optimizing individual routes.

Acceptance Criterion: Decide whether to accept the newly generated solution based on a defined criterion. A basic approach is to accept solutions that improve the overall cost compared to the current one. More advanced criteria, such as simulated annealing, can help avoid local optima.

Implementation of such an LNS algorithm involves the following aspects:

Neighborhood Construction: Define the set of large neighborhoods. This can involve various combinations of destroy and repair operators with different levels of disruption. Experimenting with different neighborhood structures is crucial for finding diverse and effective solutions.

Operator Selection: Implement various destroy and repair operators to diversify the search space. Consider operators with different levels of aggressiveness (e.g., removing single locations vs. entire routes) to balance exploration and exploitation.

Adaptive Mechanisms: Dynamically adjust the selection probabilities of operators based on their performance in the search process. This can be achieved by tracking metrics like cost improvement or solution diversity and favoring operators that have been more successful in recent iterations.

Local Search: After a new solution is generated and accepted, incorporate local search procedures to further refine the route sequences for individual vehicles, adjusting the order of locations within each grouping using a greedy algorithm based on Dijkstra's algorithm, or a local search based on the genetic algorithm.

With regard to a DRRA based on an adaptive large neighborhood search (ALNS) algorithm for the collection/distribution of items, materials, and the like across various locations within a constrained timeframe and with resource limitations, such as those described elsewhere herein. The specific problem may involve collecting items/materials from different points (e.g., waste bins, warehouses) or distributing items/materials to different recipients (e.g., customers, stores). In a DRRA based on an ALNS algorithm, the DRRA explores a diverse landscape of potential solutions through three core components: destroy and repair heuristics, large neighborhoods, and adaptive mechanisms.

Destroy and repair heuristics such as those used in a DRRA according to the present disclosure employs operators that modify the current routing solution by removing and reinserting items/materials into different routes. The DRRA begins with a destruction phase, intentionally "destroying" a portion of the currently existing routing network. This involves removing elements or connections from the existing routing network, disrupting its original structure. Following the destruction phase, the DRRA enters a "repair" stage, in which constructive operations are performed (e.g., using local search techniques) to rebuild the routing network. This cycle of destruction and repair iterates, with each iteration aiming to create a better solution than the previous one.

The destroy heuristics used during the destroy phase of a DRRA according to the present disclosure include random removal, worst-fit removal, and clustered removal. In using a random removal technique, the DRRA randomly removes items/materials exceeding a threshold capacity or falling outside of a specific time window from the given route, for example. In using a worst-fit removal technique, the DRRA removes items/materials with the lowest packing efficiency or highest travel time impact from the given route, for example. In using a clustered removal technique, the DRRA removes geographically clustered locations to create larger, more efficient routes, for example. A DRRA according to the present disclosure begins by using the random removal technique in a first phase of the destroy and repair heuristic, and follows this up with an analysis that employs the worst-fit and clustered removal techniques.

The repair heuristics used during the repair phase of a DRRA according to the present disclosure include then reinsert the removed locations using repair algorithms. In contrast to approaches described elsewhere herein (e.g. farthest insertion), such repair heuristics reinsert the removed locations using one or more of a greedy insertion technique, a nearest insertion technique and/or a regret insertion technique. In the first case, a greedy insertion technique is employed, inserting the removed elements based on a cost or utility metric, prioritizing the best insertions first. In the second case, a nearest insertion technique inserts items into existing routes by minimizing costs such as travel time and distance penalties. In the last case, regret insertion prioritizes items with the highest cost of removal, ensuring efficient utilization of capacity and time windows, for example.

A DRRA according to embodiments such as those described herein also looks to increase the number of locations considered by working with large neighborhoods. Thus, instead of modifying the given routing network through single operators, a DRRA according to such embodiments employs "large neighborhoods" (groups of locations larger than considered in other aspects of embodiments such as those described herein) encompassing diverse sets of operators and their combinations. In using such larger neighborhoods, such a DRRA provides a broader exploration of the road network solution space, facilitating escape from local optima. Such a DRRA can employ a neighborhood swap technique, a neighborhood chain technique, or a combination of techniques. In employing a neighborhood swap technique, items are slop between different routes and/or locations in order to test for the effects of such changes. In employing a neighborhood chain technique, portions of existing routes are reordered in order to improve the overall costs of the routing network (e.g., in terms of travel time, distance, and/or the like). In employing a combined technique, a DRRA according to such embodiments combines different operators such as removal-insertion, swap-chain, or other such combinations, in order to facilitate and even broader exploration of the routing network in question.

Further, a DRRA according to embodiments such as those described herein dynamically adjusts the selection probabilities of operators and neighborhoods based on, for example, the past performance of such operations in the functioning of the route management system in question. In so doing, such a DRRA focuses on more promising search areas, avoiding less productive regions. To implement such adaptability, a DRRA according to embodiments such as those described herein can employ update operations including a success-based update, a diversity-based update, and a penalty-based update. Such a success-based update increases the probability of operators and neighborhoods that consistently lead to routing networks exhibiting improved performance. A diversity-based update approach encourages exploration of diverse neighborhoods, even if the immediate performance exhibited is less desirable. In so doing, a diversity-based update technique prevent stagnation in the resulting routing network. With penalty-based updating, operations that violate constraints or lead to infeasible solutions are penalized by the DRRA.

An ALNS-based DRRA includes the following operations:

Initialization—In its initial phase, the DRRA lays the groundwork for optimization:

Initial rerouted transport network generation: the DRRA initiates the process by generating an initial rerouted transport network, either through random assignment or the application of a constructive heuristic, for the remaining unserviced locations of the affected route. In certain embodiments, this includes adjacent routes (for errors affecting one route or a cluster of routes), or the unserviced locations of those routes affected (e.g., all routes (and so, all unserviced locations) in a systemwide failure or circumstance (e.g., worsening inclement weather, widespread traffic congestion caused by an emergency, and the like)). As noted earlier, by constraining the initial rerouted transport network to transport units in need of rerouting, such a DRRA avoids disruptions to other transport units currently servicing their routes in an acceptable fashion.

Setting initial parameters: The algorithm configures essential parameters, including the initial temperature in simulated annealing scenarios. These parameters critically shape the algorithm's behavior throughout the optimization process.

Defining operators: Destruction and repair operators are defined to enable the creation and modification of solutions. These operators serve as fundamental tools for the algorithm's adaptability, facilitating strategic manipulation of solutions.

Main Loop: The DRRA then proceeds to its iterative main loop:

Iteration initialization: The iteration counter is initialized (e.g., to zero).

Memory structure: Initialize storage locations in the memory structure storing existing information for the routes to be revised.

Iterative exploration: The main loop persists until predefined termination criteria are met, such as a maximum iteration count or convergence thresholds.

Destruction: A destruction operator randomly selects a subset of solution components, which are then removed to craft a partial solution (as described above).

Repair: A repair operator is applied to reconstruct a feasible solution by reintegrating the previously removed components, as noted.

The destroy/repair operators above focus, as noted, on locations on the routes affected, and so application of the DRRA in this manner limits the area involved. This not only avoids unnecessarily disrupting other transport units' operations, but also facilitates the determination of the new routes needed more quickly and more efficiently.

Local search: A local search strategy refines the solution within the current neighborhood, contributing to the overall improvement of solution quality. A local search algorithm such as that described elsewhere herein form the basis of this functionality (a greedy algorithm based on Dijkstra's algorithm, the Bellman-Ford algorithm, the A* search algorithm and variations thereof, Kruskal's algorithm, and/or Prim's algorithm were found to be usable to good effect).

Adaptation: The DRRA updates the memory structure with performance information from the current solution. Adaptive mechanisms dynamically adjust parameters, weights, or probabilities of destruction and repair operators based on the results, as well as historical information.

Acceptance criteria: The DRRA determines the acceptance of the new solution based on predefined criteria. For example, use of the Metropolis criterion (balancing exploration and exploitation, accepting or rejecting a new solution based on its fitness and the fitness of the current solution) in the context of simulated annealing was found to provide acceptable results.

Simulated annealing, based on the physical process of metal cooling, finds the optimal state (minimum energy configuration) of a system by slowly lowering the "temperature," gradually escaping from local optima and converging to the global minimum. The Metropolis criterion balances exploration and exploitation in this process.

Balancing Exploration and Exploitation

Exploration: At high temperatures, the Metropolis criterion allows accepting worse solutions (higher energy states) with a certain probability. This encourages exploring a wider range of the solution space, potentially leading to better solutions further down the search path.

Exploitation: As the temperature cools, the probability of accepting worse solutions decreases. This favors moves that improve the current state (reduce energy), leading to exploitation and refinement of promising regions in the search space.

Accepting or Rejecting Solutions—The Metropolis criterion defines the probability (P) of accepting a new solution (y) with fitness (energy) Ey, given the current solution (x) with fitness Ex: $P(y|x)=\min\{1, \exp(-(Ey-Ex)/T)\}$ Exp $(-(Ey-Ex)/T)$: This term represents the Boltzmann factor, which depends on the difference in fitness (Ey−Ex) and the temperature (T). As the difference increases (worse solution), the acceptance probability decreases exponentially.

T: The temperature acts as a control parameter. At high temperatures, even large increases in energy have a significant acceptance probability, promoting exploration. As the temperature decreases, only slight improvements or even decreases in energy are likely to be accepted, focusing on exploitation.

Iteration update: The iteration counter is incremented, preparing for the subsequent cycle of exploration.

Termination-conclude search with a termination phase

Termination criteria: The DRRA ceases operation upon meeting predefined termination criteria, which, in certain embodiments, include reaching a maximum iteration count, achieving convergence, or exceeding a designated time limit.

It is to be appreciated that the scenario at hand drives the designated time limit, in order to meet the applicable service level expectations for the affected locations remaining (whether on the route of the affected transport unit(s) or other routes affected as a result), as best as possible.

Output

Best Solution Retrieval: The algorithm returns the best solution discovered during the iterative process. This solution encapsulates the algorithm's collective adaptations and optimizations within the specified problem space.

There are a number of parameters that are meaningful when implementing an ALNS-based DRRA for use in item/material collection/distribution as described herein (and while the term "item" is used in the following discussion, it is to be appreciated that removal/insertion can include one or more of items, materials, locations, and/or transport units, individually or in combination, given that removal of any of these can result in meaningful changes to the routing performed; also, the particular values for the parameters discussed below will tend toward values in the stated ranges that militate toward faster convergence, the more urgent the situation, in the manner just noted):

Destroy and repair heuristic parameters:

Random Removal Threshold: Percentage of items to randomly remove (in embodiments such as those described herein, preferably between about 5% and about 20%, and more preferably between about 7% and about 12%).

Worst-Fit Removal Threshold: Minimum packing efficiency, travel time ratio, or other such efficiency metric for removal (in embodiments such as those described herein, preferably between about 0.5 and about 0.8, and more preferably between about 0.55 and about 0.65).

Clustered Removal Radius: Distance threshold for defining item clusters (in embodiments such as those described herein, preferably between about 500 m and about 2 km, and more preferably between about 750 m and 1 km).

Nearest Insertion Cost Function: Weighting of distance, time, and capacity constraints (which, in embodiments such as those described herein, can be determined as being preferably about 0.5 distance+about 0.3 time+about 0.2 capacity, with such probability weights at least being+/−0.1 from these values).

Regret Insertion Penalty Function: Cost calculation for removal and re-insertion (which, in embodiments such as those described herein, can be determined as being distance penalty+time penalty+capacity violation penalty).

Large neighborhood construction:

Swap Neighborhood Size: Number of items or routes to swap in one operation (in embodiments such as those described herein, preferably between about 2 and about 10, and more preferably between about 2 and about 5).

Chain Neighborhood Length: Number of consecutive items to re-order in a route (in embodiments such as those described herein, preferably between about 2 and about 15, and more preferably between about 3 and about 10).

Combined Neighborhood Operator Ratios: Probability weights for different operator combinations (in embodiments such as those described herein, preferably about 0.5 swap+0.3 chain+0.2 removal-insertion, with such probability weights at least being +/−0.1 from these values).

Adaptive mechanism parameters:

Success Threshold: Minimum improvement in solution quality to increase operator/neighborhood probability (in embodiments such as those described herein, preferably between about 1% and about 5%, and more preferably between about 3% and about 5%).

Diversity Factor: Weighting for favoring unexplored neighborhoods even if their immediate performance is lower (in embodiments such as those described herein, preferably between about 0.1 and about 0.3).

Penalty Weight: Cost associated with constraint violations for penalizing operators (in embodiments such as those described herein, preferably between about distance penalty multiplier+time penalty multiplier+capacity violation multiplier).

Acceptance criteria:

Improvement Threshold: Minimum improvement in solution quality to accept a new solution (transport unit routing; in embodiments such as those described herein, preferably between about 0.5% and about 2%, and more preferably between about 1.25% and about 2%).

Simulated Annealing Parameters: Initial temperature, cooling schedule, and acceptance probability function for probabilistic acceptance of non-improving solutions. These parameters are set to result in faster convergence, the more widespread the given error's/failure's effects (i.e., the larger number of transport units/locations, the more urgent the situation, and so the faster the DRRA should converge).

Programmatically, the following pseudocode captures various aspects of an ALNS-based DRRA:

Function to generate a new solution from the current solution def generate_new_solution(current_solution):
  Select a neighborhood based on adaptive probabilities neighborhood=choose_neighborhood( )
  Apply a destroy and repair operator from the chosen neighborhood new_solution=apply_operator(current_solution, neighborhood)
  Evaluate the new_solution and calculate penalty (if applicable) fitness_new, penalty_new=evaluate_solution(new_solution)
  return new_solution, fitness_new, penalty_new Function to choose a neighborhood based on adaptive probabilities def choose_neighborhood( ):
  Calculate total probability for each neighborhood total_prob=sum(probabilities.values( ))
  Randomly choose a neighborhood based on these probabilities selected_neighborhood=random.choices (list(probabilities.keys( )), weights=list(probabilities.values( )), k=1) [0]
  return selected_neighborhood Apply a destroy and repair operator from a chosen neighborhood def apply_operator(current_solution, neighborhood):
  Select a destroy and repair operator from the chosen neighborhood operator=random.choice(neighborhood ["operators"])
  Apply the selected operator to the current_solution new_solution=operator(current_solution)
  return new_solution Evaluate a solution and calculate penalty (if applicable) def evaluate_solution(new_solution):
  Calculate the fitness of the new_solution (e.g., total distance) fitness_new=calculate_fitness(new_solution)
  Calc penalty for any violated time windows
  (if using penalty-based repair)
  penalty_new=calculate_penalty(new_solution)
  Combine fitness and penalty into a single objective value
  objective_new=fitness_new+penalty_new
  return fitness_new, penalty_new Main ALNS algorithm loop
current_solution=initial_solution
best_solution=current_solution
best_fitness=evaluate_solution(best_solution) [0]
for iteration in range (max iterations):
  Generate a new solution
  new_solution, fitness_new, penalty_new=generate_new_solution(current_solution)
  Update adaptive probabilities
  for neighborhoods and operators based on performance update_probabilities(fitness_new, penalty_new)
  Accept new_solution if it improves the objective value
  if fitness_new+penalty_new <best fitness:
    current_solution=new_solution
    best_solution=new_solution
    best_fitness=fitness_new+penalty_new
  Implement simulated annealing or other acceptance criteria (optional)
  . . . .
  End of iteration
return best_solution As noted, a genetic algorithm can also be used as a basis for a DRRA according to the present invention. Such a DRRA iteratively manipulates and selects "chromosomes" (potential solutions) based on their "fitness" (performance in the problem context of collection/distribution of items/materials), gradually converging towards an advantageous routing of affected transport units. In the context of collection and distribution, chromosomes represent potential routes for transport units, while fitness is evaluated based on metrics like distance traveled, time taken, fuel consumption, and adherence to specific constraints (e.g., delivery windows, vehicle capacity).

A GA-based DRRA works by iteratively generating and evaluating potential routes. The routes deemed the most desirable are then used to generate new routes, and the process is repeated until a satisfactory set of routes is found. Pseudocode for a GA-based DRRA for transport unit routing begins with creating a population of chromosomes (routes), with each chromosome representing a possible delivery route. As noted, this initial population will include locations of the affected route that have not yet been serviced (unserviced nodes), and may also include other unserviced locations currently on another route (also unserviced nodes) and/or nodal groupings (represented as nodes in the graph). Each such chromosome can be encoded as a sequence of locations (the aforementioned nodes). Depending on the extent of the effects of the failure/error, and the initial population size can be randomly generated as a starting point for the DRRA to reroute large portions of the given transport unit network.

Each chromosome is then evaluated using an objective function (e.g., total distance, time windows, transport unit capacity), in order to determine that chromosome's (route's) fitness score, with higher fitness scores indicating more desirable routes based on the criteria used (e.g., costs such as distance, time involved in servicing a given location, and other such metrics). As part of an initialization of the DRRA, genetic operators are defined. These genetic operators specify the crossover and mutation operators that will be used in the genetically manipulation of the chromosomes.

Next, a selection process is performed. A DRRA according to the present disclosure can employ a roulette wheel selection process or a tournament selection process. A roulette wheel selection process selects parent chromosomes for reproduction based on those chromosomes' fitness scores, with chromosomes exhibiting higher fitness having a higher probability of being chosen. Another selection process is the tournament selection process, which selects a subset of chromosomes from the population by choosing the fittest one(s) as parents. Also performed is a crossover process, which exchanges portions of chromosomes, in order to explore improvement of the chromosomes (routes). Such crossover processes include an order crossover process and an exchange process. In an order crossover process, the DRRA exchanges sub-sequences of "genes" (locations) between two parent chromosomes to create offspring. In an exchange crossover process, the DRRA selects two crossover points on both parents and exchanges the corresponding segments, in order to generate offspring. The DRRA also performs a mutation process, which, in embodiments such as those described herein, is one of a swap mutation process, and insertion mutation process, or an inversion mutation process. A swap mutation process randomly swaps two "base pairs" (locations) within a chromosome. And insertion mutation process randomly inserts such a base pair (location) into the chromosome (route) in question. An inversion mutation process reverses the order of a random subsequence of base pairs (locations) within a chromosome (route).

Such a GA-based DRRA also performs replacement, where certain chromosomes survive from one generation to another. Using a replacement process based on elitism, a small portion of the fittest chromosomes from the previous generation are placed directly into the new population. For a DRRA implementation according to the present invention, an elitism ratio of between about 1% and about 10% is preferable (with elitism ratio of between about 5% and about 10% being more preferable, based on empirical findings).

A GA-based DRRA performs the foregoing operations for a set number of generations, or until such time that a convergence criterion is met (e.g., no significant improvement in fitness). As noted, the number of generations resulting from such a maximum number of generations and/or such criteria is, in certain embodiments, driven by the extent of the failure/error within the transport network, with more widespread interruptions necessitating faster production of a solution and so, faster convergence. In such a DRRA, the final population contains chromosomes representing the best routes found by the DRRA. Once a final population of chromosomes has been identified, the chromosome(s) exhibiting the best performance are decoded back into actual routes for the transport units. Once decoded, local search techniques (e.g., 2-opt) can be applied to further improve the routes thus obtained. In so doing, other considerations such as transport unit capacity constraints, time windows, differing transport unit types (e.g., having different capacities), dynamic information and the like can thus be considered.

In programming such a GA-based DRRA, data structures and classes can be used to maintain information regarding locations, transport units, chromosomes, and populations. For example, implementations of embodiments such as those described herein can employ a class representing a location with attributes such is an identifier, coordinates (latitude, longitude), weight of items/materials, number/amount of items/materials and optional time window constraints. A class can also be implemented to represent a transport unit that can be instantiated for each such transport unit and include attributes such as capacity, starting location, travel speed, and the like. Chromosomes can also be represented using a class structure, where a route is encoded as a sequence of location objects. Sets of chromosome objects can then be represented by a class representing the population of chromosomes.

The following functions can be used to manipulate the data structures described above
  Distance function: Calculates distance between two locations (e.g., Euclidean distance, travel time).
  Fitness function: Evaluates the quality of a chromosome (route) based on factors like total distance, time window adherence, and transport unit capacity utilization. Higher fitness values indicate better routes.
  Selection operator: Selects parent chromosomes from the population for reproduction based on their fitness (e.g., roulette wheel selection, tournament selection).
  Crossover operator: Combines genetic material from two parent chromosomes to generate offspring (e.g., order crossover, exchange crossover).
  Mutation operator: Introduces random changes to a chromosome to encourage diversity (e.g., swap mutation, insertion mutation, inversion mutation).
  Elitism selection: Preserves a small portion of the fittest chromosomes from the previous generation.
  Replacement strategy: Defines how to replace less fit chromosomes with offspring (e.g., tournament replacement).
  Decode chromosome: Converts a chromosome sequence of location objects back into an actual delivery route for a transport unit.

An implementation of the foregoing is outlined below.
1) Initialize population: Generate a set of chromosomes representing initial routes.
2) Evaluate fitness: Calculate the fitness score for each chromosome.
3) Selection: Select parent chromosomes for reproduction.
4) Crossover: Apply crossover operators to parents to create offspring.
5) Mutation: Apply mutation operators to offspring with a small probability.
6) Replacement: Replace less fit chromosomes with offspring.
7) Elitism: Keep the fittest chromosomes from the previous generation.
8) Check termination: Stop if a convergence criterion is met (e.g., no significant improvement in fitness) or after a maximum number of generations. As noted, parameter values employed in determining whether to terminate processing by a GA-based DRRA are proportional to the urgency of the particular transport system situation.
9) Decode best chromosome(s): Convert the best chromosome(s) into actual routes for the transport units. Optionally, local search techniques such as those described (e.g., 2-opt) can be applied to the resulting routes in order to improve such routing further.

Programmatically, the following pseudocode captures various aspects of an ALNS-based DRRA:

```
import random
import copy
# Define the Location class representing a pickup location
class Location:
    def __init__(self, id, coordinates, weight, time_window=None):
        self.id = id
        self.coordinates = coordinates
        self.weight = weight
        self.time_window = time_window
# Define the Transport unit class representing a delivery transport unit
class Transport unit:
    def __init__(self, capacity, start_location, travel_speed):
        self.capacity = capacity
        self.start_location = start_location
        self.travel_speed = travel_speed
# Define the Chromosome class representing a delivery route
class Chromosome:
    def __init__(self, locations):
        self.locations = locations
        self.fitness = 0 # Will be calculated during evaluation
# Def Population class containing a set of Chromosome objects
class Population:
    def __init__(self, chromosomes):
        self.chromosomes = chromosomes
# Distance function (example: Euclidean distance)
def calculate_distance(location1, location2):
    ### distance_calculation_logic
# Fitness function (example: Total distance)
def calculate_fitness(chromosome):
    ### fitness_calculation_logic
# Selection operator (example: Tournament selection)
def tournament_selection(population, tournament_size):
    ### tournament_selection_logic
# Crossover operator (example: Order crossover)
def order_crossover(parent1, parent2):
    ### order_crossover_logic
# Mutation operator (example: Swap mutation)
def swap_mutation(chromosome):
    ### swap_mutation_logic
# Replacement strategy (example: Tournament replacement)
def tournament_replacement(population, offspring, tournament_size):
    ### tournament_replacement_logic
# Decode chromosome: Convert a chromosome sequence of Location objects back into a route
def decode_chromosome(chromosome):
    ### decoding_logic
# Main program loop
def genetic_algorithm(initial_population_size, max_generations, tournament_size, mutation_probability):
    # Initialization
    population = Population([Chromosome(generate_random_route()) for _ in range(initial_population_size)])
    for generation in range (max_generations):
    # Evaluate fitness
    for chromosome in population.chromosomes:
        chromosome.fitness = calculate_fitness(chromosome)
    # Selection
    parents = tournament_selection(population, tournament_size)
    # Crossover
    offspring = [ ]
    for i in range (0, len(parents), 2):
        child1, child2 = order_crossover(parents[i], parents[i + 1])
        offspring.extend([child1, child2])
    # Mutation
    for child in offspring:
        if random.random( ) < mutation_probability:
            swap_mutation(child)
    # Replacement
    population = tournament_replacement(population, offspring, tournament_size)
    # Elitism: Keep the best chromosomes from the previous generation
    elitism_ratio = 0.1
    elite_count = int(elitism_ratio * len(population.chromosomes))
    elite_chromosomes = sorted(population.chromosomes, key=lambda x: x.fitness, reverse=True) [:elite_count]
    population.chromosomes = elite_chromosomes + offspring
    # Check term criteria (e.g., convergence or maximum generations)
    termination_criteria_check( )
```

```
# Decode the best chromosome(s) and optimize routes
best_chromosomes = sorted(population.chromosomes, key=lambda x:
x.fitness, reverse=True) [:elite_count]
 best_routes = [decode_chromosome(chromosome) for chromosome in
best_chromosomes]
 return best_routes
# Example function to generate a random route
def generate_random_route( ):
 ### random route generation
# Example usage
if __name__ == "__main__":
 initial_population_size = 50
 max_generations = 100
 tournament_size = 5
 mutation_probability = 0.1
 best_routes = genetic_algorithm(initial_population_size,
max_generations, tournament_size, mutation_probability)
 # Display or use the best_routes as needed
 for route in best_routes:
  print ("Optimized Route:", route)
```

The functions for the genetic algorithm framework above are purposed as follows.

- calculate_distance(location1, location2)—Calculates the cost (e.g., in terms of distance) between two locations. This function is part of the fitness calculation, especially when considering distance-based objectives in the context of transport unit routing.
- calculate_fitness(chromosome)—Evaluates the quality of a chromosome (route) based on factors like total distance, time window adherence, and transport unit capacity utilization. The fitness value is used in the selection if parent chromosomes and determination of the overall quality of the routes.
- generate_random_route( )—Generates a random route (chromosome) as part of the initialization process. This function is used during the creation of the initial population to introduce diversity.
- tournament_selection(population, tournament_size)—Selects parent chromosomes from the population for reproduction based on their fitness, and uses a tournament-style selection approach. This function is part of the selection phase, helping to choose chromosomes with higher fitness values for reproduction.
- order_crossover(parent1, parent2)—Combines genetic material from two parent chromosomes to generate offspring. This function implements order crossover, and is used during the crossover phase to create new routes by exchanging sub-sequences of pickup locations between two parent chromosomes.
- swap_mutation(chromosome)—Introduces random changes to a chromosome to encourage diversity. This function performs swap mutation within a chromosome. Used during the mutation phase to bring variability to the population.
- tournament_replacement(population, offspring, tournament_size)—Defines how to replace less fit chromosomes with offspring, and uses tournament-style replacement. Part of the replacement strategy, this function helps maintain a diverse and fit population by selecting the best individuals from both parents and offspring.
- decode_chromosome(chromosome)—Converts a chromosome sequence of Location objects back into an actual delivery route for a transport unit. Applied at the end of the genetic algorithm to interpret the final solutions obtained in terms of actual routes for transport units.

These functions collectively contribute to the ability of a DRRA implementing a genetic algorithm to evolve and optimize dynamic routes for transport units.

Hybrid approaches that integrate metaheuristic algorithm-based DRRA with machine learning techniques can be employed to good effect. For example, the ALNS- and GA-based DRRAs can avail themselves of predictive models for traffic conditions, delivery time estimation, refuse bin states (e.g., predicting the amount and composition of refuse in each bin at each location), and so provide a more adaptive and efficient routing solution. Further, machine learning techniques can be employed to good effect in the implementation of a hyper-heuristic DRRA, as described subsequently.

That being the case, a determination can be made as to whether machine learning operations can and should be performed (1560). Such a determination can include the recognition of whether machine learning is being employed, as well as, in such cases where machine learning is employed, whether the rerouting implemented warrants analysis by the machine learning systems and the updating of their machine learning models. If machine learning techniques are employed and the rerouting warrants the updating of the machine learning models in question, machine learning operations are performed (and the machine learning models in question are updated) (1565). As part of this learning process, the machine learning system can, in turn, update the dynamic route management information with prediction's produced by the updated machine learning models. In either case, DRMI evaluation process 1500 then concludes.

Example Application of Machine Learning to Route Determination Processes

Figure 16:
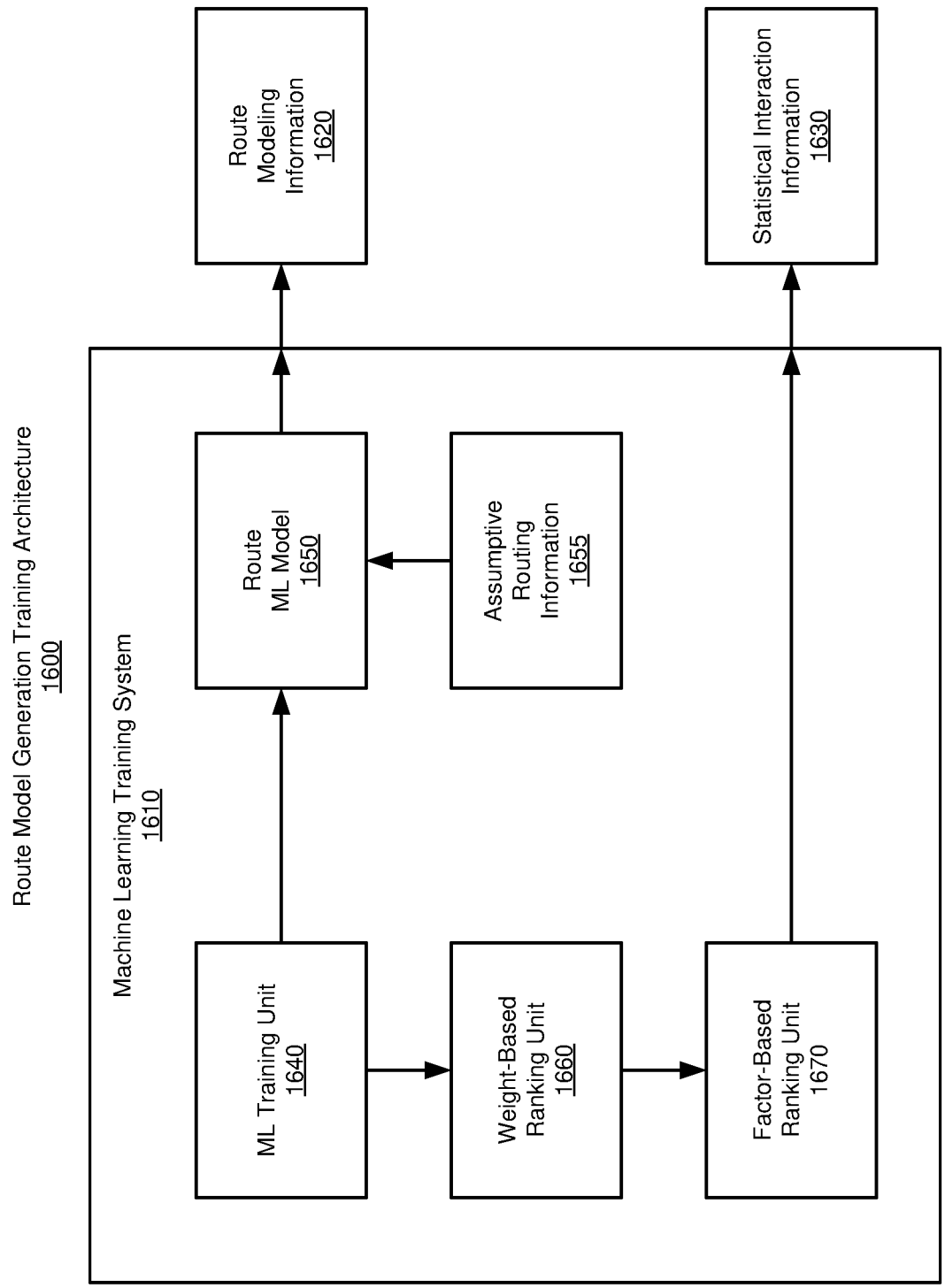
FIG. 16 is a simplified block diagram illustrating an example of a behavioral model generation training architecture, according to methods and systems such as those disclosed herein.

FIG. 16 is a simplified block diagram illustrating an example of a route model generation training architecture, according to methods and systems such as those disclosed herein, as might be used to train a route model generation unit. FIG. 16 thus depicts a route model generation training architecture 1600, which includes a machine learning training system 1610. Machine learning training system 1610 generates subject route modeling information 1620 and statistical interaction information 1630 (statistical information regarding the effects of one set of locations on another set of locations, among other statistical information). In so doing, route model generation training architecture 1600 is able to "learn" from the routing solutions generated previously, and so provide some level prediction as to the conditions and performance that might be encountered presently, whether in initial routes or any rerouting performed. Further, such techniques can be used to cleanse data by learning not only the likelihood of a given piece of information containing an error (or conversely, the accuracy of a given piece of information), but also the types of errors (error type) a given piece of information is likely to contain, and do so based on the source of the routing information. These and other machine learning analysis operations allow methods and systems such as those described herein to automatically process the information used as inputs to the route management algorithms described herein (thus doing so without human intervention, nor interpretation of that information), thereby resulting in route determinations that are faster, more efficient, and result in better routing decisions, than would otherwise be possible.

In order to generate subject route modeling information 1620 and statistical interaction information 1630, machine learning training system 1610 includes a machine learning (ML) training unit (depicted in FIG. 16 as an ML training unit 1640), which is communicatively coupled to a machine learning model (depicted in FIG. 16 as a behavioral ML model 1650) that also can take as input assumptive route information 1655. In one implementation, ML training unit 1640 is implemented using a multi-layer perceptron (MLP) architecture that employs regularization. As such, ML training unit 1640 can be a feedforward artificial neural network model that maps large sets of input data (e.g., information regarding various performance characteristics exhibited by routes and potential routes, in view of various factors) onto a set of appropriate outputs. As will be appreciated in light of the present disclosure, assumptive route information 1655 can include various (expected) values for various of these routing characteristics. ML training unit 1640 can include multiple layers of nodes in a directed graph, with each layer fully connected to the next. Except for the input nodes, each node acts as a neuron (or processing element) with a nonlinear activation function, as described elsewhere herein. As will be further appreciated, MLP techniques can provide salutary effects in the methods and systems such as those described herein due at least in part to the ability of such techniques to solve problems stochastically, which is able to allow approximate solutions for extremely complex problems such as fitness approximations of the routing characteristics described herein. Such MLP techniques are well-suited to situations such as those considered herein, at least as a result of the large number of parameters involved in each of the possible factors affecting the routes in question in these various circumstances, particularly when interactions between such parameters are considered. That being the case, such solutions can facilitate not only improvements in the prediction of routing factors, but also in the efficiency and overall accuracy of the process by which such predictions are made.

ML training unit 1640 thus receives inputs from ML training unit 1640 and assumptive route information 1655. ML training unit 1640 determines the impact of various behavioral factors (e.g., the circumstances described earlier herein) on potential routes, and maps information that may affect such routes onto corresponding output sets. Such output sets can include individual parameters, attributes, and other factors that can impact routing, as well as combinations of factors impacting routing. ML training unit 1640 generates a machine learning model (depicted in FIG. 16 as a route ML model 1650), and so is communicatively coupled thereto. ML training unit can perform such generation by mapping the aforementioned output sets onto route ML model 1650 as an MLP model. In so doing, such mapping of the output sets into the MLP model is dynamic and automatic, and so can be accomplished without human intervention. That being said, route ML model 1650 will typically take assumptive route information 1655 as input. Route ML model 1650 can thus include data that is based on current dynamic information and existing information, as part of the training operations performed. One or more constraints may also be set. ML training unit 1640 can then vary one or more routing algorithm parameters, environmental parameters, and/or other parameters to take such constraints into consideration and best meet them.

Route ML model 1650 can thus map output sets to generate an MLP model. Route ML model 1650 will typically provide for multiple layers of nodes in a directed graph or graphs, with each layer fully connected to the next. This neural network can be used to identify predicted subject behaviors and circumstances that may affect outcomes, and can account not only for the given set of conditions, but also the interactions between such conditions. Route ML model 1650, having interacted with ML training unit 1640 and having received assumptive route information 1655, can then be used to produce route modeling information 1620. As will be appreciated in light of the present disclosure, a determination can be made as to whether route modeling information 1620 appears to be sufficiently accurate (e.g., such that a given threshold for accuracy is met or exceeded). In this manner, a feedback loop of sorts is effected, wherein route ML model 1650 can be adjusted based on the sufficiency of route modeling information 1620, in order to arrive at a machine learning model that provides the requisite level of confidence in its output. The information that results can then be used to inform a route model.

ML training unit 1640 also provides information to a weight-based ranking unit 1660, which uses this information to generate weighting information. Such weight-based ranking is described in further detail in connection with FIG. 17, subsequently. ML training unit 1640 communicates information, such as the impacts on routing that have been determined, to weight-based ranking unit 1660. Weight-based ranking unit 1660 assigns a weight to each parameter based on the parameter's impact on the given routing within the environment in question. Weight-based ranking unit 1660 assigns a weight to each interaction of the parameters with the environment based on the interaction's impact on the routes produced. Weight-based ranking unit 1660 then compares the effects of such interactions, based on various sets of parameters.

Weight-based ranking unit 1660 can, for example, assign a magnitude value of weight based on the impact of a given factor's effect on a given routing outcome. A larger weight value is assigned to certain factors (e.g., distance) than other factors (e.g., overall time required to complete route). The ranking of such factors by weight-based ranking unit 1660 is then performed by interpreting the weights assigned thereto. Weight-based ranking unit 1660 provides these results to an interaction-based ranking unit 1670.

Interaction-based ranking unit 1670 ranks the weighted interactions based on the magnitudes of the weights produced by weight-based ranking unit 1660. Factor-based ranking unit 1670 determines a strength for each weighted factor. That being the case, a first weighted factor having a larger magnitude than a second weighted factor is assigned a higher order in the ranking. The strengths assigned to the factors produced by factor-based ranking unit 1670 can be stored as statistical interaction information 1630. Statistical interaction information 1630 thus represents the nature of the various factors as they apply to the given routes, from statistical perspective.

Figure 17:
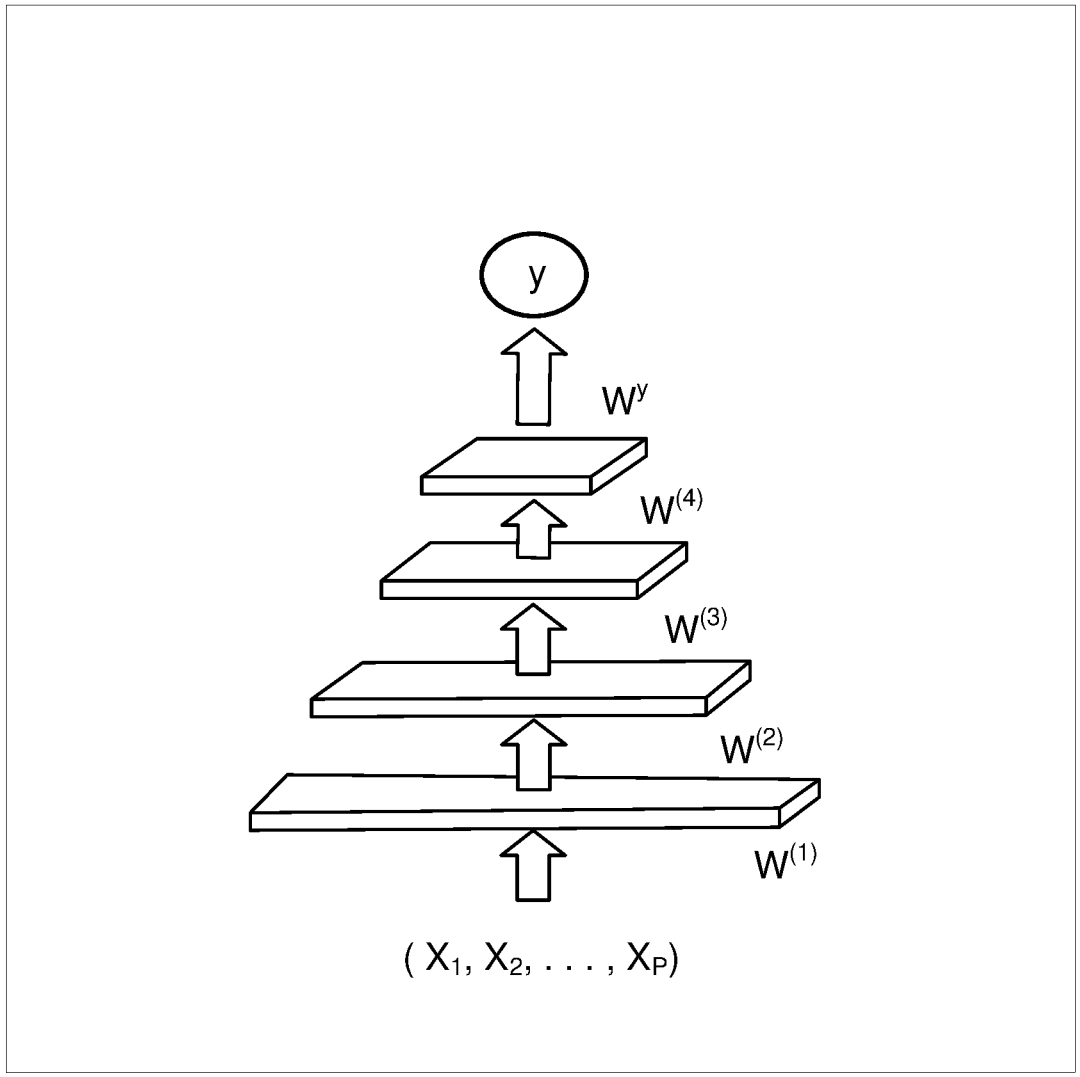
FIG. 17 is a simplified diagram illustrating an example of an factor ranking system for ranking factors based on weighted outcomes, according to methods and systems such as those disclosed herein.

FIG. 17 is a simplified diagram illustrating an example of a factor ranking system for ranking factors based on weighted factors, according to methods and systems such as those disclosed herein. FIG. 17 thus illustrates a factor ranking system 1700 including the ranking factors by interpreting one or more weight components. The ranking of such factors by interpreting weight components assigns weights to each of the attributes or parameters that impact the given route(s), for example. The ranking of such factors using weight components assigns weights to each factor/combination of two or more attributes/parameters that may have a meaningful impact on the route(s) in question. For example, the attributes or parameters can be associated with a route in a manner that is more likely to result in the given route resulting in acceptable transport system performance. A ranking unit (e.g., factor-based ranking unit 1670 of FIG. 16) assigns a weight to each such factor for each of the factors. The ranking unit can assign a weight to factors between a transport unit and various locations that might be serviced thereby, but can also consider factors between the attributes, parameters, and other such characteristics of the transport units and the situation/circumstances at hand. Weights are assigned based on the impact of the given attribute(s), parameter(s), factors, and or the like, as well as one or more combinations thereof. Through the use of machine learning systems such as those described herein, the ranking unit is able to rank such attributes, parameters, and their factors based on the assigned weights. The weighted attributes, parameters, factors, and the like, which can be used to rank their impacts on the routes determined. A magnitude value can be assigned to the weighted attributes, parameters, and factors, and so the weighted attributes, parameters, and factors can be ranked based on their magnitude values.

For example, as shown in FIG. 17, $X_1$ can represent the attribute, the parameter, or other factor as an input to the ranking factors by interpreting the weights components shown as part of factor ranking 1706, where I=1, 2, . . . . P. In this example, $X_1$, $X_2$, . . . . $X_P$ are treated as factors between various combinations of routes. The variable Y can be treated as the impact on each routes desirability, where Y=1, 2, . . . y. W(1), W(2), . . . . W(y) are thus the weights assigned to the factors according to their impact on this desirability. By assigning the weights to the attributes, parameters, and other factors, changes in such feedback resulting from the effects of various combinations of such attributes, parameters, and other factors can be used by the machine learning system to predict the desirability of the route in question based on the given factors.

Figure 18:
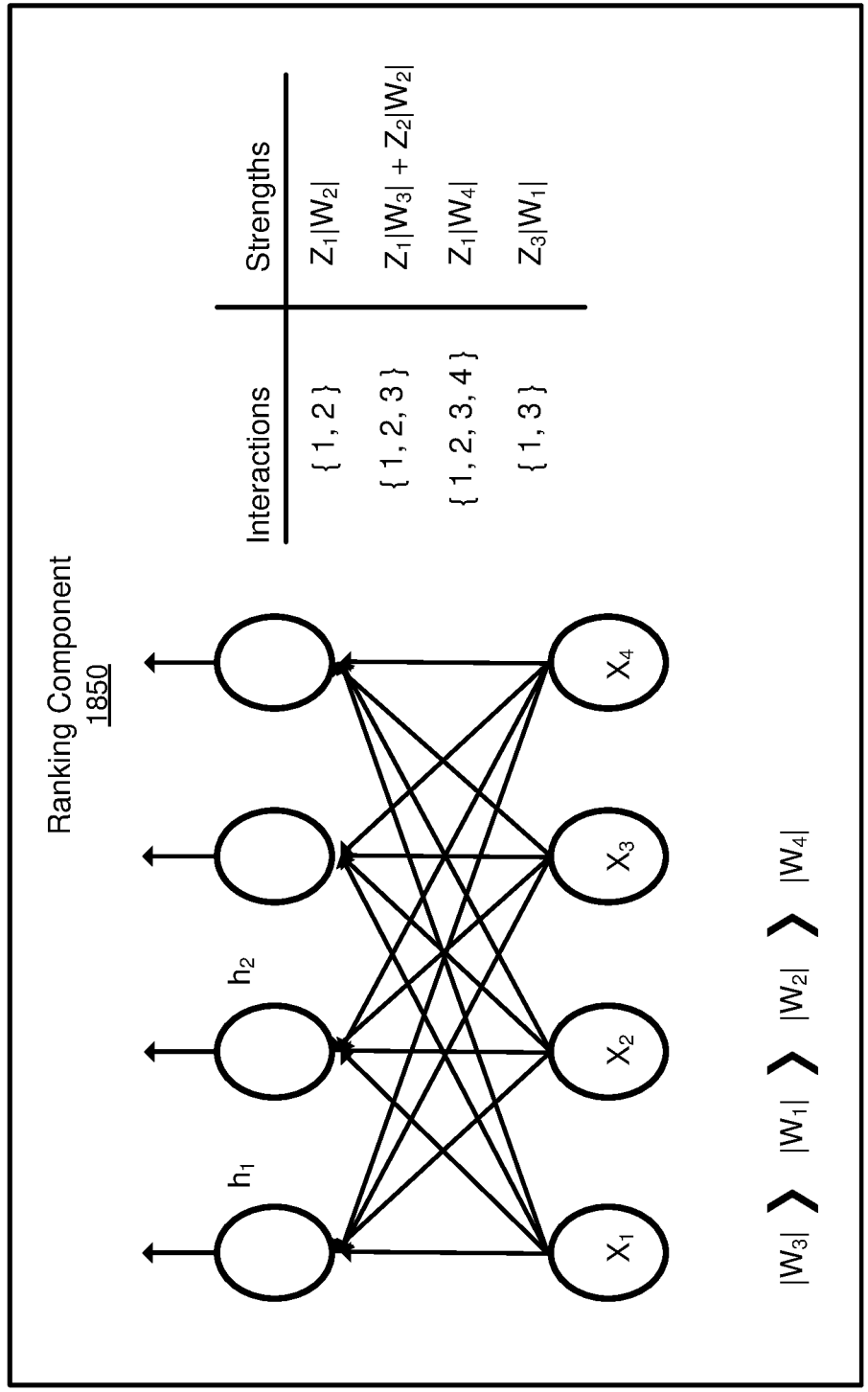
FIG. 18 is a simplified diagram illustrating an example of a higher-order ranking system for ranking attributes, parameters, and other characteristics based on their impacts on application behavior and potential outcomes, according to methods and systems such as those disclosed herein.

FIG. 18 is a simplified diagram illustrating an example of a higher-order ranking system for ranking attributes, parameters, and other factors, based on their impacts on subject behavior, according to methods and systems such as those disclosed herein. FIG. 18 thus depicts a higher-order ranking system 1800 that includes a ranking component 1850. Ranking component 1850 ranks the attributes, parameters, and other factors as higher-order interactions based on their strengths (their impacts, individually and in various combinations, on the route performance). The attributes, parameters, and other factors are, in this example, treated as the inputs $X_1$, $X_2$, $X_3$, and $X_4$. For example, the $X_1$, $X_2$, $X_3$, and $X_4$ inputs can be factors such as distance, time to service, carbon footprint, fuel costs, and other such factors. $W_1$, $W_2$, $W_3$, and $W_4$, in this example, are the weights corresponding to the inputs $X_1$, $X_2$, $X_3$, and $X_4$. Z, in this example, is a factor applied to the inputs based on the type of the attribute or parameter. Ranking component 1850 ranks the interactions of the inputs $X_1$, $X_2$, $X_3$, and $X_4$ higher-order interactions (such as $h_1$, $h_2$, . . . ) based on the strengths, such as the magnitude value of the impact on the route desirability.

Figure 19:
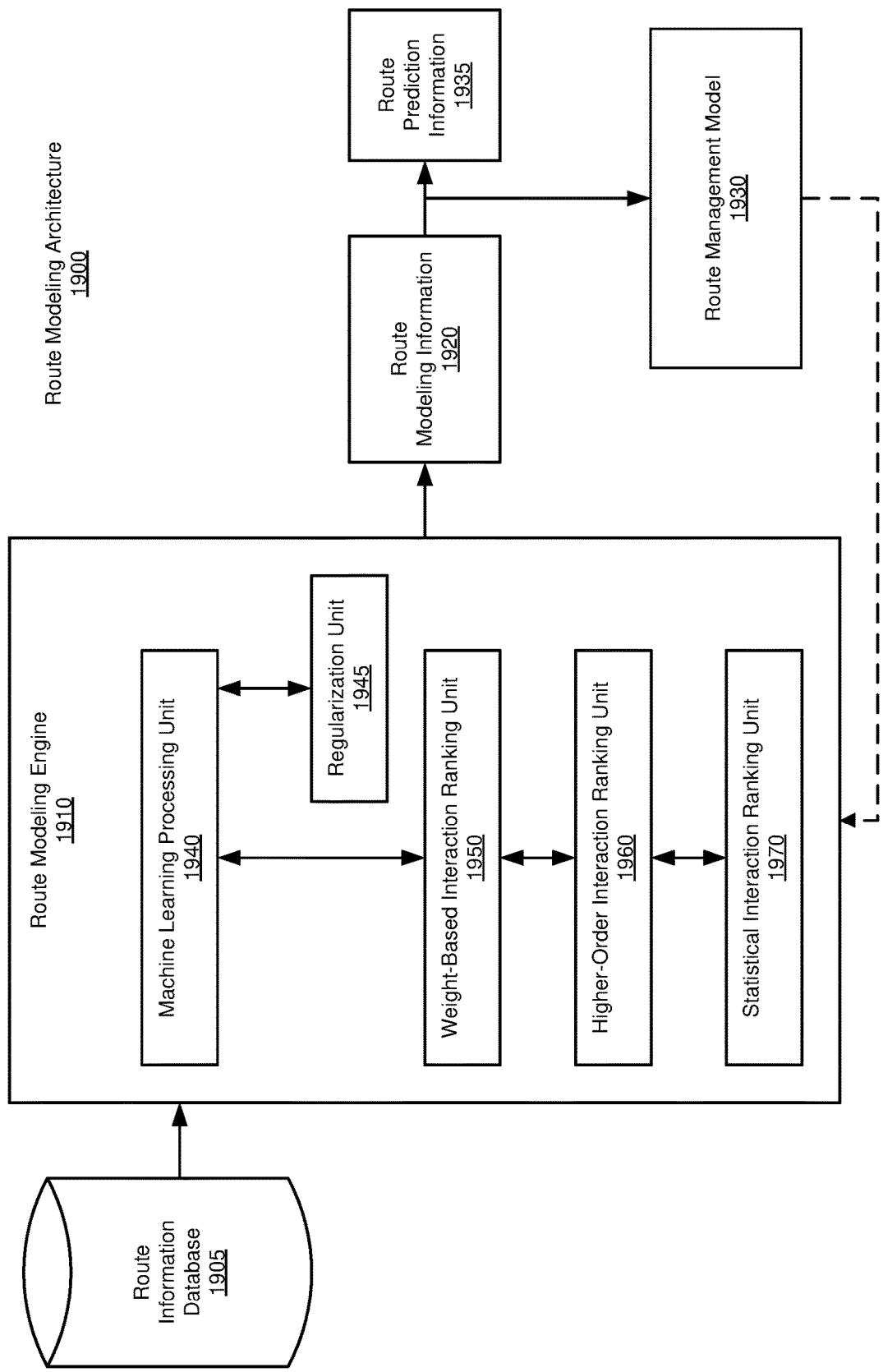
FIG. 19 is a simplified block diagram illustrating an example of a route prediction and modeling architecture, according to methods and systems such as those disclosed herein.

FIG. 19 is a simplified block diagram illustrating an example of a route prediction architecture, according to methods and systems such as those disclosed herein. FIG. 19 thus depicts a route modeling architecture 1900. As will be appreciated in light of the present disclosure and FIG. 19, route modeling architecture 1900 can be implemented, for example (and more specifically), as a multi-layer perceptron (MLP) machine learning architecture. Information from a route information database 1905 provides route information to a route modeling engine 1910. In turn, route modeling engine 1910 produces subject route modeling information 1920 (which can be, e.g., an MLP model). Results from the processing of subject route modeling information 1920 can then be made available as an route management model 1930 and route prediction information 1935. Outcome prediction model 1930 can then be used by a route management server such as route management server 260 to analyze routing and other information, in order to provide predictions (predictive information), what-if analyses, and other functionality to other modules within a route management system according to the present disclosure.

In order to produce the requisite information for ingestion as route management model 1930, route modeling engine 1910 includes a machine learning processing unit 1940, which can be implemented, for example, as a multi-layer perceptron (MLP) processing unit. Machine learning processing unit 1940 is coupled to communicate with a regularization unit 1945. Regularization unit 1945, in certain embodiments, implements a process of adding information to that received by machine learning processing unit 1940, in order to address situations in which insufficiently-defined information is provided (in route modeling engine 1910, for example, a lack of certain measurements, factors with excessive variability, and the like) and/or to prevent overfitting (the production of an analysis that corresponds too closely or exactly to a particular set of data, and may therefore fail to fit additional data or predict future observations reliably; in route modeling engine 1910, for example, scenarios in which machine learning model 1920 would otherwise be tied too closely to a given factor such that the model's overdependence on that factor would result in an unacceptably high sensitivity to changes in that factor, as between a given factor that might vary widely as between potential routing situations). For example, an MLP network with large network weights can be a sign of an unstable network, where small changes in the input can lead to large changes in the output. This can be a sign that the network has "overfit" the training dataset, and so is more likely to perform poorly when making predictions on new data. A solution to this problem is to update the learning algorithm to encourage the network to keep the weights small. This is called weight regularization and it can be used as a general technique to reduce overfitting of the training dataset and improve the generalization of the model. As will be appreciated in light of the present disclosure, given the potential for wide variability in factors such as collection/distribution goals, performance, system attributes, and other such factors, the benefits of regularization in applications such as those described herein will be evident.

In support of the generation of route modeling information 1920 (and so, route management model 1930), ML processing unit 1940 also produces information that is communicated to a weight-based interaction ranking unit 1950. Weight-based interaction ranking unit 1950 generates weight-based interaction ranking information, that is, in turn, provided to a higher-order interaction ranking unit 1960, for purposes and to effect such as those described earlier. In turn, having generated higher-order interaction ranking information, higher-order interaction ranking unit 1960 communicates such information to a statistical interaction ranking unit 1970. In so doing, route modeling engine 1910 is able to appropriately weight relevant factors, and produce statistical information that allows route modeling information 1920 to be used in creating route modeling information 1920 in such a manner that uncontrolled swings in outcome predictions produced using route modeling information 1920 (and ultimately, route management model 1930) are avoided.

Figure 20:
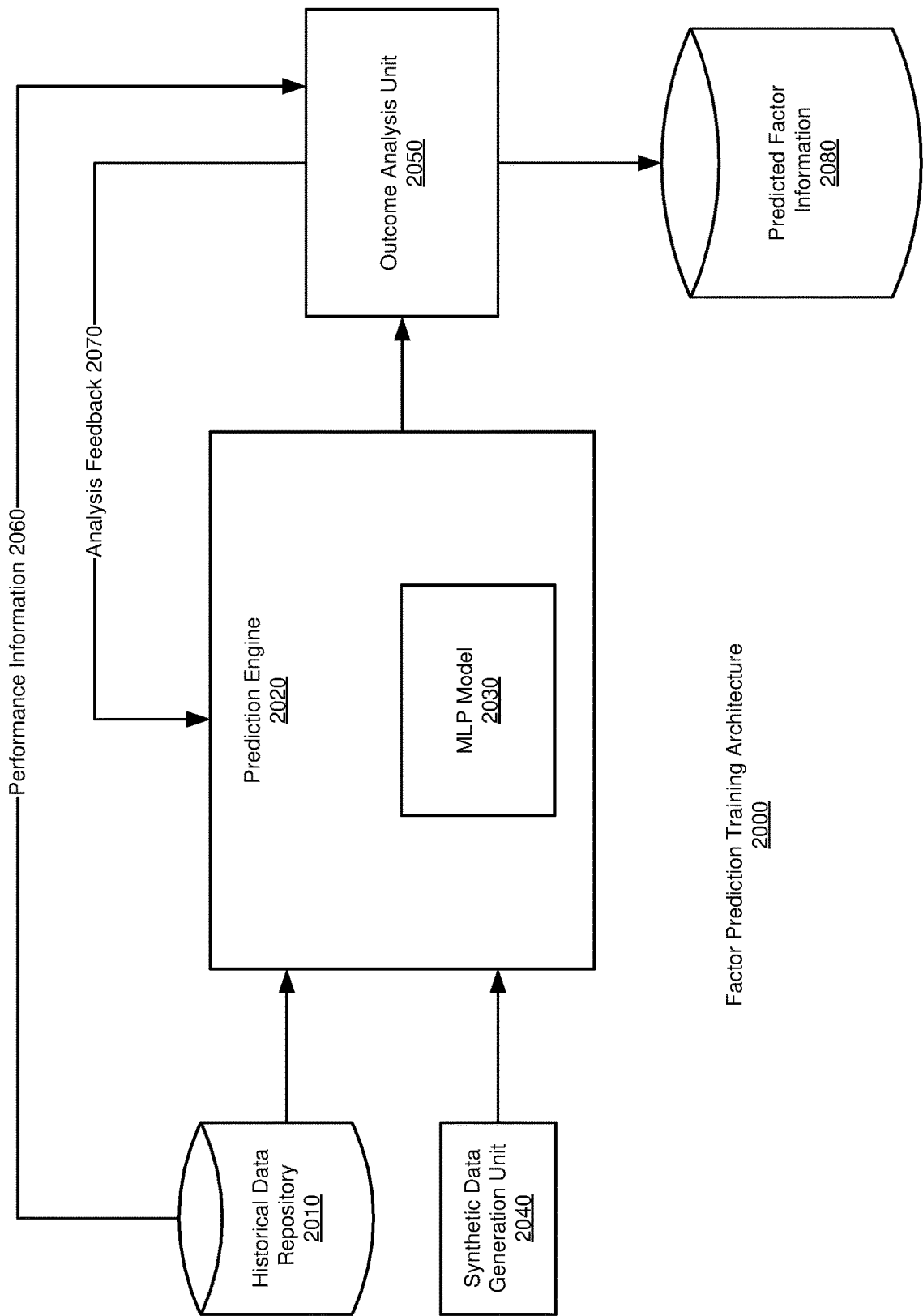
FIG. 20 is a simplified block diagram illustrating an example of a factor prediction training architecture, according to methods and systems such as those disclosed herein.
Figure 21:
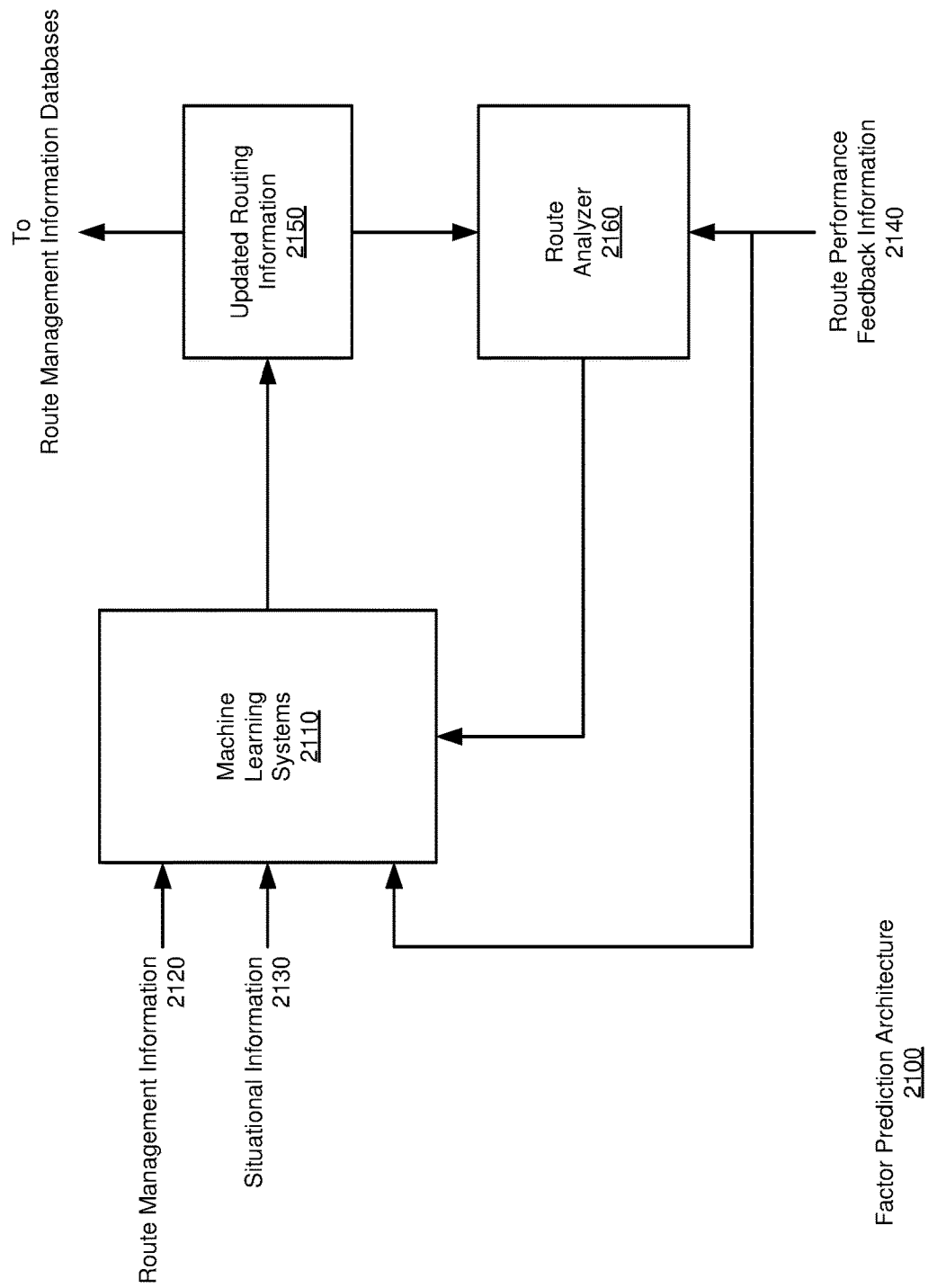
FIG. 21 is a simplified block diagram illustrating an example of a factor prediction architecture, according to methods and systems such as those disclosed herein.

FIG. 20 is a simplified block diagram illustrating an example of a factor prediction training architecture, according to methods and systems such as those disclosed herein. FIG. 20 thus depicts a factor prediction training architecture 2000. Factor prediction training architecture 2000, in the manner noted in connection with machine learning training system 1610 of FIG. 16, uses historical data such as that discussed earlier herein that is provided by (or retrieved from) historical data repository 2010, for example. For example, historical data repository 2010 can include historical information regarding routes taken by transport units, historical traffic patterns, performance (e.g., in the form of delivery times, collection times, delays, fuel consumption, transport unit operator behavior, and the like), and other historical data. This historical data is provided to (or retrieved by) a prediction engine 2020. Prediction engine 2020 uses the historical data from historical data repository 2010 to update a multi-layer perceptron (MLP) model 2030, and can also receive synthetic training data from a synthetic data generation unit 2040 to such effect. Synthetic data from synthetic data generation unit 2040 is generated to simulate various routing scenarios and circumstances, in order to make MLP model 2030 more robust (e.g., with regard to its efficacy in various scenarios (situations and circumstances), as well as its ability to remain stable in various scenarios). Prediction engine 2020 provides results to an outcome analysis unit 2050, based on information generated by MLP model 2030 using the historical data from historical data repository 2010 and synthetic data from synthetic data generation unit 2040. Outcome analysis unit 840 analyzes the outcomes produced by prediction engine 2020 (produced by way of MLP model 2030), in view of routing performance observed as a result of information regarding the factors giving rise to those scenarios (received by outcome analysis unit 2050 as performance information 2060). Such analysis results are fed back to prediction engine 2020 (as analysis feedback 2070), and used to update MLP model 2030. Factor information for various of the factors considered is, once confirmed as being acceptable (also as a result of the outcome analysis performed), stored as predicted factor information in a predicted factor information repository 2080. The predicted factor information stored is thus made available for use in the generation of routes performed as part of the route management processes described herein. For example, such predictions (as noted in connection with static route determination process 1300 of FIG. 13) can be used in combination with historical information (e.g., a determination of historical routing parameters), as inputs to a nodal grouping process and static routing information process FIG. 21 is a simplified block diagram illustrating an example of a factor prediction architecture, according to methods and systems such as those disclosed herein. Machine learning inputs are presented to machine learning systems 2110, and include route management information 2120, situational information 2130, and route performance feedback information 2140. Route management information 2120 can include information from one or more route management information databases (e.g., static route management information, dynamic route management information, and other route management information), historical data, and other such information, including information regarding existing routes. Situational information 2130 can include information regarding the current state of the transport system including the state of one or more transport units (e.g., load capacity consumed or available, current location, fuel status, unserviced locations remaining on each transport unit's route, and the like), current information regarding various system state factors (e.g., traffic (e.g., changing traffic patterns, traffic congestion level, traffic volume, and the like), current and forecast weather, manpower levels, changes to service priority levels, and the like), events (e.g., equipment failures, accidents, etc.), conditions (e.g., traffic congestion currently being experienced, inclement weather currently being experienced, etc.), and other circumstances (e.g., labor strikes, fuel shortages, etc.) outside the normal operations of a collection/distribution system, including the dynamic determination of routes and the rerouting of transport units in such circumstances). Route performance feedback information 2140 Can include information regarding route efficiency, service location data (e.g., data regarding refuse containers), transport unit operator performance, environmental impacts, and the like. With regard to route efficiency, information regarding distance traveled (e.g., total distance covered by each transport unit per route and per transport unit operator shift), time taken (e.g., time spent on each route segment (e.g., driving, collecting, dumping) and total service time required), fuel consumption (e.g., on a per transport unit, per route, and/or per service location), stop duration (e.g., average and individual stop times at service locations, in order to identify potential delays or inefficiencies), planned route deviation (e.g., frequency and causes for failures to maintain assigned routes), and the like. Service location data can include the number of locations serviced, the extent to which service was required (e.g., a fullness level of each refuse bin (e.g., as by way of sensors within such bins and/or sensors within each transport unit), missed service (including instances and locations), service location information (e.g., maximum collection amount at each location, expected item/material type/consistency, and the like), and the like. Transport unit operator performance can take into consideration the productivity of individuals and/or crews, compliance with safety regulations, personnel feedback, and the like. Information regarding environmental impacts can include admission data (e.g., as by sensors on each transport unit, tracking vehicle emissions per route and service location), noise levels (also collectible by sensor), fuel efficiency metrics, and the like.

Machine learning systems 2110 analyze these machine learning inputs, and update the route management information with updated routing information 2150. Updated routing information 2150 is sent to one or more of the route management system's route management information databases, making such updated routing information available to other components of the route management system. Such updated routing information is also provided to a route analyzer 2160, which analyzes the updated routing information in light of route performance feedback information received once the updated routing information has been made available via the route management information databases. The output of route analyzer 2160 is also provided to machine learning systems 2110 as feedback with respect to the routing/rerouting solutions generated by machine learning systems 2110. Such feedback, resulting from analyzing the updated routing information in light of the route performance feedback information received, provides for positive reinforcement of routing information that results in improved performance of the transport system. Further, it will be appreciated that such positive reinforcement also tends to deemphasize poorer routing solutions, thereby protecting such systems from feedback resulting in local minima and performance.

In view of the foregoing, as well as earlier discussions herein, it is to be appreciated that a machine learning systems such as that described above can not only be used for the prediction of factors in determining transport unit routes, but can also be used to implement a hyper-heuristic system that is able to identify the appropriate heuristic(s)/metaheuristic(s) for rerouting analyses using the machine learning techniques described above. In general, a hyper-heuristic is a search heuristic that automates the selection, combination, generation, and adaptation of multiple heuristics/metaheuristics. In addition to the predictive capabilities offered, such a hyper-heuristic provides for the selection of not only the heuristic(s)/metaheuristic(s) to be used in a given situation, but also the parameters therefor. In so doing, such a hyper-heuristic is able to tailor the heuristic(s)/metaheuristic(s) invoked and the applicable parameters to the circumstances faced by the transport system. In so doing, the resources needed for potentially heavy customization of one heuristic/metaheuristic or another for a given potential situation (a particular advantage when dealing with rapidly-changing systemwide failures). Such a hyper-heuristic, using the aforementioned machine learning techniques, provides for intelligently selecting a suitable heuristic/metaheuristic for a given circumstance. While it will be appreciated that such techniques can also be used to generate suitable heuristics, the present disclosure employs machine learning in such an approach only to selecting the appropriate heuristic/metaheuristic. In so doing, a hyper-heuristic such as that described herein provides a mechanism for searching a search space of heuristic(s)/metaheuristic(s) (rather than attempting to include components thereof, and build the desired result, a more time-consuming and compute-intensive alternative than selection, and, as a result, one which the potential circumstances do not favor), which reduces the amount of domain knowledge needed to address such considerations (e.g., as might be necessitated by performing such selection manually). Such a selection thus processes the circumstances and state information without the need for operators to have extensive domain expertise (whether in heuristics or in the domain in which the problem lies).

Given the exigencies involved, a dynamic hyper-heuristic that selects a heuristic from a number of heuristics would be preferable, in order to allow such a system to respond quickly to the circumstances at hand. In this type of hyper-heuristics, the hyper-heuristic framework is provided with a set of heuristics from a preplanned universe of heuristics (in embodiments such as those described herein, metaheuristics) that can be used to determine the rerouting needed to address the given circumstances. At every stage, a component of the hyper-heuristic called the selection mechanism chooses a metaheuristic and applies the selected metaheuristic to the given situation. Another component of the hyper-heuristic (the acceptance criterion) decides whether to accept or reject the routing solution that was created using the selected metaheuristic. If the selected metaheuristic is accepted, the selected metaheuristic replaces the incumbent metaheuristic, but if rejected, the selected metaheuristic is discarded. Thus, a metaheuristic according to the present disclosure can select from a number of potential DRRA algorithms. Such potential algorithms can include:
  Adaptive large neighborhood search (as noted)
  Genetic algorithm (as noted)
  Simulated annealing/real-time simulated annealing (as noted)
  A*/anytime A* (discussed below)
  Tabu list search/real-time tabu search (as noted)
  Real-time dynamic programming Of particular interest as an alternative to ALNS and GA is a DRRA based on the A* ("A-star") algorithm, which uses an estimate of the distance to the destination to guide its search. A* is a graph traversal and path search algorithm. A consideration in using an A*-based DRRA is such a DRRA's $O(b^d)$ space complexity, that results in constructs representing all generated nodes in memory. However, given the DRRA's goal of reducing the number of affected routes, transport units, and locations, coupled with the potential urgency of such situations, such considerations can be tolerated, particularly in light of the performance provided by an A*-based DRRA.

An A*-based DRRA can be seen as an extension of a Dijkstra-based SRRA in some respects. An A*-based DRRA according to the present disclosure achieves better performance by using its heuristics to guide its search. It is to be appreciated that an A*-based DRRA finds the shortest path from a specified source to a specified goal, but not the shortest-path tree from a specified source to all possible goals. This is a necessary constraint when using such a specific-goal-directed heuristic, but is well-tolerated in the situations addressed by a hyper-heuristic in response to circumstances encountered by a route management system according to the present disclosure.

An A*-based DRRA is thus an informed search algorithm, or a best-first search, meaning that such a DRRA is formulated in terms of weighted graphs: starting from a specific starting node of a graph, such a DRRA aims to find a path to the given goal node having the smallest cost (least distance travelled, shortest time, etc.), and accomplishes this by maintaining a tree of paths originating at the start node and extending those paths one edge at a time until its termination criterion is satisfied. At each iteration of its main loop, an A*-based DRRA needs to determine which of its paths to extend. It does so based on the cost of the path and an estimate of the cost required to extend the path all the way to the goal.

Specifically, an A*-based DRRA selects the path that minimizes $$f(n)=g(n)+h(n)$$

where n is the next node on the path, g(n) is the cost of the path from the start node to n, and h(n) is a heuristic function that estimates the cost of the cheapest path from n to the goal. The A*-based DRRA terminates when the chosen path to extend is a path from start to goal or if there are no paths eligible to be extended. The A*-based DRRA uses a priority queue to perform the repeated selection of minimum (estimated) cost nodes to expand. At each step of the DRRA, the node with the lowest f(x) value is removed from the queue, the f and g values of its neighbors are updated accordingly, and these neighbors are added to the queue. The algorithm continues until a removed node (thus the node with the lowest f value out of all fringe nodes) is a goal node. The f value of that goal is then also the cost of the shortest path, given that h at the goal is zero in an admissible heuristic.

With regard to the Anytime A*-based DRRA, as an extension of an A*-based DRRA, such an approach relies on an iterative process that improves the solution as more time is available. Further, an Anytime A*-based DRRA returns a solution even if interrupted prematurely, making such an approach useful for the real-time/time-constrained scenarios envisioned for such a DRRA. The salient difference is that, in order to do so, an Anytime A*-based DRRA trades off optimality for flexibility, making such an approach suitable for the dynamic and time-sensitive nature of situations such as those contemplated, where a good solution is needed quickly, even if such a solution may not necessarily be the best possible solution.

The foregoing provides the length of the shortest path, and also provides the actual sequence of nodes by employing a construct in which each node on the path is tracked. After such a DRRA executes, the ending node's information and the construct will point to its predecessor, and so on, until some node's predecessor is the start node.

The following pseudocode describes a DRRA that employs an A* approach.

```
function reconstruct_path(cameFrom, current)
    total_path := {current}
    while current in cameFrom.Keys:
        current ::= cameFrom[current]
        total_path.prepend(current)
    return total_path
// A* finds a path from start to goal.
// h - heuristic function. h(n) estimates cost to reach goal from node n.
function A_Star (start, goal, h)
    // The set of discovered nodes that may need to be (re-) expanded.
    // Initially, only the start node is known.
    // This is usually implemented as a min-heap or priority queue rather than a hash-set.
    openSet := {start}
    // For node n, cameFrom[n] is the node immediately preceding node n
    // on the cheapest path from the start preceding to n currently known.
    cameFrom: = an empty map
    // For node n, gScore[n] is cost of the cheapest path
    // from start to n currently known.
    gScore := map with default value of Infinity
    gScore[start] := 0
    // For node n, fScore[n] := gScore[n] + h(n).
    // fScore[n] represents our current best guess as to how cheap
    // a path could be from start to finish if it goes through n.
    fScore := map with default value of Infinity
    fScore[start] := h(start)
    while openSet is not empty
        // This operation can occur in O(Log(N)) time
        // if openSet is a min-heap or a priority queue
        current := the node in openSet having the lowest fScore[ ] value
        if current = goal
            return reconstruct_path(cameFrom, current)
        openSet.Remove(current)
        for each neighbor of current
            // d(current,neighbor) is the weight of the edge
            // from current to neighbor
            // tentative_gScore is the distance from start to
            // the neighbor through current
            tentative_gScore := gScore[current] + d(current, neighbor)
            if tentative_gScore < gScore[neighbor]
                // Record this path to neighbor because
                // this path is better than any previous one.
                cameFrom[neighbor] := current
                gScore[neighbor] := tentative_gScore
                fScore[neighbor] := tentative_gScore + h(neighbor)
                if neighbor not in openSet
                    openSet.add(neighbor)
    // Open set is empty but goal was never reached
    return failure
```

It will be noted that the manner in which the priority queue handles ties can have a significant effect on performance in certain situations. If ties are broken so the queue behaves in a last-in/first-out (LIFO) manner, an A*-based DRRA will behave like depth-first search among equal cost paths (avoiding exploring more than one equally optimal solution).

Returning now to the discussion of a hyper-heuristic for use in selecting an appropriate DRRA in the given situation, the general operations involved in such an approach are now described:

Pre-processing: Analyze the problem characteristics and resource constraints.

Metaheuristic selection module: Use a higher-level hyper-heuristic to perform selection, in light of the following:
  Collection: Based on problem size, time constraints, and network complexity, select between the potential metaheuristics. In certain embodiments, this will be a selection between ALNS (efficient exploration) or GA (robust solutions). However, as noted previously, other alternatives can be considered, including simulated annealing/real-time simulated annealing, A*/Anytime A*, tabu list search, and, real-time dynamic programming, depending on the situation at hand.
  Distribution: Choose the most suitable approach based on:
    Static environment
      Regular ALNS for efficient adaptation, GA for multi-objective optimization.
    Dynamic environment
      Real-time ALNS for reactive behavior
      Anytime A* for reliably-good solutions
      Simulated annealing, or tabu search for balancing exploration and local optima avoidance.
      RTDP for comparatively small affected areas Metaheuristic execution: The selected metaheuristic is executed.

Monitoring and feedback: Continuously monitor performance and adjust hyper-heuristic parameters or even switch heuristics if necessary.

From a programmatic standpoint, a metaheuristic selection module such as that noted above can be implemented in the manner now presented, taking into consideration the factors noted. A metaheuristic selection module according to the present disclosure supports the selection of metaheuristics for collection, distribution, and mixed collection/distribution routing. With regard to collection, a hyper-heuristic DRRA selects from the following DRRA metaheuristics: an ALNS metaheuristic, a GA metaheuristic, and a A* search algorithm. A metaheuristic selection module such as that contemplated by the present disclosure can support collection, distribution, and mixed collection/distribution route management systems, as noted.

In selecting a metaheuristic for collection operations, such a hyper-heuristic DRRA can consider the scale of the transport network to be rerouted, the time sensitivity involved, and the constraints applied to such rerouting solutions. For example, in the case of a large-scale portions of transportation networks in time sensitive situations, an ALNS-based DRRA is selected. Such an ALNS-based DRRA is selected in such situations because such an approach provides for efficient exploration capabilities through diverse destruction and repair operators and adaptive operator weights based on past performance and situational characteristics. When the affected portion of the transport network is of a medium scale, particularly in situations in which restrictions on the timing of such collection operations is more flexible, a GA-based DRRA can be selected, providing robustness and the ability to find diverse routing solutions. Use of a GA-based DRRA in such situations is advantageous because such an approach is able to find such diverse solutions even with incomplete information (e.g., a potential factor in operating transport systems), and is also advantageous by virtue of its balance between exploration and exploitation. For smaller affected areas of the transport system and/or where such areas are under tight constraints, an Anytime A*-based DRRA is selected, providing desirable solutions within the time limits in effect, preferably in well-defined areas and more static conditions (e.g., as will typically be the case, for example, where a single transport unit fails).

The foregoing considerations can be understood based on comparative extent. With regard to transport network scale, a large-scale portion of a transport network will have hundreds, and potentially thousands of nodes (collection points), and so involve multiple routes (e.g., nodal groupings), as well as complex connections therebetween. Medium-scale networks will typically involve tens to hundreds of nodes (e.g., a small number of routes) and moderate levels of complexity, while small-scale networks will have a few dozen nodes or less and relatively straightforward connections (e.g., a single route being affected by a failed transport unit).

With regard to time sensitivity, a variety of scenarios can necessitate the provision of best-effort timing and efficient collection solutions. Such considerations include urgent situations that necessitate the speedy generation of potential routing solutions. Such situations militate towards a solution that involves a reduced amount of route exploration, such as an ALNS-based DRRA. Certain situations involve strict deadlines (e.g., the collection and/or delivery of time sensitive materials for construction, just-in-time manufacturing, and other such situations), favoring a DRRA that balances exploration and exploitation within tighter time frames (e.g., a tabu-search-based DRRA). Scheduling based on time windows can also present challenges (e.g., collection and/or delivery that must occur within certain time windows), which must be able to deal with traffic restrictions and the like. A DRRA that provide flexibility (e.g., GA-based DRRA) provide such functionality, balancing efficient collection with adherence to applicable time windows. Tightly-constrained situations can also impose numerous restrictions on route planning, such as transport unit capacity limits, strict time windows, road closures, or other logistical hurdles that significantly limit potential routes.

In selecting a metaheuristic for distribution operations, such a hyper-heuristic DRRA can consider the scale of the transport network to be rerouted, the time sensitivity involved, and the constraints applied to such rerouting solutions. As before, in the case of a large-scale portions of transportation networks in time sensitive situations, an ALNS-based DRRA is selected. Such an ALNS-based DRRA is selected in such situations because such an approach provides for efficient exploration capabilities through diverse destruction and repair operators and adaptive operator weights based on past performance and situational characteristics. When the affected portion of the transport network is of a medium scale, particularly in situations in which restrictions on the timing of such collection operations is more flexible, a GA-based DRRA can be selected, providing robustness and the ability to find diverse routing solutions. Use of a GA-based DRRA in such situations is advantageous because such an approach is able to find such diverse solutions even with incomplete information (e.g., a potential factor in operating transport systems), and is also advantageous by virtue of its balance between exploration and exploitation. For smaller affected areas of the transport system and/or where such areas are under tight constraints, an Anytime A*-based DRRA is selected, providing desirable solutions within the time limits in effect, preferably in well-defined areas and more static conditions (e.g., as will typically be the case, for example, where a single transport unit fails). The foregoing considerations can be understood based on the comparative extents described earlier, as well as the earlier discussions on time sensitivity and other constraints.

Another consideration when performing distribution operations is the nature of the circumstances and situation being experienced by the transport system, with respect to the environment of the distribution transport system. In such scenarios, the changes to the transport system can be the result of more static environmental effects (e.g., including the comparatively limited effects of a single transport unit/a small number of transport units experiencing errors/failures, or can be the result of more dynamic environmental effects (e.g., including circumstances affecting large portions of the transport network and/or significant numbers of transport units within the transport unit fleet, systemwide failures, and the like). In a more static distribution environment, a hyper-heuristic DRRA will select between an ALNS-based DRRA and a GA-based DRRA. An ALNS-based DRRA will be selected in a scenario in which a large-scale failure/error has occurred and/or the distribution operations are time sensitive, maintaining advantageous routing solution quality while exploring routing improvements. In the alternative, a GA-based DRRA can be selected in scenarios in which multi-objective optimization with conflicting goals (e.g., costs, deadline/time windows, and the like) are to be met, with population diversity facilitating the handling of tradeoffs and uncertainties that can result.

In a more dynamic distribution environment (where circumstances affect large portions of the transport network and/or transport units, systemwide failures, and so on), a hyper-heuristic DRRA selects from a set of DRRAs that includes the aforementioned ALNS-based DRRA and GA-based DRRA, but also includes an Anytime A*-based DRRA, a simulated-annealing-based DRRA, a tabu-search-based DRRA (a TS-based DRRA), and a DRRA that employs real-time dynamic programming(an RTDP-based DRRA). In some contrast to their application in a more static environment, the ALNS-based and GA-based DRRAs are selected in a dynamic distribution environment to address needs different therefrom. In certain such scenarios (e.g., in circumstances of smaller extent), an ALNS-based DRRA is selected for its ability to continuously adapt to demand changes and unforeseen events (and so to better handle such dynamic circumstances), reacting quickly to real-time traffic changes and other disruptions by prioritizing fast adaptation over extensive exploration. In certain such scenarios (e.g., in circumstances of smaller extent), a GA-based DRRA is again effective for multi-objective solutions with conflicting goals.

In a dynamic distribution scenario, however, other DRRAs can be made available for selection by a hyper-heuristic DRRA according to the present disclosure, as noted. These include an Anytime A*-based DRRA, a simulated-annealing-based DRRA, a TS-based DRRA, and an RTDP-based DRRA. An Anytime A*-based DRRA, described in detail earlier herein, is selected by virtue of its ability to provide reliably good solutions, even in the face of comparatively-aggressive time constraints and/or changing environments by balancing solution quality with speed of response. A simulated-annealing-based DRRA is selected in scenarios in which the effects of circumstances on the transport network result in complex, highly dynamic situations, and does so by balancing exploration and local optima avoidance. As noted elsewhere herein, a TS-based DRRA balances exploration and exploitation to avoid local optima in highly dynamic situations by way of preventing recently-explored routing solutions. An RTDP-based DRRA is selected when smaller areas of the given transport network are affected, particularly where the changes involved are moderately predictable, and is able to efficiently update partial routing solutions in response to new information (it being appreciated that such an approach can also be used to good effect in a static route rerouting algorithm such as that described in connection with FIG. 14B).

Additionally, a hyper-heuristic DRRA can take into account other DRRA selection considerations. For example, such a hyper-heuristic DRRA can adjust the selection probabilities and perform heuristic tuning. Employing and adjusting selection probabilities involves assigning dynamic probabilities used in choosing between the available DRRAs, based on the transport network's situation, the circumstances at hand, performance of past routing solutions and other such considerations. Further, in its receipt of route management information, situational information, and the like, the machine learning system in question can implement online parameter tuning for the parameters of the selected DRRA, facilitating the further adaptation of the selected DRRA to such scenarios.

Once a DRRA has been selected, the selected DRRA is executed using the information at hand. The selected DRRA is configured using the applicable DRRA parameters, as appropriate to the given situation, with candidate routing solutions generated thereby. In a collection scenario (where the hyper-heuristic DRRA selects between an ALNS-based DRRA, a GA-based DRRA, and an Anytime A*-based DRRA), such execution includes generation of candidate routing solutions by the selected DRRA (e.g., through destruction/repair operators (ALNS-based DRRA), crossover/mutation (GA-based DRRA), or heuristic search(Anytime A*-based DRRA). The candidate routing solutions thus generated are then evaluated based on various metrics (e.g., including, potentially, distance, time, capacity constraints, and the like, among other objectives). The routing solution or population that best meets the aforementioned criteria is then selected for the next iteration. A similar process is performed with regard to a distribution scenario (where the hyper-heuristic DRRA selects between an ALNS-based DRRA, a GA-based DRRA, an Anytime A*-based DRRA, a simulated-annealing-based DRRA, a TS-based DRRA, and an RTDP-based DRRA), in which the selected DRRA is executed. Here again, candidate routing solutions are generated by the selected DRRA, the resulting routing solutions are evaluated using metrics such as those described above, the routing solution or population that best meets such metrics being selected for the next iteration.

In both the collection and distribution scenarios, monitoring is performed, and feedback as to the performance of the selected routing solution (or routing update, and so "rerouting") can be evaluated. Such monitoring can include performance tracking, in which the route management system continuously monitors various metrics to ensure the given routing solution continues to meet the needs of the transport system. Such metrics can include routing solution quality (e.g., with respect to distance, time, cost, customer satisfaction, and other such quality metrics), execution time and resource utilization, DRRA computational performance, DRRA adaptation effectiveness, and other such metrics. In the face of such monitoring, adaptive adjustments can be made to the selected DRRA. These can include updating the hyper-heuristic selection probabilities, tuning one or more metaheuristic parameters for the selected DRRA, tuning one or more hyper-heuristic parameters for the hyper-heuristic DRRA, and switching from the currently-selected DRRA to another of the available DRRAs (referred to herein as heuristic switching). With regard to heuristic switching, such can be performed in scenarios in which metaheuristic parameters for the selected DRRA drift too far out of line, for example. Such metaheuristic parameter drift can be determined based on an absolute value of such drift, a percentage-change limit, and the like, and can be based on the drift of one or more such metaheuristic parameters. Using such metrics, a determination can be made as to whether the currently-selected DRRA is considered to be consistently underperforming, at which point a determination can be made as to whether such heuristic switching should be performed. Such heuristic switching can also be driven by changes in the circumstances and/or situation experienced by the transport system, either alone or in combination with determinations as to metaheuristic parameter drift.

A hyper-heuristic DRRA can employ machine learning techniques (e.g., reinforcement learning) to good effect in the selection of the appropriate DRRA for the given situation. An example of such an approach is now described. Such a reinforcement learning approach can be used to implement the DRRA selection module described above. Such a DRRA selection module is able to handle the management of transport unit routing in the collection and the distribution of items and materials, employing reinforcement learning to dynamically choose between DRRAs.

The system architecture for such a hyper-heuristic DRRA includes constructs representing a state space, and action space, and a reward function. Such a state space is represented by features such as the number and locations of the items/materials being collected/distributed, delivery/collection deadlines and priorities, traffic conditions, transport network dynamics (e.g., route management information such as weather conditions, operational status of transport units, and the like), and current collection/distribution progress along existing routes. The action space is the DRRA that is selected by the hyper-heuristic DRRA, and based on whether collection operations or distribution operations are being considered in the particular case, selects from the DRRAs as appropriate, in the manner noted earlier. The reward function in question measures the effectiveness of the chosen DRRA, and can consider metrics such as total delivery time, distance traveled, priority fulfillment, resource utilization, and other such metrics, on a transport unit basis, a route basis, and/or an overall transport system basis.

In a hyper-heuristic DRRA such as that described herein, components of a reinforcement learning machine learning system include the machine learning policy to be implemented, Q-learning value (the expected future reward for each state-action pair), and information regarding trade-offs between exploration and exploitation. A machine learning policy such as that contemplated herein determines the selection probability for each action based on the current state. Such selection can employ an epsilon-greedy technique or a softmax technique. An epsilon-greedy technique balances exploration (i.e., trying new DRRAs) and exploitation (preferring high-reward routing solutions). A softmax technique probabilistically selects actions based on estimated Q-values, with such Q-learning values being estimates of the expected future reward of each state-action pair. Q-values based on rewards received after taking actions and observing new states can be used in Q-learning, with discounts of future rewards to prioritize immediate gains, in situations warranting such guidance. The exploration-exploitation trade-off noted controls the balance between trying new DRRAs for potential long-term gains, as opposed to continuing to use proven ones for immediate rewards.

With regard to the foregoing, the implementation of a reinforcement-learning-based machine learning system for use in DRRA selection in a hyper-heuristic DRRA according to the present disclosure presents a number of considerations and metaheuristic parameters that might be employed in and by such a reinforcement-learning-based DRRA selection module. With regard to the State space representation, the following parameters can be considered:

Number of items: Discrete (e.g., 10, 50, 100) or continuous (e.g., range based on, for example, amounts of materials).

Item/material locations: Latitude and longitude coordinates for each item, or encoded indices for transport network nodes, Collection/distribution deadlines and priorities: Discrete (e.g., priority levels) or continuous (e.g., time windows). Discrete timestamps or time windows for each item, location, and so on can be employed.

Traffic conditions and transport network dynamics: Discrete (e.g., congestion levels) or continuous (e.g., average travel times), Real-time congestion indicators estimated travel times, and/or transport network link weights can be employed in this regard.

Current collection/distribution progress: Continuous (e.g., percentage completed) or discrete (e.g., number of items collected/delivered).

With regard to the aforementioned action space, a one-hot encoded vector can be used (a one-hot encoded vector being a binary vector representation of categorical variables, as noted subsequently), with a one-hot encoded vector with two elements being used for collection (representing a selection between an ALNS-based DRRA or GA-based DRRA) and a one-hot encoded vector with two elements being used for distribution (representing a selection between an ALNS-based DRRA, a GA-based DRRA, an Anytime A*-based DRRA, a simulated-annealing-based DRRA, a TS-based DRRA, and an RTDP-based DRRA).

The reward function in such embodiments can be a scalable function combining multiple objectives, such as timeliness (e.g., with negative weight for delivery tardiness, positive weight for early deliveries (weighted by priorities)), distance (e.g., a negative weight that increases with increasing total travel distance), priority fulfillment (e.g., With a positive weight for collected/delivered items with high priorities), resource utilization (e.g., negative weight for unused resources (e.g., transport units, transport unit operators and other personnel, and/or the like)), and the like. As will be appreciated in light of the present disclosure, such considerations need not be scaled, but can be used in their original form, and such scaling depends on the importance of each objective.

With regard to exploration/exploitation trade-offs, a variety of parameters can be considered. With regard to the epsilon-greedy technique, the epsilon will start at a value of between about 0.1 and about 0.2, subsequently decaying over time to between about 0.1 and about 0.01 (e.g., multiplicatively by, for example, about 0.99), in order to balance exploration and exploitation (differing, as would be expected, from the values of epsilon noted in connection with the static route rerouting algorithm described in connection with FIG. 14B). With regard to the Softmax activation function, the temperature parameter controls the "peakedness" of the probability distribution, favoring high-reward actions with higher temperatures (e.g., between about 1 and about 10) and encouraging exploration with lower temperatures (e.g., between about 0.1 and about 0.01). Inverse temperature parameter controls exploration-exploitation trade-off (higher values favor exploration).

Embodiments in which Q-learning techniques are employed, the Q-learning parameters of learning rate and discount factor can be tuned. The learning rate (alpha) is preferably between about 0.1 and about 1.0, and controls how quickly new information updates Q-values. The discount factor (gamma) is preferably between about 0.9 and about 0.99, and discounts future rewards, prioritizing immediate gains with higher values.

With regard to metaheuristic parameter tuning for the selected DRRA, the following provide examples of such parameters, and the preferable ranges for each, when used in a route management system such as that described herein.

ALNS-based DRRA metaheuristic parameters: Number of neighborhoods, acceptance probability, perturbation size. Neighborhood size will typically start large (e.g., between about 2 and about 5 neighborhoods), decreasing over time), with an acceptance probability for moves between about 0.5 and about 0.8, for example, and a perturbation size of between about 10% and about 20%.

GA-based DRRA metaheuristic parameters: Population size, selection pressure, crossover and mutation rates. For example, population size can be between about 50 and about 100), selection pressure can be between about 0.6 and about 0.8, crossover rate can be between about 0.7 and about 0.9), and mutation rate can be between about 0.01 and about 0.05.

Anytime A*-based DRRA metaheuristic parameters: Heuristic weight, cutoff time. Heuristic weight controls trade-off between solution quality and speed (higher weights favor faster but potentially suboptimal solutions). Heuristic weight tuned for solution quality vs. timeliness, cutoff time adjusted based on available time.

Simulated-annealing-based DRRA metaheuristic parameters: Cooling schedule, stopping temperature. Cooling schedule (temperature decay rate) determines the balance between exploration and exploitation and can stop based on stopping temperature for convergence.

TS-based DRRA metaheuristic parameters: Tabu list size, aspiration criteria. Tabu list size (number of "banned" moves) and aspiration criteria (conditions for overriding the tabu list) need to be adjusted based on the complexity of the problem faced by the route management system in the given circumstances and situation.

Tabu list size based on neighborhood size (e.g., nodal grouping/route size), aspiration criteria to avoid local optima.

RTDP-based DRRA metaheuristic parameters: Discretization level, pruning threshold. Discount factor (gamma) and planning horizon (depth of lookahead) are tuned based on problem size and time constraints. Discretization based on time windows, pruning threshold for promising paths.

As noted, heuristic adaptation can be implemented, in this case through the use of training and learning by a reinforcement-learning-based machine learning system such as that described herein. Such heuristic adaptation can include metaheuristic parameter tuning, wherein the machine learning system learns and adjusts DRRA parameters for each such DRRA based on state transitions and rewards. By employing reinforcement learning within the metaheuristic selection module, this approach dynamically adapts to the complexities of item/material collection and distribution, selecting the appropriate DRRA based on real-time conditions and learned historical experiences, providing improved efficiency, robustness, and overall performance in collection and distribution operations.

As will be appreciated in light of the present disclosure, the ability of a hyper-heuristic-based DRRA to adapt to different situations is particularly useful in mixed collection/distribution transport systems, such as those described herein. Taking mixed collection/distribution information (MCDI) as an input (along with other machine learning inputs such as those described previously), a hyper-heuristic-based DRRA is able to select an approach, most appropriate to the situation at hand, from the available approaches (e.g., as listed earlier).

Such a hyper-heuristic-based DRRA performs preprocessing operations (e.g., problem analysis and the analysis of resource constraints (e.g., in addition to the MCDI noted, the route management information, system state information, and other such information as may be applicable and advantageous to consider)), metaheuristic selection, execution of the selected metaheuristic, and monitoring/feedback of transport system performance. Preprocessing in such a hyper-heuristic-based DRRA can include an analysis of the aforementioned information, including any resource constraints that may limit the routing solutions generated. Such analysis can include the characterization of the transport system's state (e.g., number of remaining unserviced locations, available transport units, usable depots and their locations, and the like), time constraints, transportation network complexity (e.g. density of locations, road network characteristics, and the like), and objective functions (e.g., distance minimization time minimization cost minimization, and/or a combination thereof), as well as factors such as items/material types, transport unit operator preferences, and traffic data and its availability, among others. Resource constraints, as noted, can include transport unit capacities, transport unit operator schedules, data access (e.g., frequency of data access, availability of data access, and the like), and the like.

While not required, certain embodiments will, in light of the present disclosure, be understood as providing various platforms and/or services to support the aforementioned functionalities and the deployment thereof in a cloud environment. Such an architecture can be referred to as, for example, a cloud-native application architecture, which provides for development by way of a platform that abstracts underlying infrastructure. In so doing, methods and systems such as those described herein are able to further focus on the provision of route management services, while providing access thereto to a broader range of devices, and so, a greater pool of potential users of such systems.

Example Computing and Network Environments

As shown above, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 22 and 23.

Figure 22:
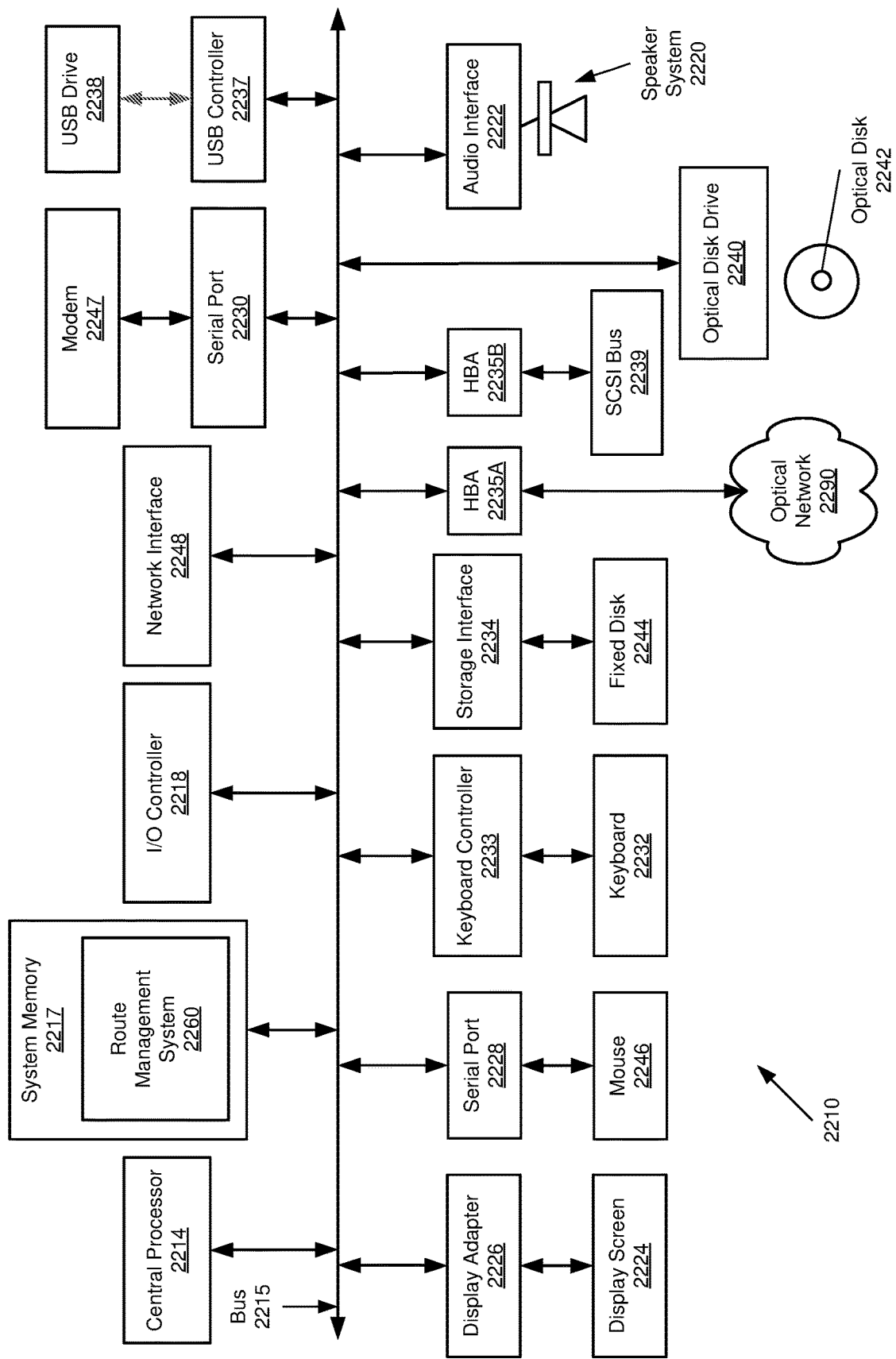
FIG. 22 illustrates an example configuration of a computing device that can be used to implement methods and systems such as those disclosed herein.

FIG. 22 depicts a block diagram of a computer system 2210 suitable for implementing aspects of the systems described herein, and so can be viewed as an example of a computing device supporting route management server, for example. Computer system 2210 includes a bus 2212 which interconnects major subsystems of computer system 2210, such as a central processor 2214, a system memory 2217 (typically RAM, but which may also include ROM, flash RAM, or the like), an input/output controller 2218, an external audio device, such as a speaker system 2220 via an audio output interface 2222, an external device, such as a display screen 2224 via display adapter 2226 (and so capable of presenting routing visualization data), serial ports 2228 and 2230, a keyboard 2232 (interfaced with a keyboard controller 2233), a storage interface 2234, a USB controller 2237 operative to receive a USB drive 2238, a host bus adapter (HBA) interface card 2235A operative to connect with an optical network 2290, a host bus adapter (HBA) interface card 2235B operative to connect to a SCSI bus 2239, and an optical disk drive 2240 operative to receive an optical disk 2242. Also included are a mouse 2246 (or other point-and-click device, coupled to bus 2212 via serial port 2228), a modem 2247 (coupled to bus 2212 via serial port 2230), and a network interface 2248 (coupled directly to bus 2212).

Bus 2212 allows data communication between central processor 2214 and system memory 2217, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 2210 are generally stored on and accessed from a computer-readable storage medium, such as a hard disk drive (e.g., fixed disk 2244), an optical drive (e.g., optical drive 2240), a universal serial bus (USB) controller 2237, or other computer-readable storage medium.

Storage interface 2234, as with the other storage interfaces of computer system 2210, can connect to a standard computer-readable medium for storage and/or retrieval of information, such as a fixed disk drive 2244. Fixed disk drive 2244 may be a part of computer system 2210 or may be separate and accessed through other interface systems. Modem 2247 may provide a direct connection to a remote server via a telephone link or to the Internet via an internet service provider (ISP). Network interface 2248 may provide a direct connection to a remote server via a direct network link to the Internet via a POP (point of presence). Network interface 2248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 22 need not be present to practice the systems described herein. The devices and subsystems can be interconnected in different ways from that shown in FIG. 22. The operation of a computer system such as that shown in FIG. 22 is readily known in the art and is not discussed in detail in this application. Code to implement portions of the systems described herein can be stored in computer-readable storage media such as one or more of system memory 2217, fixed disk 2244, optical disk 2242, or floppy disk 2238. The operating system provided on computer system 2210 may be WINDOWS, UNIX, LINUX, IOS, or another operating system. To this end, system memory 2217 is depicted in FIG. 22 as executing a route management system 2260, in the manner of the systems discussed previously herein, for example.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 23:
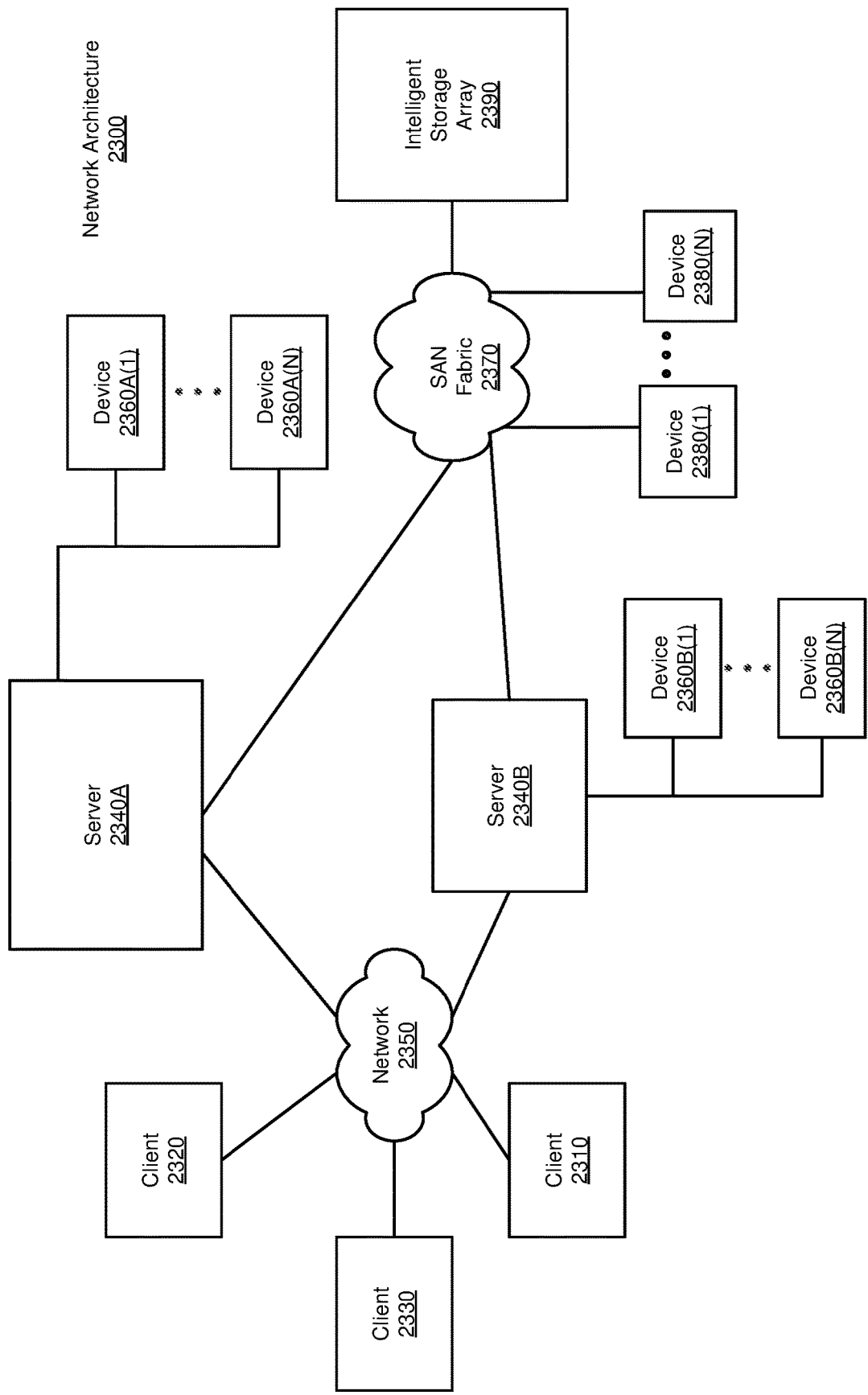
FIG. 23 illustrates an example configuration of a network architecture in which methods and systems such as those disclosed herein can be implemented.

FIG. 23 is a block diagram depicting a network architecture 2300 in which client systems 2310, 2320 and 2330, as well as storage servers 2340A and 2340B (any of which can be implemented using computer system 2310), are coupled to a network 2350. Storage server 2340A is further depicted as having storage devices 2360A(1)-(N) directly attached, and storage server 2340B is depicted with storage devices 2360B(1)-(N) directly attached. Storage servers 2340A and 2340B are also connected to a SAN fabric 2370, although connection to a storage area network is not required for operation. SAN fabric 2370 supports access to storage devices 2380(1)-(N) by storage servers 2340A and 2340B, and so by client systems 2310, 2320 and 2330 via network 2350. An intelligent storage array 2390 is also shown as an example of a specific storage device accessible via SAN fabric 2370.

With reference to computer system 2210, modem 2247, network interface 2248 or some other method can be used to provide connectivity from each of client computer systems 2310, 2320 and 2330 to network 2350. Client systems 2310, 2320 and 2330 are able to access information on storage server 2340A or 2340B using, for example, a web browser or other client software (not shown). Such a client allows client systems 2310, 2320 and 2330 to access data hosted by storage server 2340A or 2340B or one of storage devices 2360A(1)-(N), 2360B(1)-(N), 2380(1)-(N) or intelligent storage array 2390. FIG. 23 depicts the use of a network such as the Internet for exchanging data, but the systems described herein are not limited to the Internet or any particular network-based environment.

Other Embodiments

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 2110). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
performing a route management process configured to route a plurality of transport units performing refuse collection by virtue of comprising
determining static route routing information using a first routing algorithm, wherein
the static route routing information identifies one or more routes,
the determining the static route routing information comprises
identifying a plurality of locations to be serviced,
generating a graph, wherein
the graph comprises a plurality of nodes,
the graph is a complete graph, and
the graph is generated based, at least in part, on the plurality of locations,
assigning each of the plurality of locations to a corresponding node of the plurality of nodes,
grouping the plurality of nodes into a plurality of nodal groupings by performing a grouping analysis of the graph, and
determining the one or more routes using static route management information and the plurality of nodal groupings,
each route of the one or more routes comprises ones of the plurality of nodes and one or more edges of the graph,
the each route is an intra-nodal route of one or more intra-nodal routes, if the nodes of the plurality of nodes are in a same nodal grouping of the plurality of nodal groupings,
the each route is an inter-nodal route of one or more inter-nodal routes, if the nodes of the plurality of nodes are in different nodal groupings of the plurality of nodal groupings,
the static route management information is based, at least in part, on historical information and route prediction information, by virtue of the route prediction information being generated by a route modeling engine, and
the route modeling engine is a machine learning system that generates the route prediction information based, at least in part, on a route management model of the machine learning system and at least a portion of the historical information;
subsequent to the determining the static route routing information, assigning one or more transport units of the plurality of transport units to the one or more routes, using the static route routing information;
subsequent to the assigning the one or more transport units of the plurality of transport units to the one or more routes, performing one or more transport operations, wherein
the performing the refuse collection comprises the one or more transport units collecting refuse at one or more locations along a corresponding route of the one or more routes; and
during the one or more transport operations,
identifying a change in route management information, wherein
the route management information comprises
the static route management information, and
dynamic route management information, and
in response to the change in the route management information being identified,
performing rerouting of at least one of the plurality of transport units,
wherein
the rerouting of the at least one of the plurality of transport units comprises
evaluating the change in the route management information, and
modifying at least one route of the one or more routes based, at least in part, on the evaluation of the change in the route management information,
in response to the change in route management information being a change in the static route management information, the evaluating and the modifying are performed using a second routing algorithm,
in response to the change in route management information being a change in the dynamic route management information, the evaluating and the modifying are performed using a third routing algorithm,
the first routing algorithm is a greedy algorithm,
the second routing algorithm is a heuristic algorithm, and
the third routing algorithm is a metaheuristic algorithm.

2. The method of claim 1, wherein
the grouping uses a clustering procedure comprising at least one of
a K-means clustering procedure,
a hierarchical clustering procedure, or
a density-based spatial clustering of applications with noise procedure,
the one or more routes are determined, at least in part, by performing a first process, wherein
the static route management information is an input to the first process, and
the evaluating the change in the route management information comprises
performing a second process, wherein
the route management information and the change in the route management information are inputs to the second process.

3. The method of claim 2, wherein
the performing the first process comprises executing the first routing algorithm,
the performing the second process comprises executing the second routing algorithm, and
the method further comprises
performing a third process, wherein
the performing the third process comprises executing the third routing algorithm, and
the first routing algorithm, the second routing algorithm, and the third routing algorithm are different from one another.

4. The method of claim 3, wherein
the generating the graph comprises
generating intra-nodal static route routing information for one or more paths between nodes in each nodal grouping of the plurality of nodal groupings, and
generating inter-nodal static route routing information for one or more paths between pairs of nodal groupings of the plurality of nodal groupings.

5. The method of claim 2, wherein
the evaluating the change in the route management information comprises performing a third process, wherein
the route management information and the change in the route management information are inputs to the third process, and
the third process comprises the third routing algorithm.

6. The method of claim 5, further comprising:
determining whether the change is in the static route management information or the dynamic route management information, wherein
the performing the first process comprises executing the first routing algorithm,
the performing the second process comprises executing the second routing algorithm, and
the performing the third process comprises executing the third routing algorithm;
in response to the change being in the static route management information, performing the second process; and
in response to the change being in the dynamic route management information, performing the third process.

7. The method of claim 1, further comprising:
determining whether at least one of the one or more routes should be modified as a result of the change in the route management information; and
in response to a determination that the at least one of the one or more routes should be modified as a result of the change in the route management information, performing the evaluating and the modifying.

8. The method of claim 1, wherein
the one or more routes are determined, at least in part, by
performing a first process that comprises executing the first routing algorithm, wherein
the static route management information is an input to the first process, and
the evaluating the change in the route management information comprises
determining whether the change is in the static route management information or the dynamic route management information, wherein
in response to the change being in the static route management information,
performing a second process that comprises executing the second routing algorithm, wherein
the static route management information and the change in the route management information are inputs to the second process,
in response to the change being in the dynamic route management information,
performing a third process that comprises executing the third routing algorithm, wherein
the dynamic route management information and the change in the route management information are inputs to the third process.

9. The method of claim 8, wherein
the route management process is further configured to route the plurality of transport units performing refuse collection by virtue of
the evaluating the change in the route management information further comprising
performing a Delaunay Triangulation heuristic prior to the performing the heuristic algorithm or the metaheuristic algorithm,
the greedy algorithm being based on Dijkstra's algorithm,
the heuristic algorithm being based on Dijkstra's algorithm, and
the metaheuristic algorithm being based on an Adaptive Large Neighborhood Search algorithm or a Genetic Algorithm.

10. The method of claim 1, further comprising:
configuring one or more routing parameters, wherein
the configuring the one or more routing parameters comprises at least one of
determining one or more cost parameters,
determining one or more scheduling constraints,
determining one or more priority areas, or
determining one or more historical route parameters; and
evaluating the static route management information, wherein
the evaluating the static route management information comprises at least one of
determining one or more cost parameters,
determining one or more transport objectives, or
determining one or more coverage objectives.

11. The method of claim 1, wherein the performing the one or more transport operations further comprises:
determining load information for each transport unit of the one or more transport units,
wherein
the load information for the each transport unit of the one or more transport units comprises at least one of a remaining quantity and/or an available capacity for the each transport unit of the one or more transport units;
determining whether another change has occurred, wherein
the another change is a change in the at least one of the remaining quantity and/or the available capacity for the each transport unit of the one or more transport units; and
in response to a determination that the another change has occurred,
analyzing transport unit loading,
determining whether the analyzing indicates that rerouting of at least one of the transport units is needed,
in response to a determination that the analyzing indicates that rerouting of the at least one of the transport units is needed,
performing a rerouting analysis, and
rerouting the at least one of the transport units in accordance with a result of the rerouting analysis.

12. The method of claim 11, wherein the analyzing comprises:
aggregating the load information for the each transport unit of the one or more transport units;
determining a load value, wherein the load value is at least one of
a transport unit load for the each transport unit of the one or more transport units,
a system load for the one or more transport units, or
a combination of the transport unit load for the each transport unit of the one or more transport units and the system load for the one or more transport units; and
analyzing the load value, wherein
the load value is analyzed based, at least in part, on one or more load thresholds.

13. The method of claim 12, further comprising:
performing a first process, wherein
the static route management information is an input to the first process, and the performing the first process comprises executing a
first routing algorithm; and
performing a second process, wherein
the route management information and the change in
the route management information are inputs to the
second process, and
the performing the second process comprises executing
a second routing algorithm.

14. The method of claim 13, wherein the evaluating the change in the route management information comprises:
identifying one or more outcomes based, at least in part, on the change, wherein
the one or more outcomes are identified using one or more constraints determined from the static route management information;
determining whether at least one of the one or more transport units should be rerouted based, at least in part, on an efficiency of performing the rerouting; and
in response to a determination that the at least one of the one or more transport units should be rerouted,
determining system state information,
determining one or more final outcomes based, at least in part, on the system state information, and
further rerouting the at least one of the one or more transport units, wherein
the at least one of the one or more transport units is further rerouted using the second routing algorithm,
the further rerouting uses the one or more final outcomes, and
the first routing algorithm and the second routing algorithm are different from one another.

15. The method of claim 1, wherein the route management information is dynamic route management information, and the method further comprises:
identifying one or more identified dynamic values of the dynamic route management information, wherein
the one or more identified dynamic values are identified as a result of the one or more identified dynamic values experiencing the change;
producing one or more analyzed dynamic values by analyzing the one or more identified dynamic values;
identifying one or more outcomes, wherein
the one or more outcomes are identified using one or more constraints determined from the static route management information;
determining whether at least one of the one or more transport units should be rerouted based, at least in part, on an efficiency of performing the rerouting; and
in response to a determination that the at least one of the one or more transport units should be rerouted,
determining system state information,
determining one or more final outcomes based, at least in part, on the system state information, and
rerouting the at least one of the one or more transport units, wherein
the at least one of the one or more transport units is rerouted using a routing algorithm, and
the routing algorithm uses the one or more final outcomes.

16. A non-transitory computer-readable storage medium, comprising program instructions, which, when executed by one or more processors of a computing system, perform a method comprising:
performing a route management process configured to route a plurality of transport units performing refuse collection by virtue of comprising
determining static route routing information using a first routing algorithm, wherein
the static route routing information identifies one or more routes,
the determining the static route routing information comprises
identifying a plurality of locations to be serviced,
generating a graph, wherein
the graph comprises a plurality of nodes,
the graph is a complete graph, and
the graph is generated based, at least in part, on the plurality of locations,
assigning each of the plurality of locations to a corresponding node of the plurality of nodes,
grouping the plurality of nodes into a plurality of nodal groupings by performing a grouping analysis of the graph, and
determining the one or more routes using static route management information and the plurality of nodal groupings,
each route of the one or more routes comprises ones of the plurality of nodes and one or more edges of the graph,
the each route is an intra-nodal route of one or more intra-nodal routes, if the nodes of the plurality of nodes are in a same nodal grouping of the plurality of nodal groupings,
the each route is an inter-nodal route of one or more inter-nodal routes, if the nodes of the plurality of nodes are in different nodal groupings of the plurality of nodal groupings,
the static route management information is based, at least in part, on historical information and route prediction information, by virtue of the route prediction information being generated by a route modeling engine, and
the route modeling engine is a machine learning system that generates the route prediction information based, at least in part, on a route management model of the machine learning system and at least a portion of the historical information;
subsequent to the determining the static route routing information, assigning one or more transport units of the plurality of transport units to the one or more routes,
using the static route routing information;
subsequent to the assigning the one or more transport units of the plurality of transport units to the one or more routes, performing one or more transport operations, wherein
the performing the refuse collection comprises the one or more transport units collecting refuse at one or more locations along a corresponding route of the one or more routes;
during the one or more transport operations,
identifying a change in route management information, wherein
the route management information comprises
the static route management information, and
dynamic route management information, and
in response to the change in the route management information being identified,
performing rerouting of at least one of the plurality of transport units,
wherein
the rerouting of the at least one of the plurality of transport units comprises evaluating the change in the route management information, and modifying at least one route of the one or more routes based, at least in part, on the evaluation of the change in the route management information, in response to the change in route management information being a change in the static route management information, the evaluating and the modifying are performed using a second routing algorithm, in response to the change in route management information being a change in the dynamic route management information, the evaluating and the modifying are performed using a third routing algorithm, the first routing algorithm is a greedy algorithm, the second routing algorithm is a heuristic algorithm, and the third routing algorithm is a metaheuristic algorithm.

17. The non-transitory computer-readable storage medium of claim 16, wherein the one or more routes are determined, at least in part, by performing a first process, wherein the static route management information is an input to the first process, and the evaluating the change in the route management information comprises performing a second process, wherein the route management information and the change in the route management information are inputs to the second process.

18. The non-transitory computer-readable storage medium of claim 17, wherein the performing the first process comprises executing the first routing algorithm, the performing the second process comprises executing the second routing algorithm, and the first routing algorithm, the second routing algorithm, and the third routing algorithm are different from one another.

19. The non-transitory computer-readable storage medium of claim 18, wherein the greedy algorithm being based on Bellman-Ford algorithm, the heuristic algorithm being based on a Clarke-Wright algorithm, the metaheuristic algorithm being based on an anytime A* algorithm, and the evaluating the change in the route management information further comprises performing a Constrained Delaunay Triangulation heuristic prior to the performing the second process and a third process, determining whether the change is in the static route management information or the dynamic route management information, in response to the change being in the static route management information, performing the second process, wherein the static route management information and the change in the route management information are inputs to the second process, in response to the change being in the dynamic route management information, performing the third process, wherein the dynamic route management information and the change in the route management information are inputs to the third process, and the performing the third process comprises executing the third routing algorithm.

20. A computing system comprising:

one or more processors; and a computer-readable storage medium coupled to the one or more processors, comprising program instructions, which, when executed by the one or more processors, perform a method comprising performing a route management process configured to route a plurality of transport units performing refuse collection by virtue of comprising determining static route routing information using a first routing algorithm, wherein the static route routing information identifies one or more routes, the determining the static route routing information comprises identifying a plurality of locations to be serviced, generating a graph, wherein the graph comprises a plurality of nodes, the graph is a complete graph, and the graph is generated based, at least in part, on the plurality of locations, assigning each of the plurality of locations to a corresponding node of the plurality of nodes, grouping the plurality of nodes into a plurality of nodal groupings by performing a grouping analysis of the graph, and determining the one or more routes using static route management information and the plurality of nodal groupings, each route of the one or more routes comprises ones of the plurality of nodes and one or more edges of the graph, the each route is an intra-nodal route of one or more intra-nodal routes, if the nodes of the plurality of nodes are in a same nodal grouping of the plurality of nodal groupings, the each route is an inter-nodal route of one or more inter-nodal routes, if the nodes of the plurality of nodes are in different nodal groupings of the plurality of nodal groupings, the static route management information is based, at least in part, on historical information and route prediction information, by virtue of the route prediction information being generated by a route modeling engine, and the route modeling engine is a machine learning system that generates the route prediction information based, at least in part, on a route management model of the machine learning system and at least a portion of the historical information, subsequent to the determining the static route routing information, assigning one or more transport units of the plurality of transport units to the one or more routes, using the static route routing information, performing one or more transport operations, wherein the performing the refuse collection comprises the one or more transport units collecting refuse at one or more locations along a corresponding route of the one or more routes, and during the one or more transport operations, identifying a change in route management information, wherein the route management information comprises at least one of the static route management information, and dynamic route management information, and in response to the change in the route management information being identified, performing rerouting of at least one of the plurality of transport units, wherein the rerouting of the at least one of the plurality of transport units comprises evaluating the change in the route management information, and modifying at least one route of the one or more routes based, at least in part, on the evaluation of the change in the route management information, in response to the change in route management information being a change in the static route management information, the evaluating and the modifying are performed using a second routing algorithm, in response to the change in route management information being a change in the dynamic route management information, the evaluating and the modifying are performed using a third routing algorithm, the first routing algorithm is a greedy algorithm, the second routing algorithm is a heuristic algorithm, and the third routing algorithm is a metaheuristic algorithm.

* * * * *